US010353965B2

(12) United States Patent
Pal et al.

(10) Patent No.: US 10,353,965 B2
(45) Date of Patent: Jul. 16, 2019

(54) DATA FABRIC SERVICE SYSTEM ARCHITECTURE

(71) Applicant: Splunk Inc., San Francisco, CA (US)

(72) Inventors: Sourav Pal, Foster City, CA (US); Christopher Pride, San Francisco, CA (US); Arindam Bhattacharjee, Fremont, CA (US); Xiaowei Wang, Foster City, CA (US); James Alasdair Robert Hodge, London (GB); Mustafa Ahamed, Sunnyvale, CA (US)

(73) Assignee: SPLUNK INC., San Francisco, CA (US)

( * ) Notice: Subject to any disclaimer, the term of this patent is extended or adjusted under 35 U.S.C. 154(b) by 311 days.

(21) Appl. No.: 15/276,717

(22) Filed: Sep. 26, 2016

(65) Prior Publication Data
US 2019/0163821 A1 May 30, 2019

(51) Int. Cl.
*G06F 16/00* (2019.01)
*G06F 16/951* (2019.01)
(Continued)

(52) U.S. Cl.
CPC .......... *G06F 16/951* (2019.01); *G06F 16/212* (2019.01); *G06F 16/258* (2019.01);
(Continued)

(58) Field of Classification Search
CPC ........ G06F 17/30864; G06F 17/30958; G06F 17/30294; G06F 17/30569;
(Continued)

(56) References Cited

U.S. PATENT DOCUMENTS 7,698,267 B2 *  4/2010  Papakonstantinou ....................... G06F 17/30864
                                                                                    707/999.005
8,793,225 B1 *  7/2014  Bitincka ........... G06F 17/30545
                                                                                    707/608

(Continued)

OTHER PUBLICATIONS

U.S. Appl. No. 15/339,825 of Hodge, J. et al., filed Oct. 31, 2016.
(Continued)

*Primary Examiner* — Alexander Khong
(74) *Attorney, Agent, or Firm* — Perkins Coie LLP

(57) ABSTRACT

Disclosed is a technique that can be performed in a distributed computer network. The technique can include a data index and query system that receives search query, defines a search scheme for applying the search query on distributed data storage systems including an internal data storage system of the data index and query system and an external data storage system. The internal data storage system stores data as time-indexed events including respective segments of raw machine data. The data index and query system can transfer a portion of the search scheme to a search service, which can return search results obtained by application of the search scheme to the distributed data storage systems including the internal data storage system and the external data storage system. Lastly, the search results or data indicative of the search results can be output on a display device to the user.

25 Claims, 42 Drawing Sheets

(51) Int. Cl.
*G06F 16/21* (2019.01)
*G06F 16/25* (2019.01)
*G06F 16/904* (2019.01)
*G06F 16/901* (2019.01)
*G06F 16/9038* (2019.01)
*G06F 16/903* (2019.01)

(52) U.S. Cl.
CPC ........ *G06F 16/904* (2019.01); *G06F 16/9024* (2019.01); *G06F 16/9038* (2019.01); *G06F 16/90335* (2019.01)

(58) Field of Classification Search
CPC ......... G06F 17/30991; G06F 17/30979; G06F 17/30994; G06F 16/951; G06F 16/90335; G06F 16/9038; G06F 16/904; G06F 16/212; G06F 16/258; G06F 16/9024
See application file for complete search history.

(56) References Cited

U.S. PATENT DOCUMENTS

| | | | | |
|---|---|---|---|---|
| 2003/0014403 A1* | 1/2003 | Chandrasekar | ..... | G06F 17/3064 |
| 2011/0099500 A1* | 4/2011 | Smith | ................... | G06F 3/0482 |
| | | | | 715/771 |
| 2013/0060783 A1* | 3/2013 | Baum | ............... | G06F 17/30551 |
| | | | | 707/746 |
| 2014/0195558 A1* | 7/2014 | Murthy | ............. | G06F 17/30545 |
| | | | | 707/770 |
| 2015/0324433 A1* | 11/2015 | Duffy | ................ | G06F 17/30554 |
| | | | | 707/722 |
| 2016/0055184 A1* | 2/2016 | Fokoue-Nkoutche | ...................... | |
| | | | | G06F 17/30297 |
| | | | | 707/809 |
| 2017/0006135 A1* | 1/2017 | Siebel | .................... | H04L 67/02 |

OTHER PUBLICATIONS

U.S. Appl. No. 15/339,835 of Bhattacharjee, A., et al. filed Oct. 31, 2016.
U.S. Appl. No. 15/339,840 of Pal, S. et al., filed Oct. 31, 2016.
U.S. Appl. No. 15/339,845 of Bhattacharjee, A., et al., filed Oct. 31, 2016.
U.S. Appl. No. 15/339,847 of Pal, S. et al., filed Oct. 31, 2016.
U.S. Appl. No. 15/339,886 of Bhattacharjee, A., et al. filed Oct. 31, 2016.
U.S. Appl. No. 15/339,889 of Bath, A., et al. filed Oct. 31, 2016.

* cited by examiner

Data Summary

| Hosts (5) | Sources (8) | Sourcetypes (3) |

(filter)

| Host ≑ | | Count ≑ | Last Update ≑ |
|---|---|---|---|
| mailsv | ⬚ ∨ | 9,829 | 4/29/14 1:32:47.000 PM |
| vendor_sales | ⬚ ∨ | 30,244 | 4/29/14 1:32:46.000 PM |
| www1 | ⬚ ∨ | 24,221 | 4/29/14 1:32:44.000 PM |
| www2 | ⬚ ∨ | 22,595 | 4/29/14 1:32:47.000 PM |
| www3 | ⬚ ∨ | 22,975 | 4/29/14 1:32:45.000 PM |

DATA FABRIC SERVICE SYSTEM ARCHITECTURE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

At least one embodiment of the present disclosure pertains to a data fabric service system architecture and, more particularly, a data fabric service system architecture for searching and analyzing data of distributed data systems.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Although the availability of vastly greater amounts of diverse data on diverse data systems provides opportunities to derive new insights, it also gives rise to technical challenges to search and analyze the data. Tools exist that allow an analyst to search data systems separately and collect search results over a network for the analyst to derive insights in a piecemeal manner. However, tools that allow analysts to seamlessly search and analyze diverse data types of diverse data systems do not exist.

BRIEF DESCRIPTION OF THE DRAWINGS

One or more embodiments of the present disclosure are illustrated by way of example and not limitation in the figures of the accompanying drawings, in which like references indicate similar elements.

FIG. 8B illustrates a data summary dialog that enables a user to select various data sources according to some embodiments of the present disclosure;

FIG. 9D illustrates a user interface screen for an example data model-driven report generation interface according to some embodiments of the present disclosure;

FIG. 32 illustrates a timeline visualization rendered on a GUI in which an embodiment may be implemented;

FIG. 33 illustrates a selected bin of a timeline visualization and the contents of the selected bin according to some embodiments of the present disclosure;

DETAILED DESCRIPTION

Figure 1:
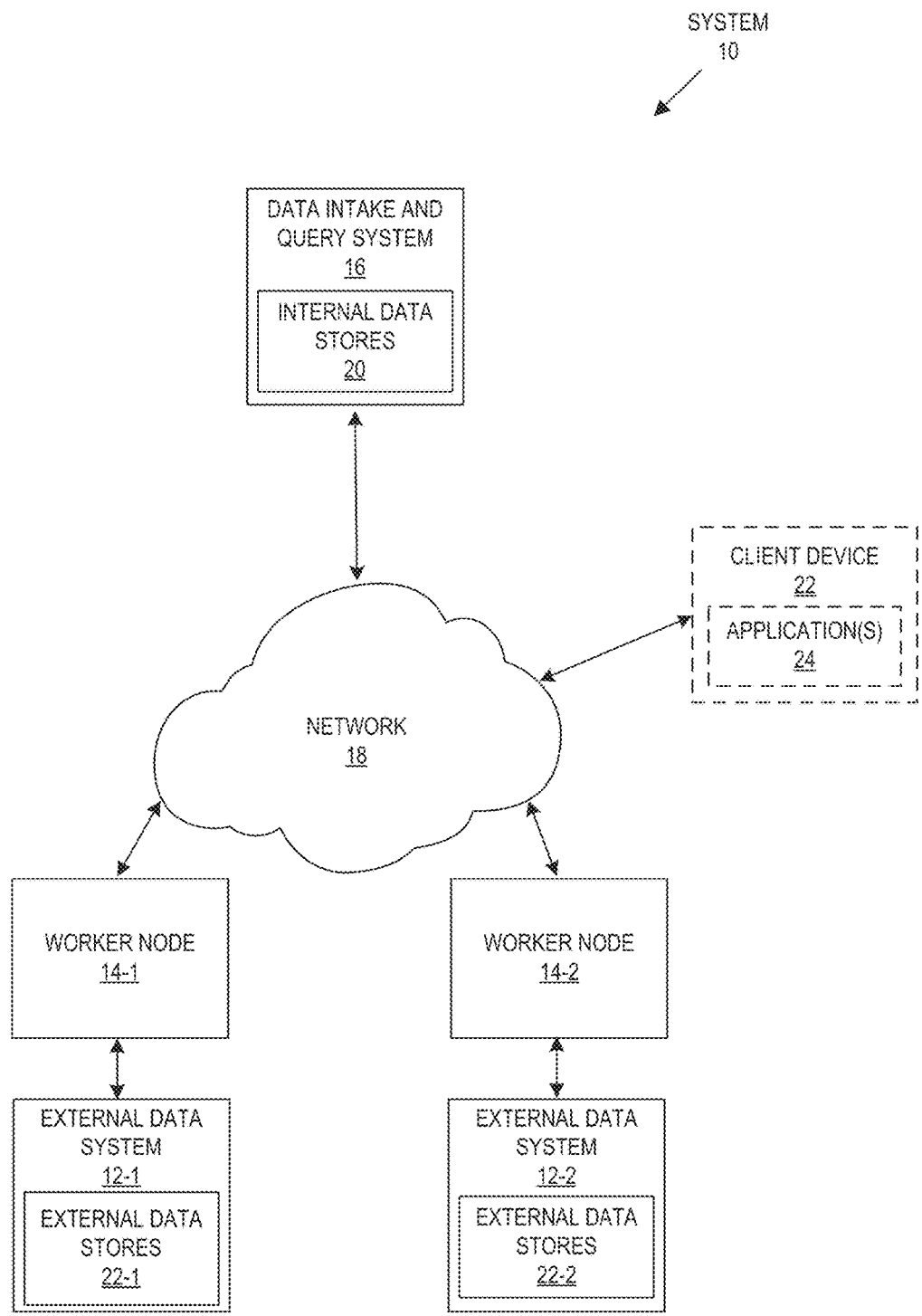
FIG. 1 is a high-level system diagram in which an embodiment may be implemented.

In this description, references to "an embodiment," "one embodiment," or the like, mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

A data intake and query system can index and store data in data stores of indexers, and can receive search queries causing a search of the indexers to obtain search results. The data intake and query system typically has search, extraction, execution, and analytics capabilities that are limited in scope to the data stores of the indexers ("internal data stores"). Hence, a seamless and comprehensive search and analysis that includes diverse data types from external data sources is not possible. Thus, the capabilities of data intake and query systems remain isolated from external data sources that could improve search results to provide new insights.

The disclosed embodiments overcome these drawbacks by extending the search and analytics capabilities of a data intake and query system to include diverse data types stored in diverse data systems external from the data intake and query system. As a result, an analyst can use the data intake and query system to search and analyze internal data stores and/or external data systems including enterprise systems and open source technologies of a big data ecosystem. The term "big data" refers to large data sets that may be analyzed computationally to reveal patterns, trends, and associations, in some cases, relating to human behavior and interactions.

In particular, introduced herein is a data fabric service system architecture ("DFS system") that has the ability to execute big data analytics seamlessly and can scale across diverse data sources to enable processing large volumes of diverse data from diverse data systems. A "data source" can include a "data system," which may refer to a system that can process and/or store data. A "data storage system" may refer to a storage system that can store data such as unstructured, semi-structured, or structured data. Accordingly, a data source can include a data system that includes a data storage system.

The DFS system can improve search and analytics capabilities of a data intake and query system by employing services combined with a scalable network of distributed nodes communicatively coupled to diverse data systems. The network of distributed nodes can act as agents of the data intake and query system to collect and process data of distributed data systems, and the services can provide the processed data to the data intake and query system as search results.

For example, the data intake and query system can respond to a search query by executing search operations on internal and external data sources to obtain partial search results that are harmonized and presented as search results of the search query. As such, the data intake and query system can offload search and analytics operations to the distributed nodes. Hence, the DFS architecture enables search and analytics capabilities that can extend beyond the data intake and query system to include external data systems.

The DFS system can provide big data open stack integration to act as a big data pipeline that extends the search and analytics capabilities of a data intake and query system over numerous and diverse external data resources. For example, the DFS system can extend the data execution scope of the data intake and query system to include data residing in external data systems such as MySQL, PostgreSQL, and Oracle databases; NoSQL data stores like Cassandra, Mongo DB; and cloud storage like Amazon S3 and Hadoop distributed file system (HDFS). Thus, the DFS system can execute search and analytics operations for all possible combinations of data types on internal data stores, external data stores, or a combination of both.

The distributed processing of the DFS system enables scalability to include any number of distributed data systems. As such, search queries received by the data intake and query system can be propagated to the network of distributed nodes to extend the search and analytics capabilities of the data intake and query system over external data systems. In this context, the network of distributed nodes can act as an extension of the local data intake in query system's data processing pipeline to facilitate scalable analytics across the diverse data systems. Accordingly, the DFS system can extend and transform the data intake and query system to include data resources into a data fabric platform that can leverage computing assets from anywhere and access and execute on data regardless of type or origin.

The disclosed embodiments include services such as new search capabilities, visualization tools, and other services that are seamlessly integrated into the DFS system. For example, the disclosed techniques include new search services performed on internal data stores, external data stores, or a combination of both. The search operations can provide ordered or unordered search results, or search results derived from data of diverse data systems, which can be visualized to provide new and useful insights about the data contained in a big data ecosystem.

Various other features of the DFS system introduced here will become apparent from the description that follows. First, however, it is useful to consider an example of an environment and system in which the techniques can be employed, as will now be described.

1.0. General Overview

The embodiments disclosed herein generally refer to a data fabric service system architecture ("DFS system") that includes a data intake and query system, services, a network of distributed nodes, and distributed data systems, all interconnected over one or more networks. However, embodiments of the disclosed system can include many computing components including software, servers, routers, client devices, and host devices that are not specifically described herein. As used herein, a "node" can refer to one or more devices and/or software running on devices that enable the devices to provide services of the DFS system. For example, a node can include devices running software that enable execution of a DFS search service.

FIG. 1 is a high-level system diagram in which an embodiment may be implemented. The system 10 includes distributed external data systems 12-1 and 12-2 (also referred to collectively and individually as external data system(s) 12). The external data systems 12 are communicatively coupled to worker nodes 14-1 and 14-2, respectively (also referred to collectively and individually as worker node(s) 14). The system 10 also includes a data intake and query system 16 interconnected to the worker nodes 14 over network 18. The system 10 can also include a client device 22 and applications running on the client device 22. An example includes a personal computer running a network browser application that enables a user of the client device 22 to access any of the data systems.

The data intake and query system 16 and the external data systems 12 can each store data obtained from various data sources. For example, the data intake and query system 16 can store data in internal data stores 20 (also referred to as an internal storage system), and the external data systems 12 can store data in respective external data stores 22 (also referred to as external storage systems). However, the data intake and query system 16 and external data systems 12 may process and store data differently. For example, as explained in greater detail below, the data intake and query system 16 may store minimally processed or unprocessed data ("raw data"). In contrast, the external data systems 12 may store pre-processed data rather than raw data. Hence, the data intake and query system 16 and the external data systems 12 can operate independent of each other in a big data ecosystem.

The worker nodes 14 can act as agents of the data intake and query system 16 to process data collected from the internal data stores 20 and the external data stores 22. The worker nodes 14 may reside on one or more computing devices such as servers communicatively coupled to the external data systems 12. The processed data can then be returned to the data intake and query system 16. As such, the worker nodes 14 can extend the search and analytics capabilities of the data intake and query system 16 to act on diverse data systems.

The external data systems 12 may include one or more computing devices that can store structured, semi-structured, or unstructured data. Each external data system 12 can generate and/or collect generated data, and store the generated data in their respective external data stores 22. For example, the external data system 12-1 may include a server running a MySQL database that stores structured data objects such as time-stamped events, and the external data system 12-2 may be a server of cloud computing services such as Amazon web services (AWS) that can provide different data types ranging from unstructured (e.g., s3) to structured (e.g., redshift).

The external data systems 12 are said to be external to the data intake and query system 16 because the data stored at the external data stores 22 has not necessarily been processed or passed through the data intake and query system 16. In other words, the data intake and query system 16 may have no control or influence over how data is processed, controlled, or managed by the external data systems 12.

The external data systems 12 can process data, perform requests received from other computing systems, and perform numerous other computational tasks independent of each other and independent of the data intake and query system 16. For example, the external data system 12-1 may be a server that can process data locally that reflects correlations among the stored data. The external data systems 12 may generate and/or store ever increasing volumes of data without any interaction with the data intake and query system 16. As such, each of the external data system 12 may act independently to control, manage, and process the data they contain.

Data stored in the internal data stores 20 and external data stores 22 may be related. For example, an online transaction could generate various forms of data stored in disparate locations and in various formats. The generated data may include payment information, customer information, and information about suppliers, retailers, and the like. Other examples of data generated in a big data ecosystem include application program data, system logs, network packet data, error logs, stack traces, and performance data. The data can also include diagnostic information and many other types of data that can be analyzed to perform local actions, diagnose performance problems, monitor interactions, and derive other insights.

The volume of generated data can grow at very high rates as the number of transactions and diverse data systems grows. A portion of this large volume of data could be processed and stored by the data intake and query system 16 while other portions could be stored in any of the external data systems 12. In an effort to reduce the vast amounts of raw data generated in a big data ecosystem, some of the external data systems 12 may pre-process the raw data based on anticipated data analysis needs, store the pre-processed data, and discard any remaining raw data. However, discarding massive amounts of raw data can result in the loss of valuable insights that could have been obtained by searching all of the raw data.

Figure 2:
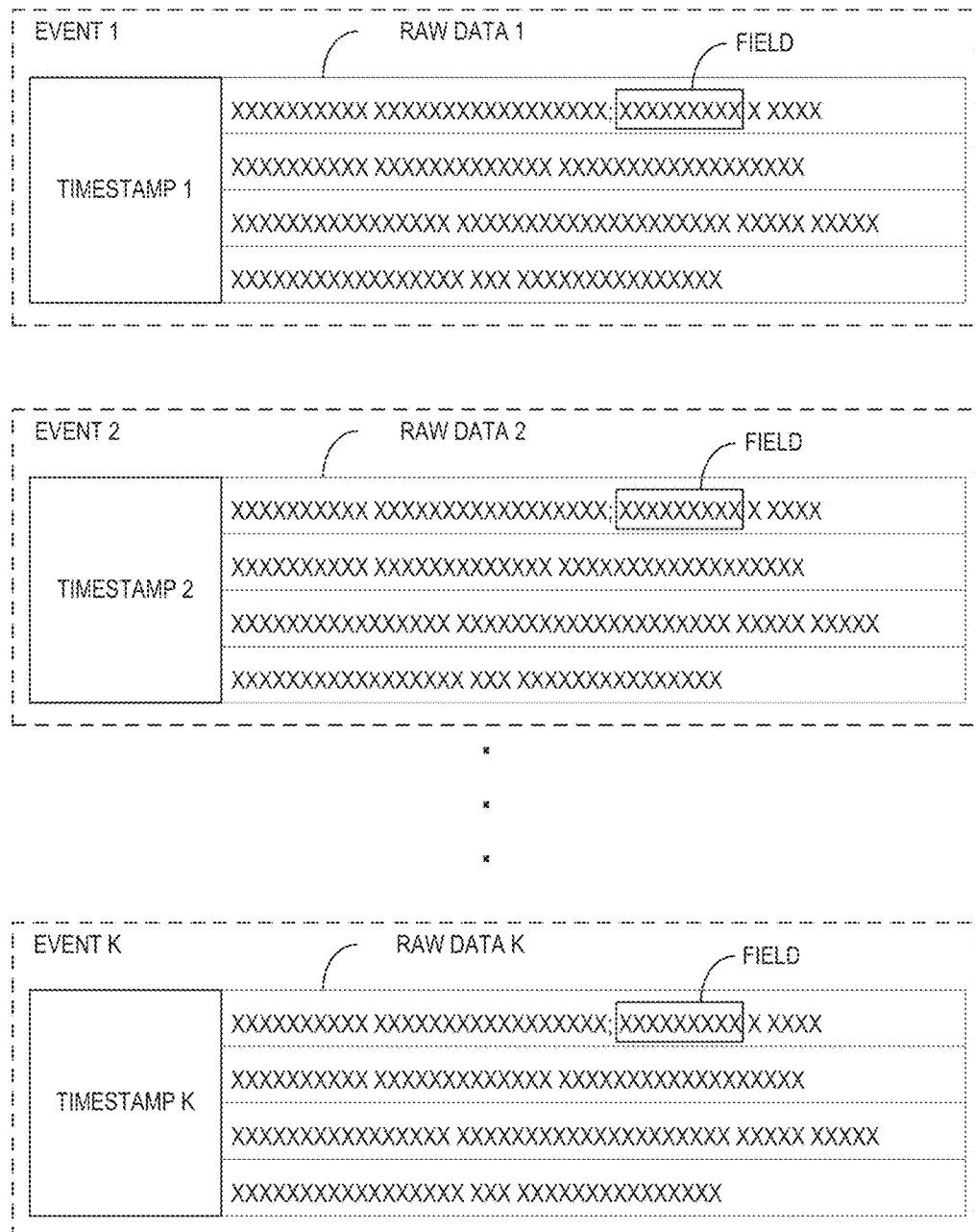
FIG. 2 is a block diagram illustrating a series of events including raw data according to some embodiments of the present disclosure.

In contrast, the data intake and query system 16 can address some of these challenges by collecting and storing raw data as structured "events." FIG. 2 is a block diagram illustrating a series of events including raw edge data according to some embodiments of the present disclosure. An event includes a portion of raw data and is associated with a specific point in time. For example, events may be derived from "time series data," where the time series data comprises a sequence of data points (e.g., performance measurements from a computer system) that are associated with successive points in time.

As shown, each event 1 through K can be associated with a timestamp 1 through K that can be derived from the raw data in the respective event, determined through interpolation between temporally proximate events having known timestamps, or determined based on other configurable rules for associating timestamps with events. During operation of the data intake and query system 16, ingested raw data is divided into segments of raw data delineated by time segments (e.g., blocks of raw data, each associated with a specific time frame). The segments of raw data are indexed as timestamped events, corresponding to their respective time segments as shown in FIG. 2. The system stores the timestamped events in a data store.

In some instances, data systems can store raw data in a predefined format, where data items with specific data formats are stored at predefined locations in the data. For example, the raw data may include data stored as fields. In other instances, raw data may not have a predefined format; that is, the data is not at fixed, predefined locations, but the data does have repeatable patterns and is not random. This means that some raw data can comprise various data items of different data types that may be stored at different locations within the raw data. As shown in FIG. 2, each event 1 through K includes a field that is nine characters in length beginning after a semicolon on a first line of the raw edge data, for example. In certain embodiments, these fields can be queried to extract their contents.

In some embodiments, the external data systems 12 can store raw data as events that are indexed by timestamps but are also associated with predetermined data items. This structure is essentially a modification of conventional database systems that require predetermining data items for subsequent searches. These systems can be modified to retain the remaining raw data for subsequent re-processing for other predetermined data items.

Specifically, the raw data can be divided into segments and indexed by timestamps. The predetermined data items can be associated with the events indexed by timestamps. The events can be searched only for the predetermined data items during search time; the events can be re-processed later in time to re-index the raw data, and generate events with new predetermined data items. As such, the data systems of the system 10 can store related data in a variety of pre-processed data and raw data in a variety of structures.

A number of tools are available to search and analyze data contained in these diverse data systems. As such, an analyst can use a tool to search a database of the external data system 12-1. A different tool could be used to search a cloud services application of the external data system 12-2. Yet another different tool could be used to search the internal data stores 20. Moreover, different tools can perform analytics of data stored in proprietary or open source data stores. However, existing tools cannot obtain valuable insights from data contained in a combination of the data intake and query system 16 and/or any of the external data systems 12. Examples of these valuable insights may include correlations between the structured data of the external data stores 22 and raw data of the internal data stores 20.

The disclosed techniques can extend the search, extraction, execution, and analytics capabilities of data intake and query systems to seamlessly search and analyze multiple diverse data of diverse data systems in a big data ecosystem. The disclosed techniques can transform a big data ecosystem into a big data pipeline between external data systems and a data intake and query system, to enable seamless search and analytics operations on a variety of data sources, which can lead to new insights that were not previously available. Hence, the disclosed techniques include a data intake and query system extended to search external data systems into a data fabric platform that can leverage computing assets from anywhere and access and execute on data regardless of type and origin.

2.0. Overview of Data Intake and Query Systems

As indicated above, modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events" such as those shown in FIG. 2. Hence, an event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data." In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically related (such as an IP address), even though the raw machine data in each event may be in different formats (e.g., semantically related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 7).

3.0. Operating Environment

Figure 3:
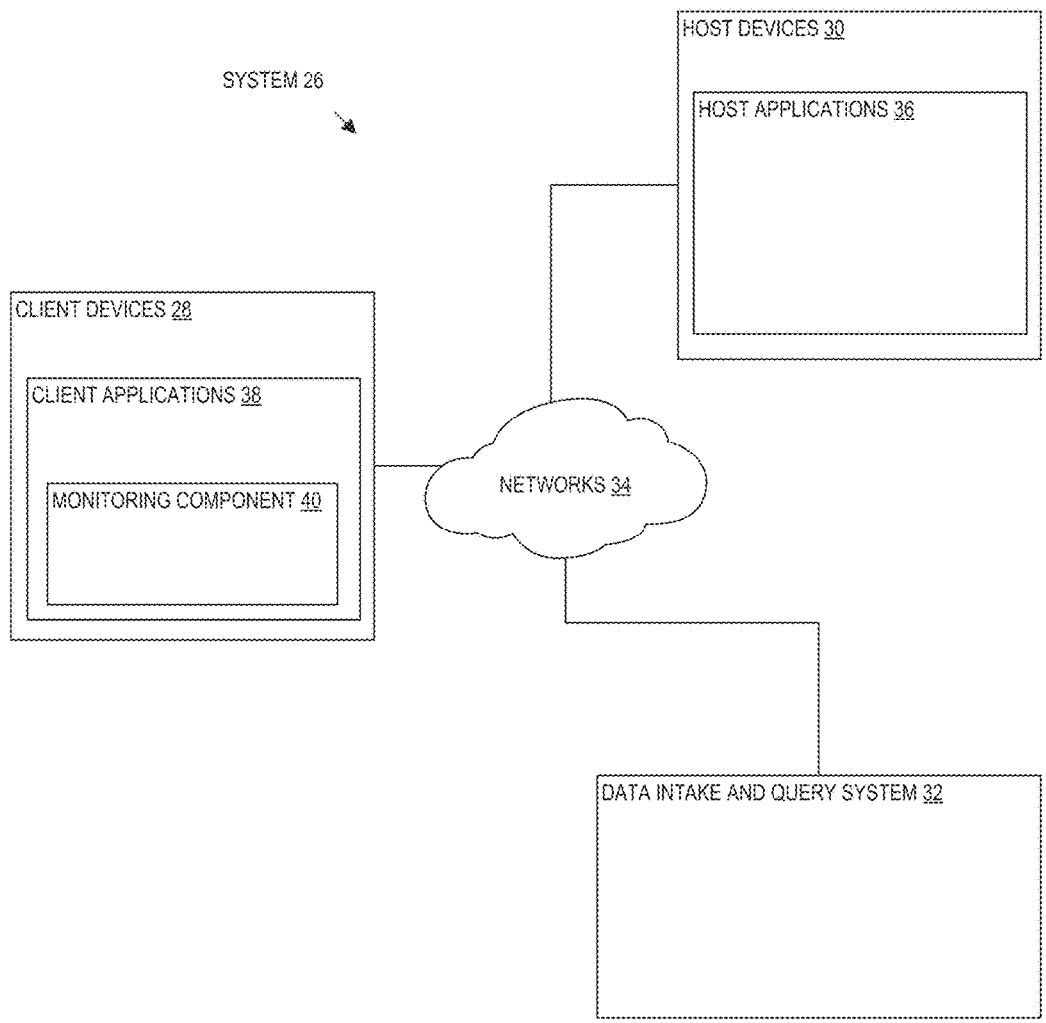
FIG. 3 illustrates a networked computer environment in which an embodiment may be implemented.

FIG. 3 illustrates a networked computer system 26 in which an embodiment may be implemented. Those skilled in the art would understand that FIG. 3 represents one example of a networked computer system and other embodiments may use different arrangements.

The networked computer system 26 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 28 are coupled to one or more host devices 30 and a data intake and query system 32 via one or more networks 34. Networks 34 broadly represent one or more LANs, WANs, cellular networks (e.g., LTE, HSPA, 3G, and other cellular technologies), and/or networks using any of wired, wireless, terrestrial microwave, or satellite links, and may include the public Internet.

3.1. Host Devices

In the illustrated embodiment, a system 26 includes one or more host devices 30. Host devices 30 may broadly include any number of computers, virtual machine instances, and/or data centers that are configured to host or execute one or more instances of host applications 36. In general, a host device 30 may be involved, directly or indirectly, in processing requests received from client devices 28. Each host device 30 may comprise, for example, one or more of a network device, a web server, an application server, a database server, etc. A collection of host devices 30 may be configured to implement a network-based service. For example, a provider of a network-based service may configure one or more host devices 30 and host applications 36 (e.g., one or more web servers, application servers, database servers, etc.) to collectively implement the network-based application.

In general, client devices 28 communicate with one or more host applications 36 to exchange information. The communication between a client device 28 and a host application 36 may, for example, be based on the Hypertext Transfer Protocol (HTTP) or any other network protocol. Content delivered from the host application 36 to a client device 28 may include, for example, HTML documents, media content, etc. The communication between a client device 28 and host application 36 may include sending various requests and receiving data packets. For example, in general, a client device 28 or application running on a client device may initiate communication with a host application 36 by making a request for a specific resource (e.g., based on an HTTP request), and the application server may respond with the requested content stored in one or more response packets.

In the illustrated embodiment, one or more of host applications 36 may generate various types of performance data during operation, including event logs, network data, sensor data, and other types of machine-generated data. For example, a host application 36 comprising a web server may generate one or more web server logs in which details of interactions between the web server and any number of client devices 28 is recorded. As another example, a host device 30 comprising a router may generate one or more router logs that record information related to network traffic managed by the router. As yet another example, a host application 36 comprising a database server may generate one or more logs that record information related to requests sent from other host applications 36 (e.g., web servers or application servers) for data managed by the database server.

3.2. Client Devices

Client devices 28 of FIG. 3 represent any computing device capable of interacting with one or more host devices 30 via a network 34. Examples of client devices 28 may include, without limitation, smart phones, tablet computers, handheld computers, wearable devices, laptop computers, desktop computers, servers, portable media players, gaming devices, and so forth. In general, a client device 28 can provide access to different content, for instance, content provided by one or more host devices 30, etc. Each client device 28 may comprise one or more client applications 38, described in more detail in a separate section hereinafter.

3.3. Client Device Applications

In an embodiment, each client device 28 may host or execute one or more client applications 38 that are capable of interacting with one or more host devices 30 via one or more networks 34. For instance, a client application 28 may be or comprise a web browser that a user may use to navigate to one or more websites or other resources provided by one or more host devices 30. As another example, a client application 38 may comprise a mobile application or "app." For example, an operator of a network-based service hosted by one or more host devices 30 may make available one or more mobile apps that enable users of client devices 28 to access various resources of the network-based service. As yet another example, client applications 38 may include background processes that perform various operations without direct interaction from a user. A client application 38 may include a "plug-in" or "extension" to another application, such as a web browser plug-in or extension.

In an embodiment, a client application 38 may include a monitoring component 40. At a high level, the monitoring component 40 comprises a software component or other logic that facilitates generating performance data related to a client device's operating state, including monitoring network traffic sent and received from the client device and collecting other device and/or application-specific information. Monitoring component 40 may be an integrated component of a client application 38, a plug-in, an extension, or any other type of add-on component. Monitoring component 40 may also be a stand-alone process.

In one embodiment, a monitoring component 40 may be created when a client application 38 is developed, for example, by an application developer using a software development kit (SDK). The SDK may include custom monitoring code that can be incorporated into the code implementing a client application 38. When the code is converted to an executable application, the custom code implementing the monitoring functionality can become part of the application itself.

In some cases, an SDK or other code for implementing the monitoring functionality may be offered by a provider of a data intake and query system, such as a system 32. In such cases, the provider of the system 26 can implement the custom code so that performance data generated by the monitoring functionality is sent to the system 32 to facilitate analysis of the performance data by a developer of the client application or other users.

In an embodiment, the custom monitoring code may be incorporated into the code of a client application 38 in a number of different ways, such as the insertion of one or more lines in the client application code that call or otherwise invoke the monitoring component 40. As such, a developer of a client application 38 can add one or more lines of code into the client application 38 to trigger the monitoring component 40 at desired points during execution of the application. Code that triggers the monitoring component may be referred to as a monitor trigger. For instance, a monitor trigger may be included at or near the beginning of the executable code of the client application 38 such that the monitoring component 40 is initiated or triggered as the application is launched, or included at other points in the code that correspond to various actions of the client application, such as sending a network request or displaying a particular interface.

In an embodiment, the monitoring component 40 may monitor one or more aspects of network traffic sent and/or received by a client application 38. For example, the monitoring component 40 may be configured to monitor data packets transmitted to and/or from one or more host applications 36. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 38 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 32 for analysis.

Upon developing a client application 38 that incorporates a monitoring component 40, the client application 38 can be distributed to client devices 28. Applications generally can be distributed to client devices 28 in any manner, or they can be pre-loaded. In some cases, the application may be distributed to a client device 28 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE," filed on 27 Oct. 2014, and which is hereby incorporated by reference in its entirety for all purposes.

In an embodiment, the monitoring component 40 may also monitor and collect performance data related to one or more aspects of the operational state of a client application 38 and/or client device 28. For example, a monitoring component 40 may be configured to collect device performance information by monitoring one or more client device operations, or by making calls to an operating system and/or one or more other applications executing on a client device 28 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 40 may also monitor and collect other device profile information including, for example, a type of client device, a manufacturer and model of the device, versions of various software applications installed on the device, and so forth.

In general, a monitoring component 40 may be configured to generate performance data in response to a monitor trigger in the code of a client application 38 or other triggering application event, as described above, and to store the performance data in one or more data records. Each data record, for example, may include a collection of field-value pairs, each field-value pair storing a particular item of performance data in association with a field for the item. For example, a data record generated by a monitoring component 40 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

3.4. Data Server System

Figure 4:
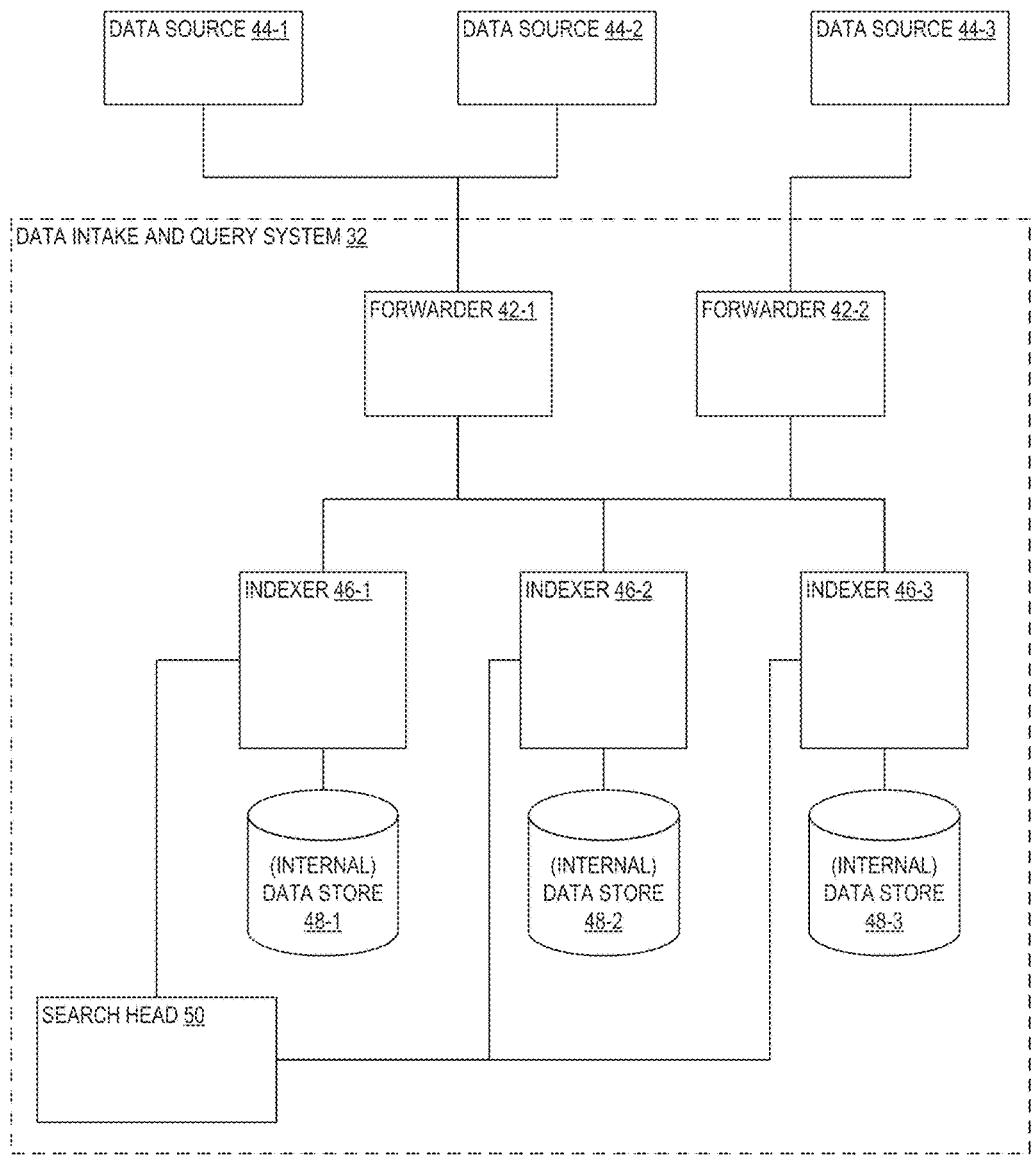
FIG. 4 illustrates a block diagram of an example data intake and query system in which an embodiment may be implemented.

FIG. 4 depicts a block diagram of an exemplary data intake and query system 32, similar to the SPLUNK® ENTERPRISE system. System 32 includes one or more forwarders 42 that receive data from a variety of input data sources 44, and one or more indexers 46 that process and store the data in one or more data stores 48 (internal data stores). These forwarders and indexers can comprise separate computer systems, or may alternatively comprise separate processes executing on one or more computer systems.

Each data source 44 broadly represents a distinct source of data that can be consumed by a system 32. Examples of a data source 44 include, without limitation, data files, directories of files, data sent over a network, event logs, registries, etc.

During operation, the forwarders 42 identify which indexers 46 receive data collected from a data source 44 and forward the data to the appropriate indexers 46. Forwarders 42 can also perform operations on the data before forwarding, including removing extraneous data, detecting timestamps in the data, parsing data, indexing data, routing data based on criteria relating to the data being routed, and/or performing other data transformations.

In an embodiment, a forwarder 42 may comprise a service accessible to client devices 28 and host devices 30 via a network 34. For example, one type of forwarder 42 may be capable of consuming vast amounts of real-time data from a potentially large number of client devices 28 and/or host devices 30. The forwarder 42 may, for example, comprise a computing device which implements multiple data pipelines or "queues" to handle forwarding of network data to indexers 46. A forwarder 42 may also perform many of the functions that are performed by an indexer. For example, a forwarder 42 may perform keyword extractions on raw data or parse raw data to create events. A forwarder 42 may generate time stamps for events.

Additionally or alternatively, a forwarder 42 may perform routing of events to indexers. Data store 48 may contain events derived from machine data from a variety of sources all pertaining to the same component in an IT environment, and this data may be produced by the machine in question or by other components in the IT environment. The data intake and query system 32 also include a search head 50, which will be described in greater details further below.

3.5. Data Ingestion

Figure 5:
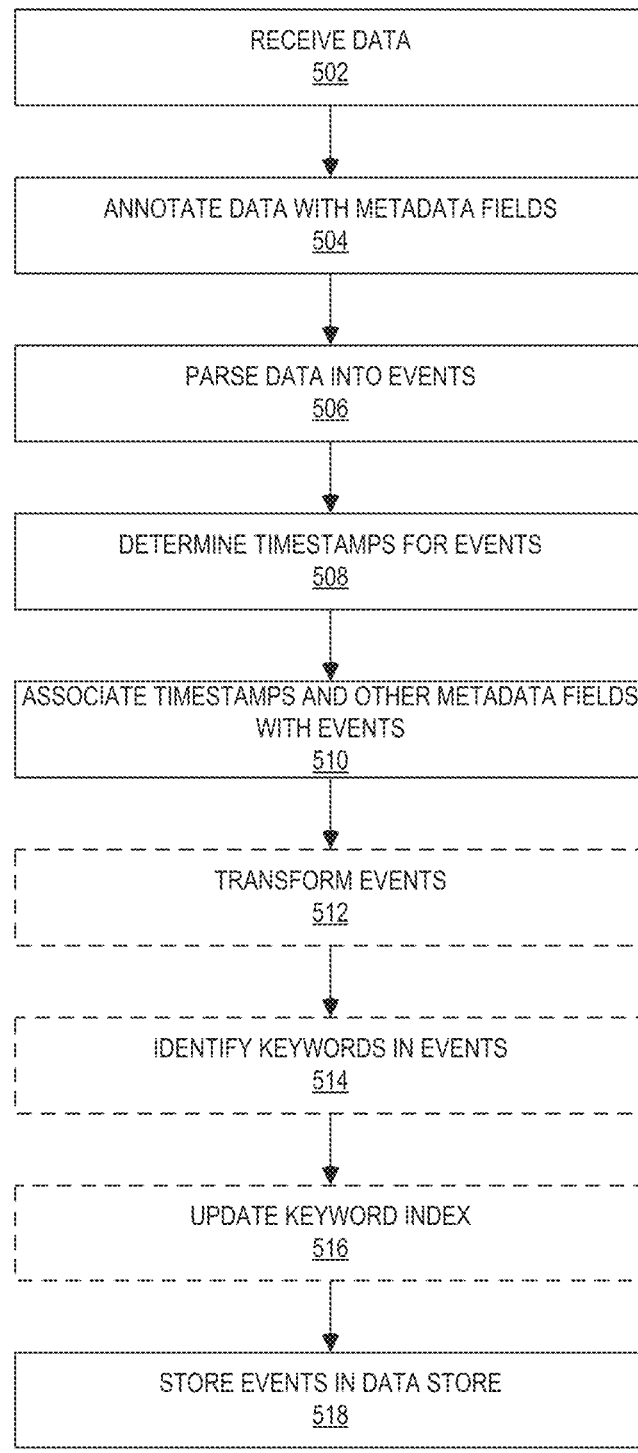
FIG. 5 is a flow diagram that illustrates how indexers process, index, and store data received from forwarders according to some embodiments of the present disclosure.

FIG. 5 depicts a flow chart illustrating an example data flow performed by data intake and query system 32, in accordance with the disclosed embodiments. The data flow illustrated in FIG. 5 is provided for illustrative purposes only; those skilled in the art would understand that one or more of the steps of the processes illustrated in FIG. 5 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

3.5.1. Input

In step 502, a forwarder receives data from an input source, such as a data source 44 shown in FIG. 4. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

In step 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

3.5.2. Parsing

In step 506, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

In step 508, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

In step 510, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom field as defined by a user. Similar to the metadata fields associated with the data blocks at block 504, the default metadata fields associated with each event may include a host, source, and source type field including or in addition to a field storing the timestamp.

In step 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

3.5.3. Indexing

In steps 514 and 516, an indexer can optionally generate a keyword index to facilitate fast keyword searching for event data. To build a keyword index, in step 514, the indexer identifies a set of keywords in each event. In step 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

In step 518, the indexer stores the events with an associated timestamp in a data store 48. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 46 may be responsible for storing and searching a subset of the events contained in a corresponding data store 48. By distributing events among the indexers and data stores, the indexers can analyze events for a query in parallel. For example, using map-reduce techniques, each indexer returns partial search results for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY," filed on 30 Apr. 2014, and in U.S. patent application Ser. No. 14/266,817, entitled "MULTI-SITE CLUSTERING," also filed on 30 Apr. 2014, each of which is hereby incorporated by reference in its entirety for all purposes.

3.6. Query Processing

Figure 6:
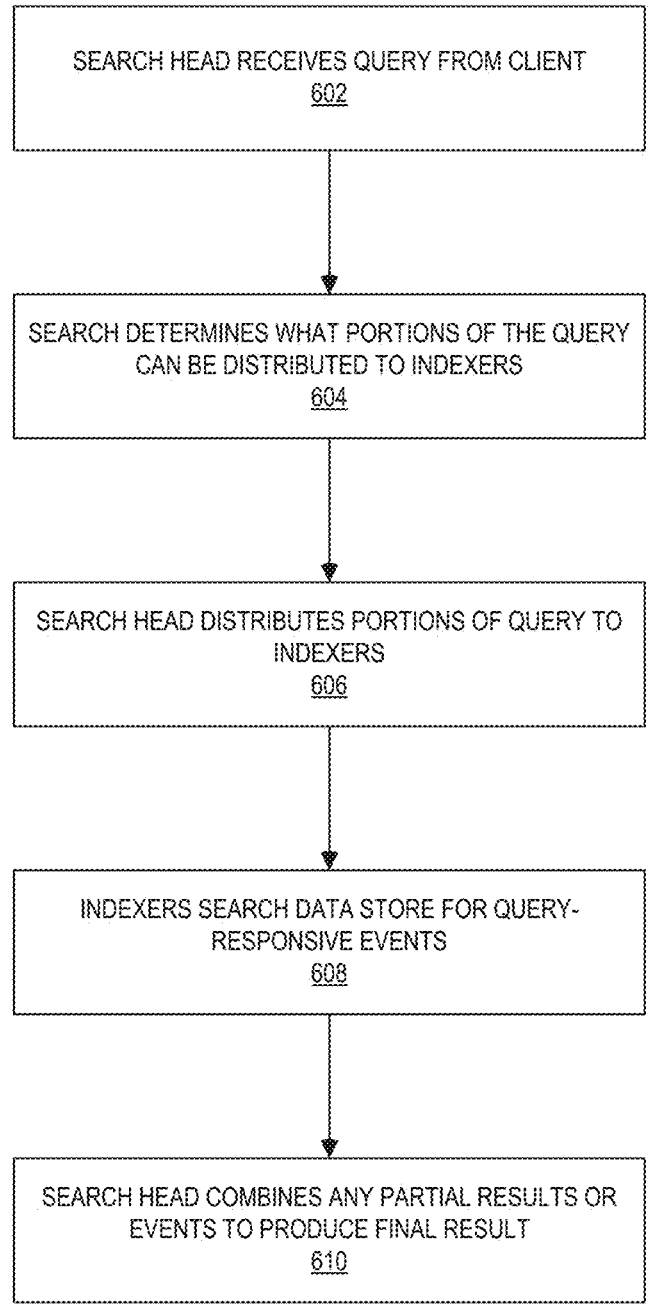
FIG. 6 is a flow diagram that illustrates how a search head and indexers perform a search query according to some embodiments of the present disclosure.

FIG. 6 is a flow diagram that illustrates an exemplary process that a search head and one or more indexers may perform during a search query. In step 602, a search head receives a search query from a client. In step 604, the search head analyzes the search query to determine what portion(s) of the query can be delegated to indexers and what portions of the query can be executed locally by the search head. In step 606, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a lead search head (also known as a cluster leader, not shown in Fig.) that provides the search head with a list of indexers to which the search head can distribute the determined portions of the query. The leader maintains a list of active indexers and can also designate which indexers may have responsibility for responding to queries over certain sets of events. A search head may communicate with the leader before the search head distributes queries to indexers to discover the addresses of active indexers.

In step 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at step 608 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

In step 610, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 32 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

3.7. Field Extraction

Referring back to FIG. 4, the search head 50 allows users to search and visualize event data extracted from raw machine data received from homogenous data sources. It also allows users to search and visualize event data extracted from raw machine data received from heterogeneous data sources. The search head 50 includes various mechanisms, which may additionally reside in an indexer 46, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "I" operates on the results produced by the first command, and so on for additional commands. Other query languages, such as the Structured Query Language ("SQL"), can be used to create a query.

In response to receiving the search query, search head 50 uses extraction rules to extract values for the fields associated with a field or fields in the event data being searched. The search head 50 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 50 can apply the extraction rules to event data that it receives from indexers 46. Indexers 46 may apply the extraction rules to events in an associated data store 48. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 7:
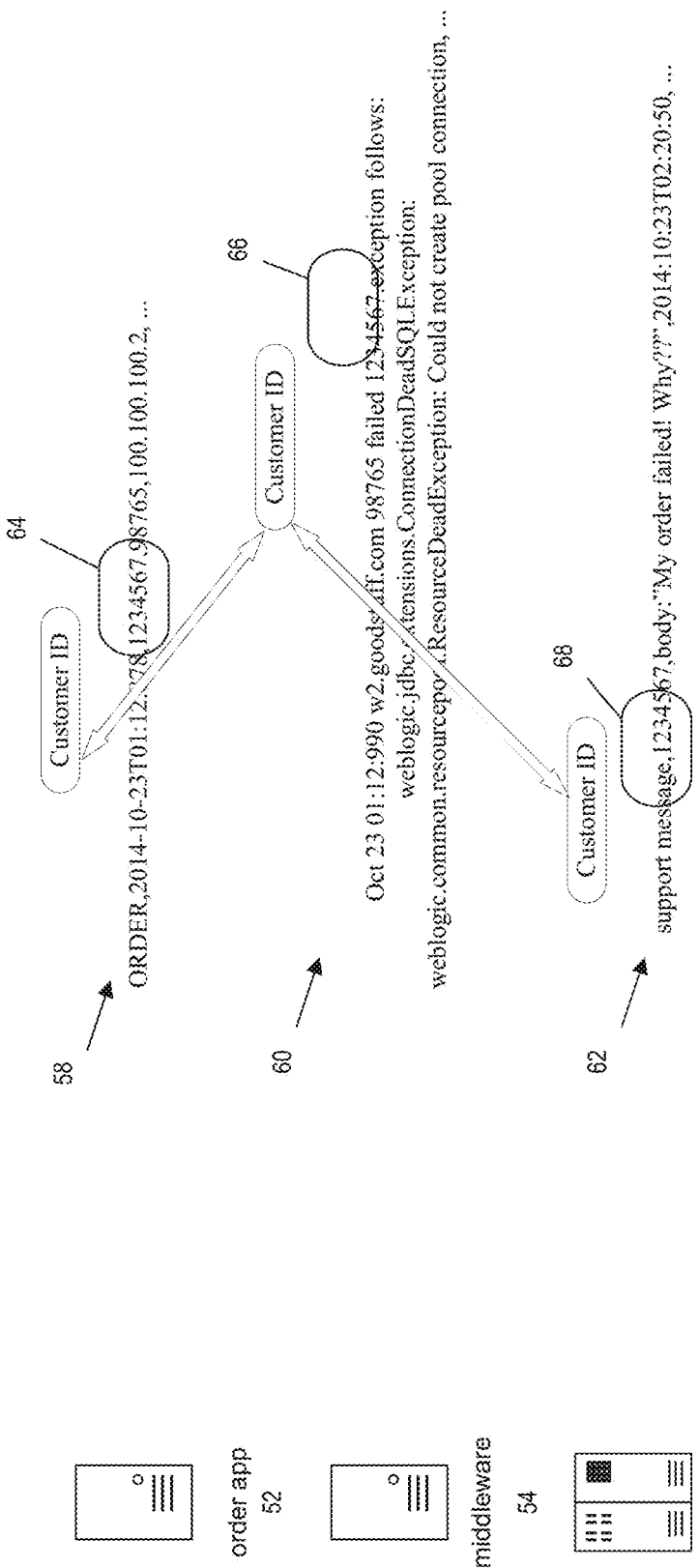
FIG. 7 illustrates a scenario where a common customer ID is found among log data received from three disparate sources according to some embodiments of the present disclosure.

FIG. 7 illustrates an example of raw machine data received from disparate data sources. In this example, a user submits an order for merchandise using a vendor's shopping application program 52 running on the user's system. In this example, the order was not delivered to the vendor's server due to a resource exception at the destination server that is detected by the middleware code 54. The user then sends a message to the customer support 56 to complain about the order failing to complete. The three systems 52, 54, and 56 are disparate systems that do not have a common logging format. The order application 52 sends log data 58 to the SPLUNK® ENTERPRISE system in one format, the middleware code 54 sends error log data 60 in a second format, and the support server 56 sends log data 62 in a third format.

Using the log data received at one or more indexers 46 from the three systems, the vendor can uniquely obtain an insight into user activity, user experience, and system behavior. The search head 50 allows the vendor's administrator to search the log data from the three systems that one or more indexers 46 are responsible for searching, thereby obtaining correlated information, such as the order number and corresponding customer ID number of the person placing the order. The system also allows the administrator to see a visualization of related events via a user interface. The administrator can query the search head 50 for customer ID field value matches across the log data from the three systems that are stored at the one or more indexers 46. The customer ID field value exists in the data gathered from the three systems, but the customer ID field value may be located in different areas of the data given differences in the architecture of the systems—there is a semantic relationship between the customer ID field values generated by the three systems. The search head 50 requests event data from the one or more indexers 46 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 64, 66, and 68, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

3.8. Example Search Screen

Figure 8A:
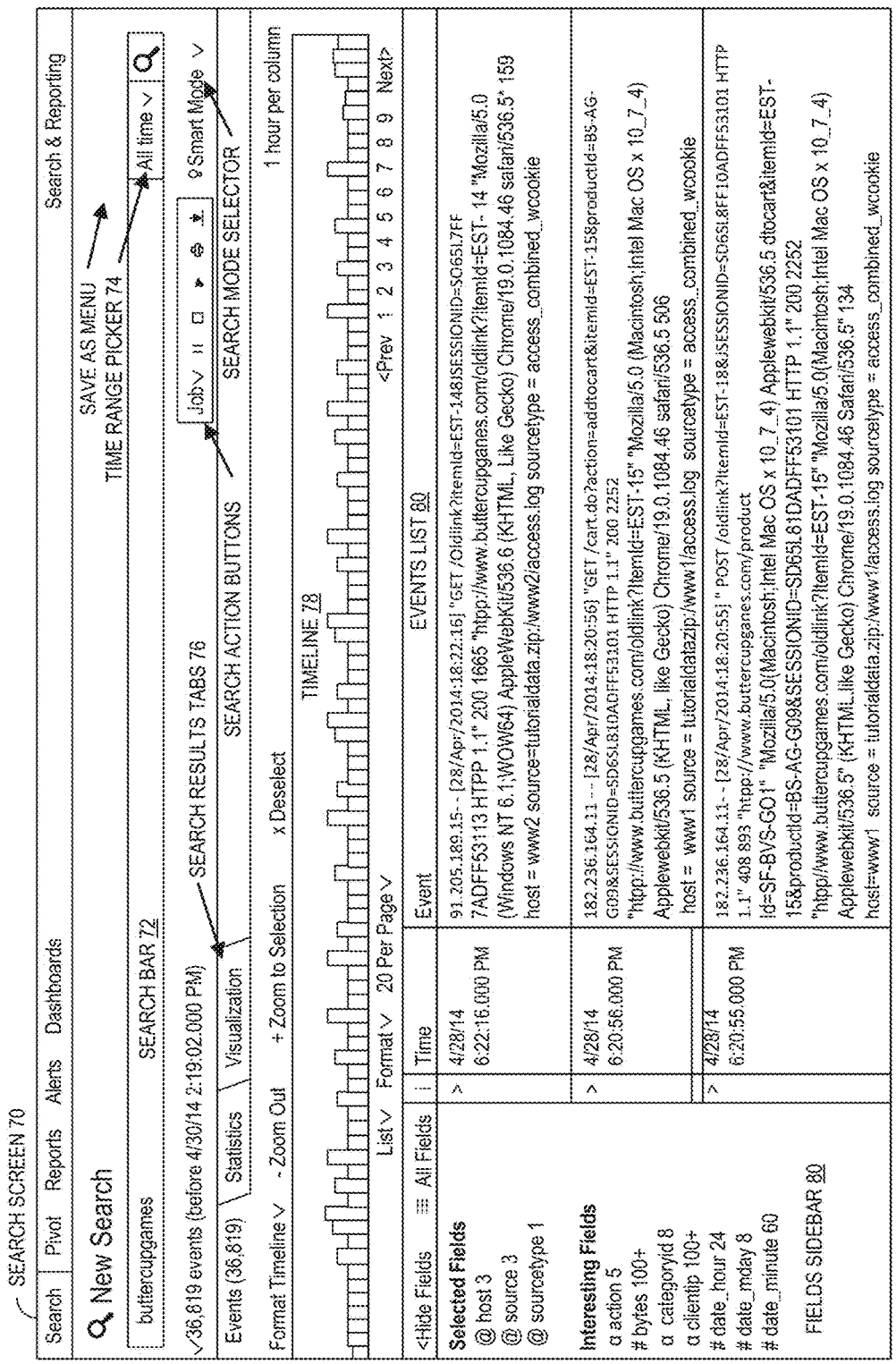
FIG. 8A illustrates a search screen according to some embodiments of the present disclosure.

FIG. 8A illustrates an example search screen 70 in accordance with the disclosed embodiments. Search screen 70 includes a search bar 72 that accepts user input in the form of a search string. It also includes a time range picker 74 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 70 also initially displays a "data summary" dialog as is illustrated in FIG. 8B that enables the user to select different sources for the event data, such as by selecting specific hosts and log files.

After the search is executed, the search screen 70 in FIG. 8A can display the results through search results tabs 76, wherein search results tabs 76 includes: an "events tab" that displays various information about events returned by the search; a "statistics tab" that displays statistics about the search results; and a "visualization tab" that displays various visualizations of the search results. The events tab illustrated in FIG. 8A displays a timeline graph 78 that graphically illustrates the number of events that occurred in one-hour intervals over the selected time range. It also displays an events list 80 that enables a user to view the raw data in each of the returned events. It additionally displays a fields sidebar 82 that includes statistics about occurrences of specific fields in the returned events, including "selected fields" that are pre-selected by the user, and "interesting fields" that are automatically selected by the system based on pre-specified criteria.

3.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH," both issued on 22 Jul. 2014, U.S. Pat. No. 8,983,994, entitled "GENERATION OF A DATA MODEL FOR SEARCHING MACHINE DATA," issued on 17 Mar., 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES," filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 32 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA," filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 9A-9D, 14, and 15 illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 14:
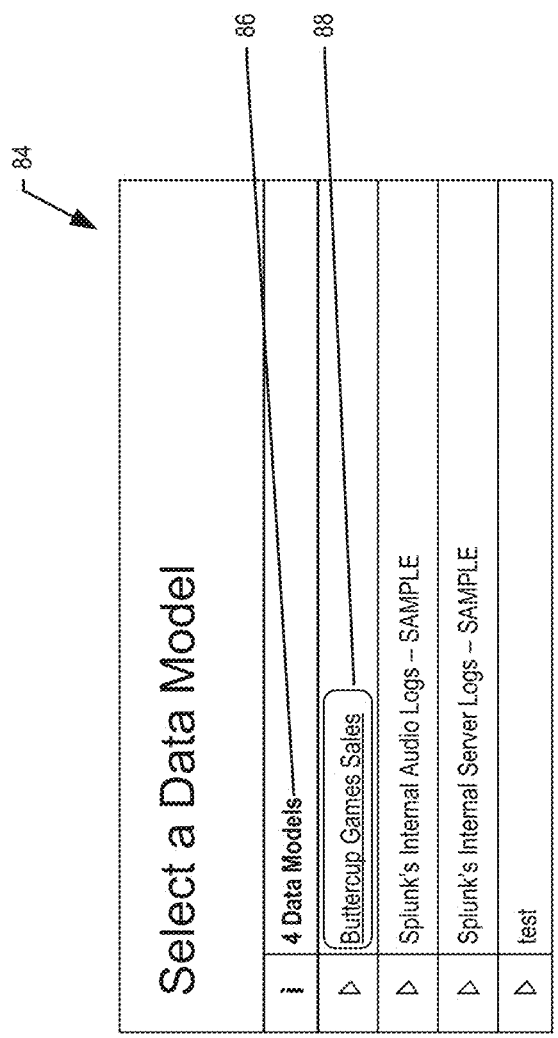
FIG. 14 illustrates a user interface screen for an example data model-driven report generation interface according to some embodiments of the present disclosure.

The selection of a data model object for use in driving a report generation may be facilitated by a data model object selection interface. FIG. 14 illustrates an example interactive data model selection graphical user interface 84 of a report editor that displays a listing of available data models 86. The user may select one of the data models 88.

Figure 15:
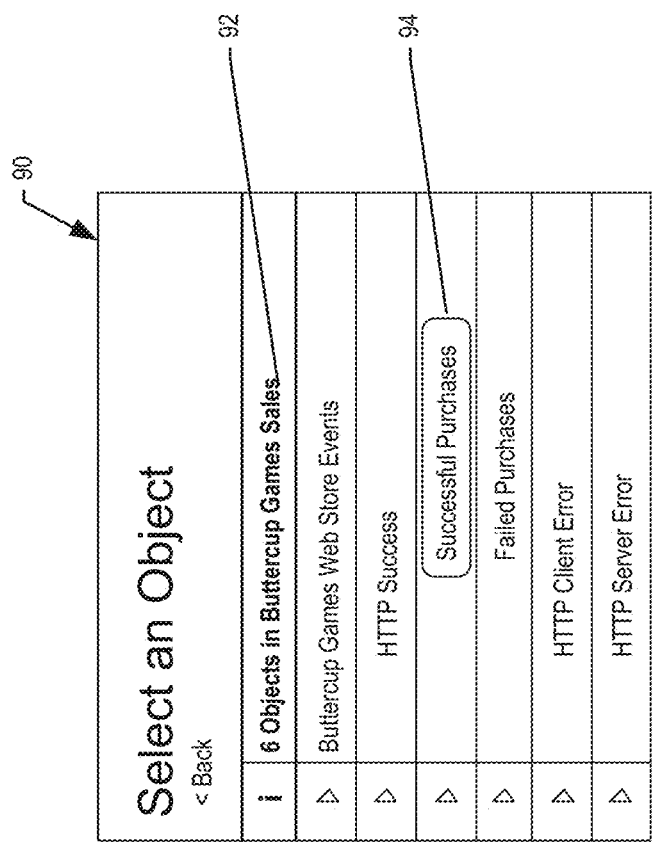
FIG. 15 illustrates a user interface screen for an example data model-driven report generation interface according to some embodiments of the present disclosure.

FIG. 15 illustrates an example data model object selection graphical user interface 90 that displays available data objects 92 for the selected data object model 1202. The user may select one of the displayed data model objects 94 for use in driving the report generation process.

Figure 9A:
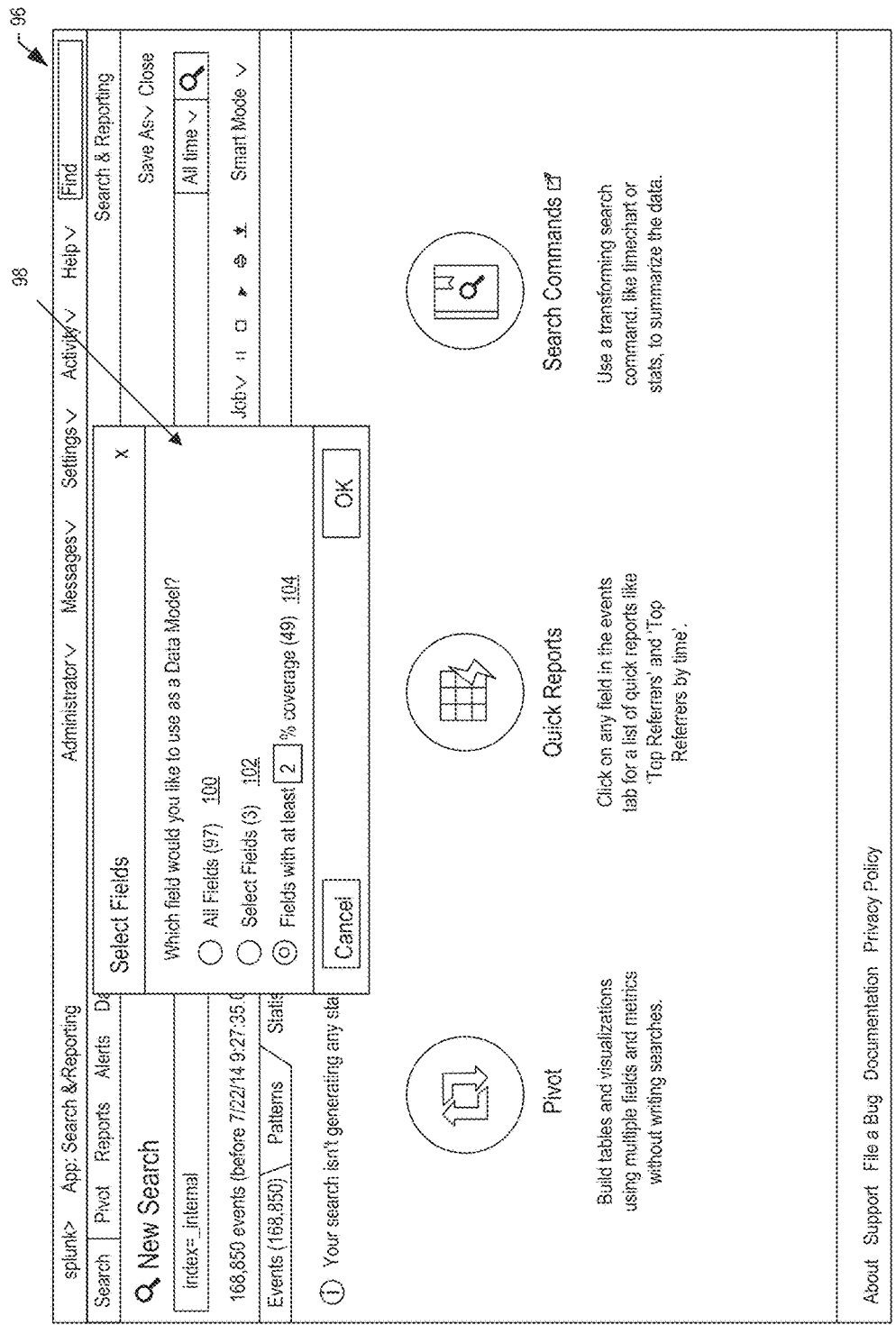
FIG. 9A illustrates a user interface screen for an example data model-driven report generation interface according to some embodiments of the present disclosure.

Once a data model object is selected by the user, a user interface screen 96 shown in FIG. 9A may display an interactive listing of automatic field identification options 98 based on the selected data model object. For example, a user may select one of the three illustrated options (e.g., the "All Fields" option 100, the "Selected Fields" option 102, or the "Coverage" option (e.g., fields with at least a specified % of coverage) 104). If the user selects the "All Fields" option 100, all of the fields identified from the events that were returned in response to an initial search query may be selected. That is, for example, all of the fields of the identified data model object fields may be selected. If the user selects the "Selected Fields" option 102, only the fields from the fields of the identified data model object fields that are selected by the user may be used. If the user selects the "Coverage" option 104, only the fields of the identified data model object fields meeting a specified coverage criteria may be selected. A percent coverage may refer to the percentage of events returned by the initial search query that a given field appears in.

Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option.

For example, "97" displayed next to the "All Fields" option 100 indicates that 97 fields will be selected if the "All Fields" option is selected. The "3" displayed next to the "Selected Fields" option 102 indicates that 3 of the 97 fields will be selected if the "Selected Fields" option is selected. The "49" displayed next to the "Coverage" option 104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 9B:
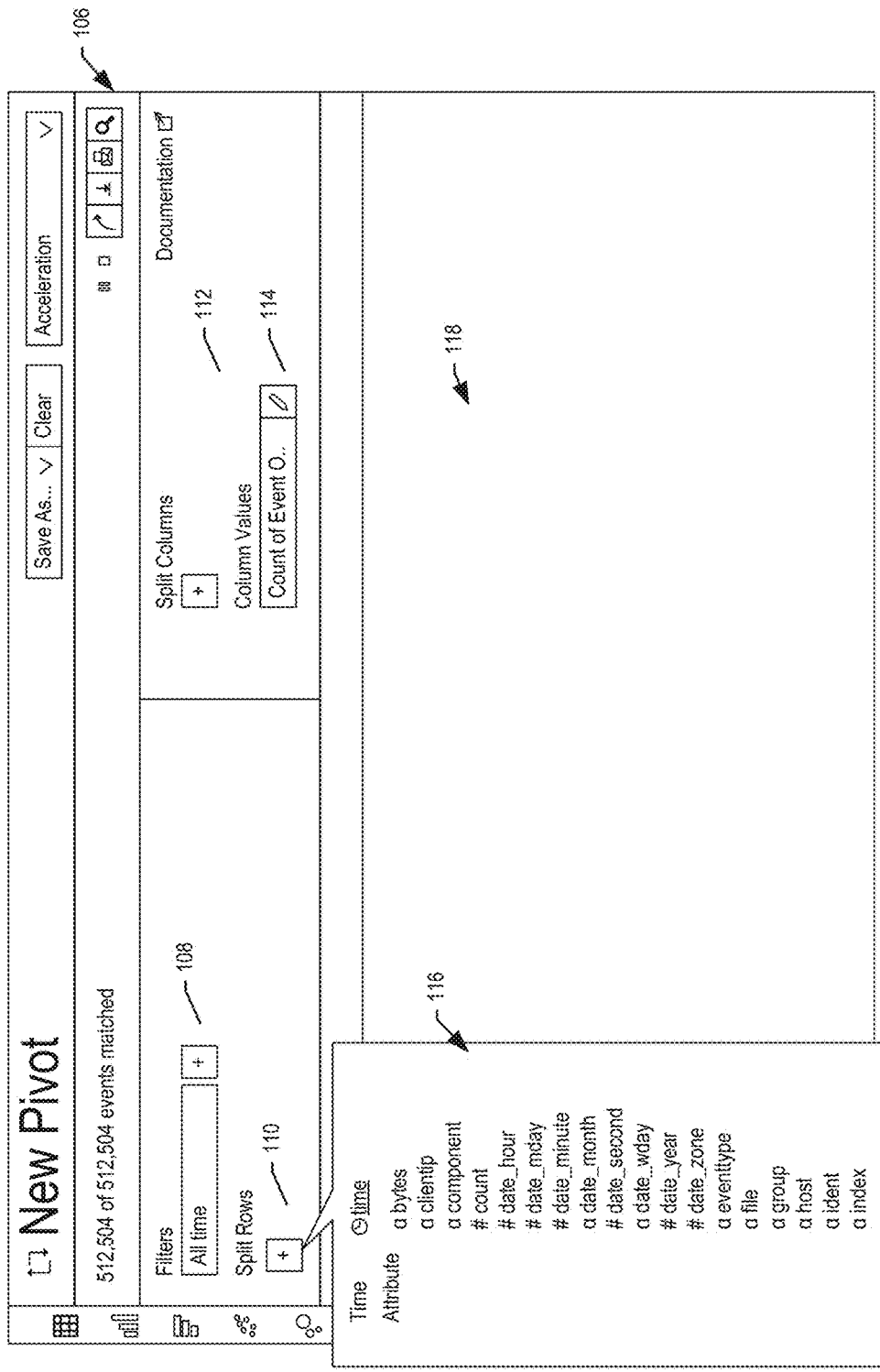
FIG. 9B illustrates a user interface screen for an example data model-driven report generation interface according to some embodiments of the present disclosure.
Figure 9C:
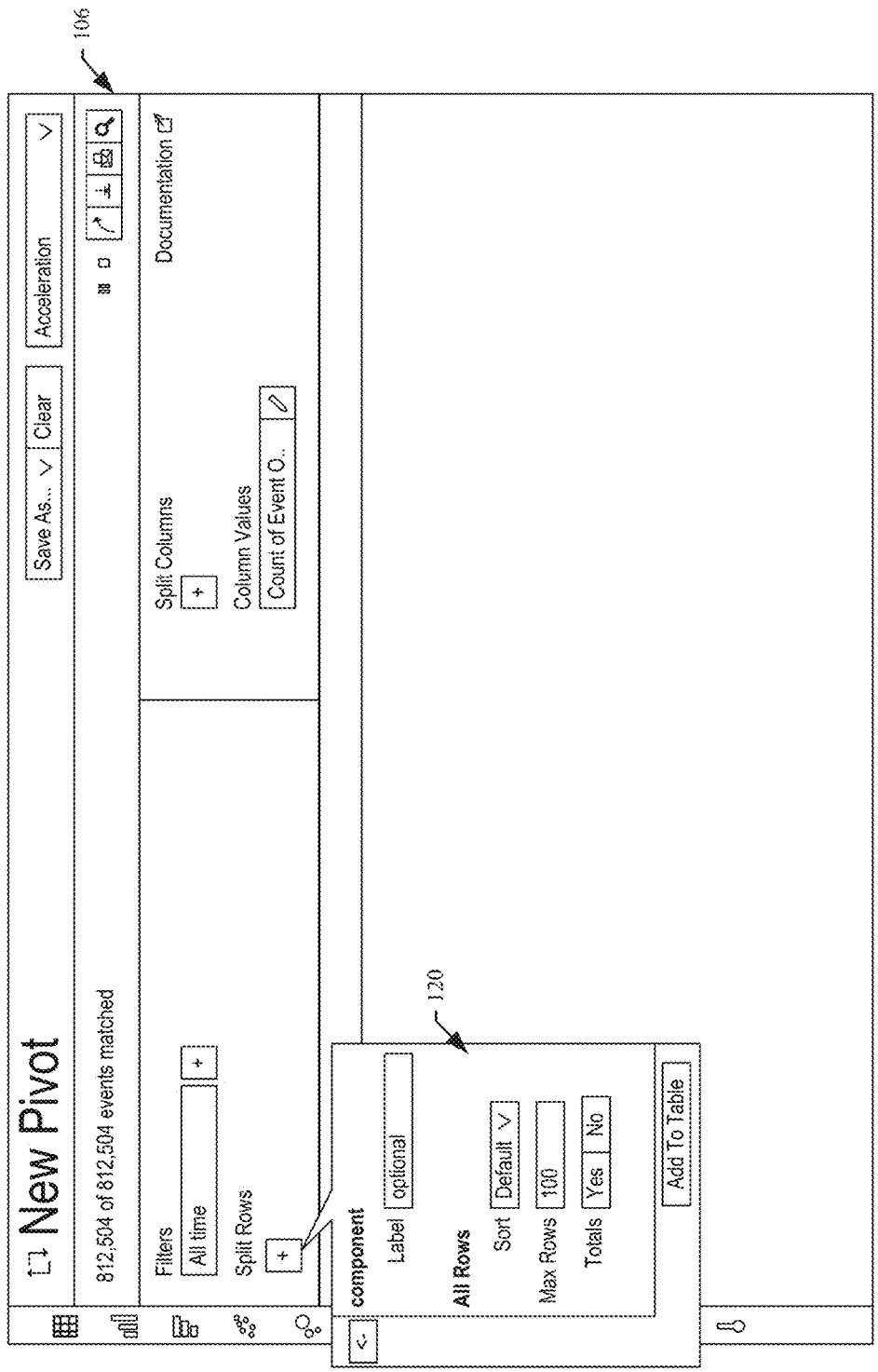
FIG. 9C illustrates a user interface screen for an example data model-driven report generation interface according to some embodiments of the present disclosure.

FIG. 9B illustrates an example graphical user interface screen (also called the pivot interface) 106 displaying the reporting application's "Report Editor" page. The screen may display interactive elements for defining various elements of a report. For example, the page includes a "Filters" element 108, a "Split Rows" element 110, a "Split Columns" element 112, and a "Column Values" element 114. The page may include a list of search results 118. In this example, the Split Rows element 110 is expanded, revealing a listing of fields 116 that can be used to define additional criteria (e.g., reporting criteria). The listing of fields 116 may correspond to the selected fields (attributes). That is, the listing of fields 116 may list only the fields previously selected, either automatically and/or manually by a user. FIG. 9C illustrates a formatting dialogue 120 that may be displayed upon selecting a field from the listing of fields 110. The dialogue can be used to format the display of the results of the selection (e.g., label the column to be displayed as "component").

Figure 9D:
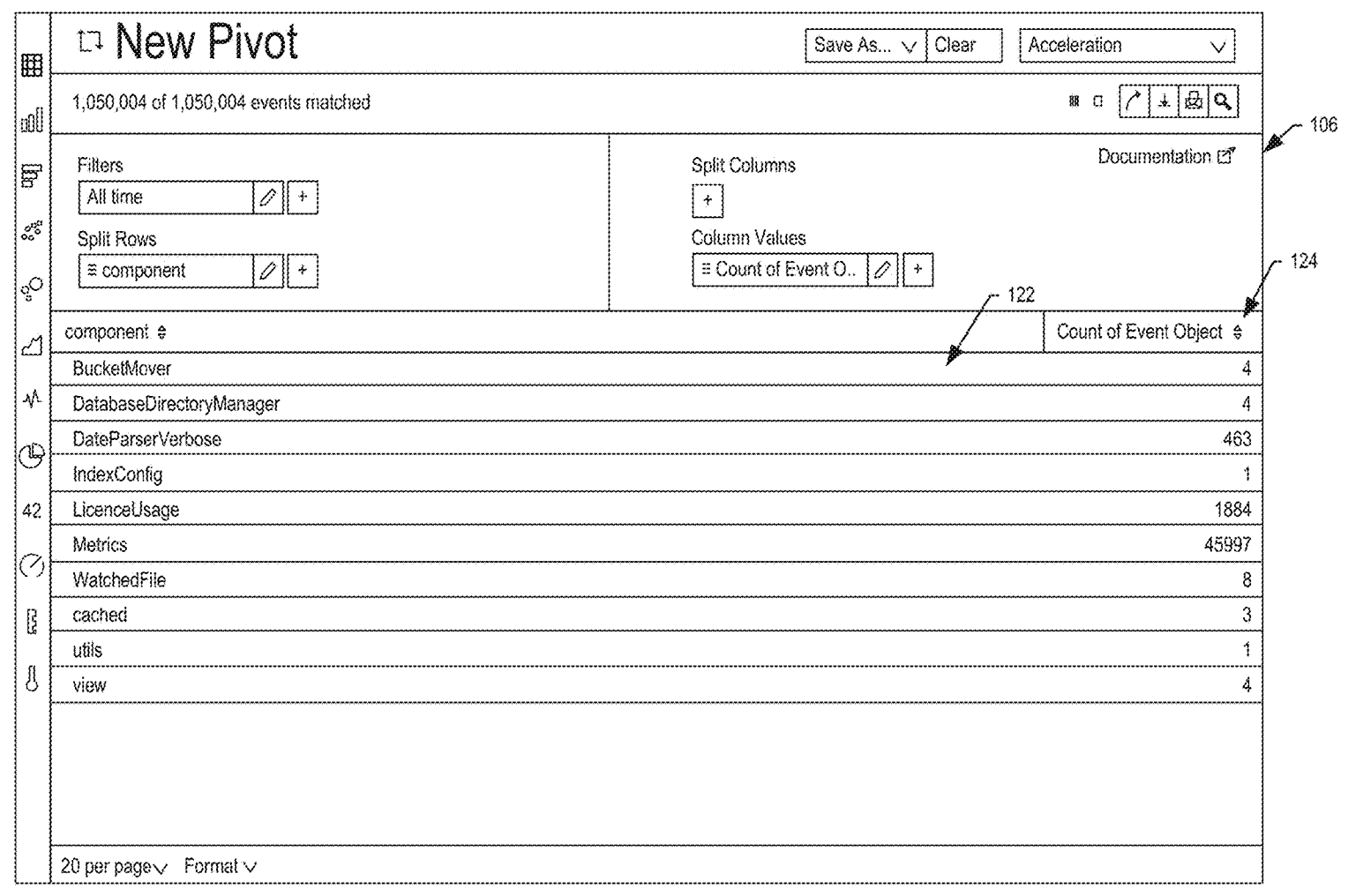

FIG. 9D illustrates an example graphical user interface screen 106 including a table of results 122 based on the selected criteria including splitting the rows by the "component" field. A column 124 having an associated count for each component listed in the table may be displayed that indicates an aggregate count of the number of times that the particular field-value pair (e.g., the value in a row) occurs in the set of events responsive to the initial search query.

Figure 16:
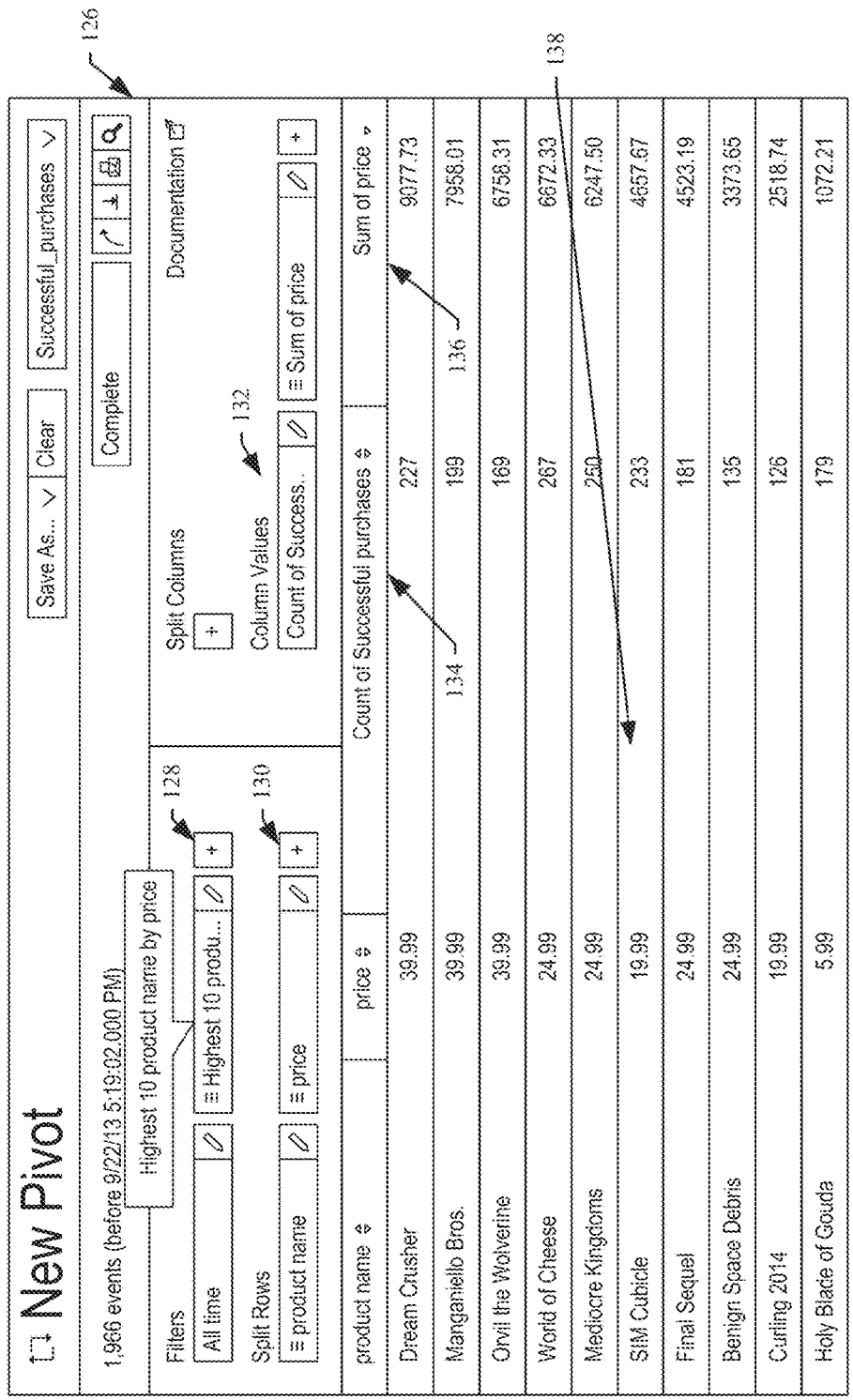
FIG. 16 illustrates a user interface screen for an example data model-driven report generation interface according to some embodiments of the present disclosure.

FIG. 16 illustrates an example graphical user interface screen 126 that allows the user to filter search results and to perform statistical analysis on values extracted from specific fields in the set of events. In this example, the top ten product names ranked by price are selected as a filter 128 that causes the display of the ten most popular products sorted by price. Each row is displayed by product name and price 130. This results in each product displayed in a column labeled "product name" along with an associated price in a column labeled "price" 136. Statistical analysis of other fields in the events associated with the ten most popular products has been specified as column values 132. A count of the number of successful purchases for each product is displayed in column 134. This statistics may be produced by filtering the search results by the product name, finding all occurrences of a successful purchase in a field within the events and generating a total of the number of occurrences. A sum of the total sales is displayed in column 136, which is a result of the multiplication of the price and the number of successful purchases for each product.

Figure 17:
FIG. 17 illustrates example visualizations generated by a reporting application according to some embodiments of the present disclosure.
Figure 18:
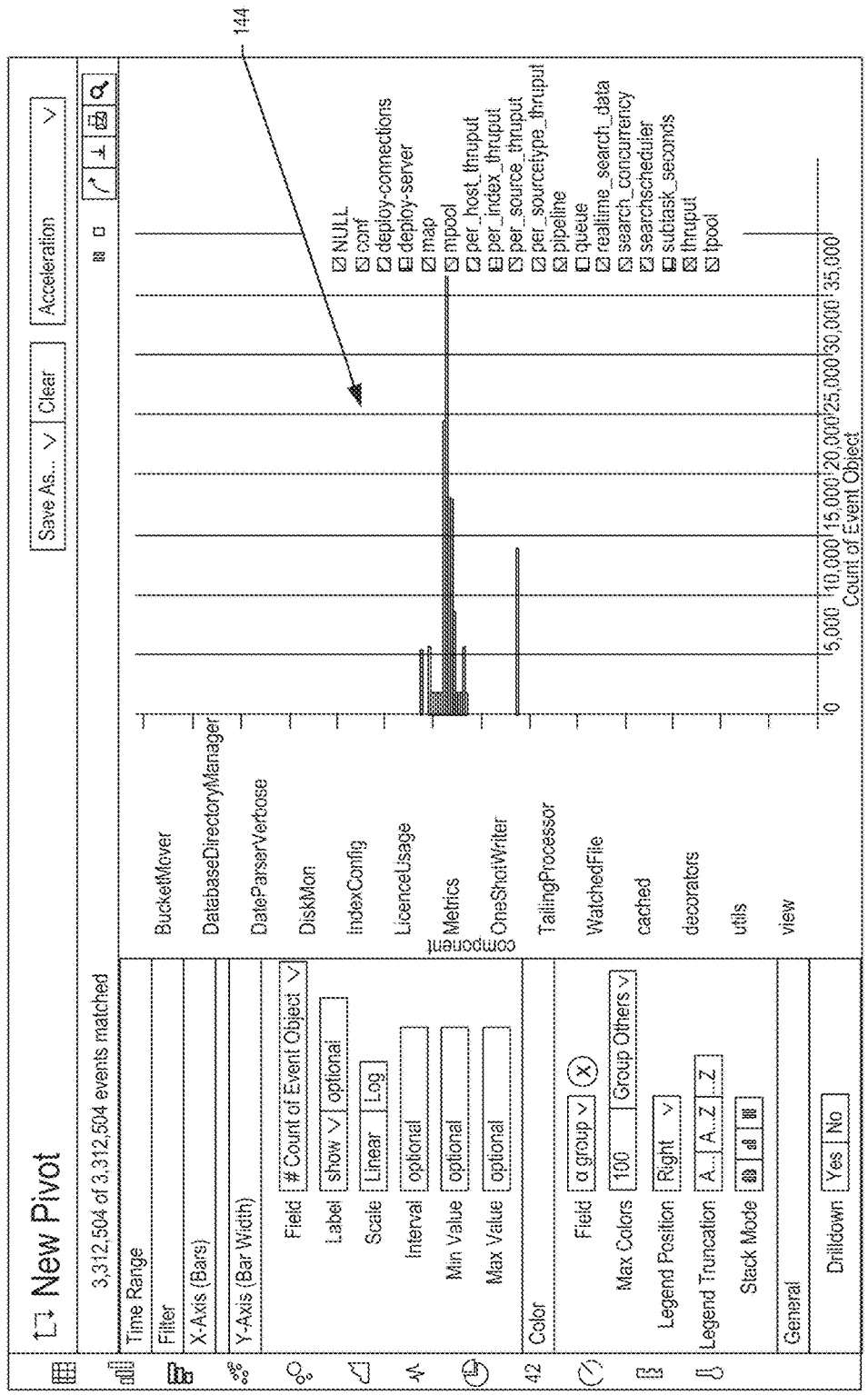
FIG. 18 illustrates example visualizations generated by a reporting application according to some embodiments of the present disclosure.
Figure 19:
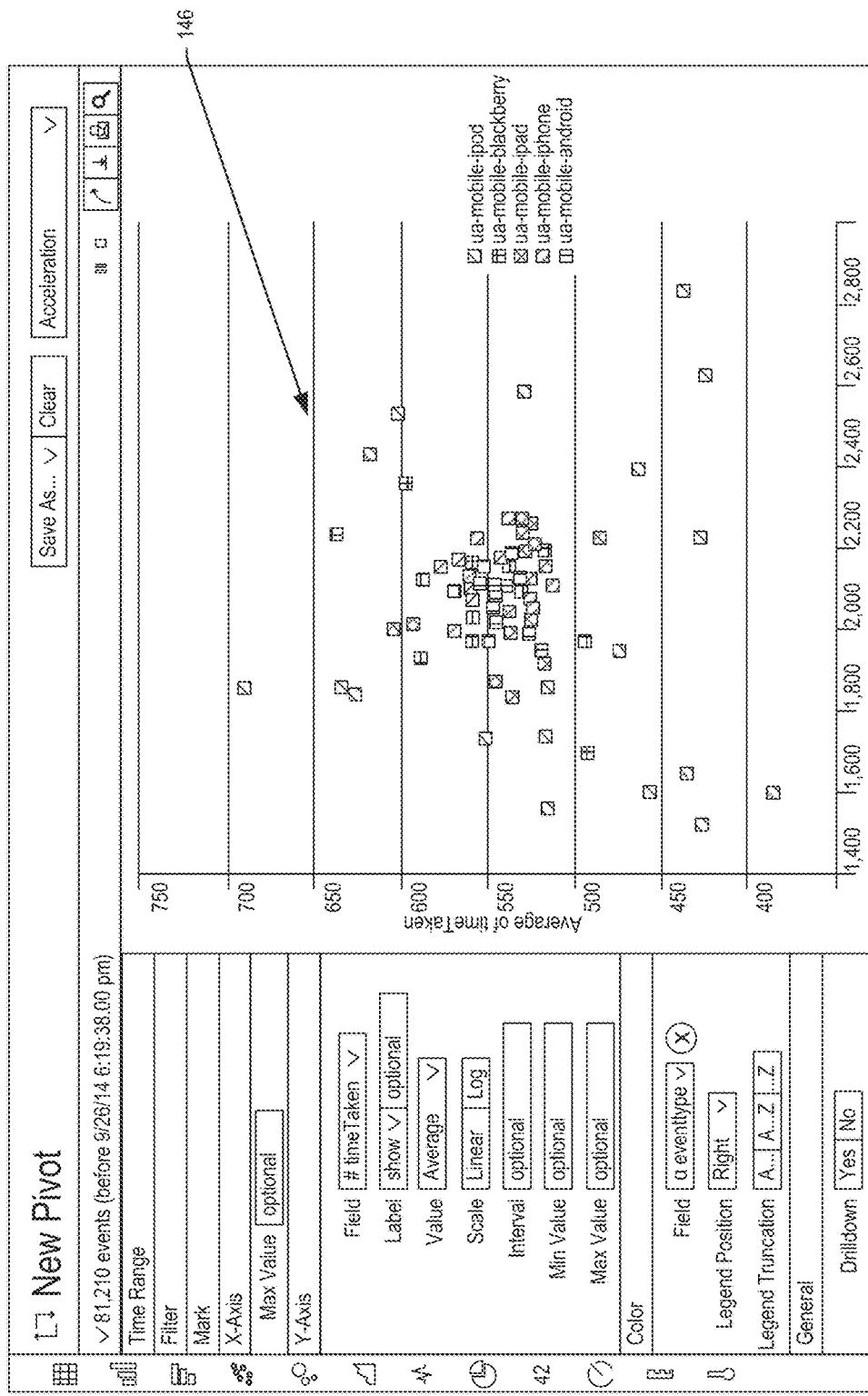
FIG. 19 illustrates example visualizations generated by a reporting application according to some embodiments of the present disclosure.

The reporting application allows the user to create graphical visualizations of the statistics generated for a report. For example, FIG. 17 illustrates an example graphical user interface 140 that displays a set of components and associated statistics 142. The reporting application allows the user to select a visualization of the statistics in a graph (e.g., bar chart, scatter plot, area chart, line chart, pie chart, radial gauge, marker gauge, filler gauge, etc.). FIG. 18 illustrates an example of a bar chart visualization 144 of an aspect of the statistical data 142. FIG. 19 illustrates a scatter plot visualization 146 of an aspect of the statistical data 142.

3.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

3.10.1. Aggregation Technique

Figure 10:
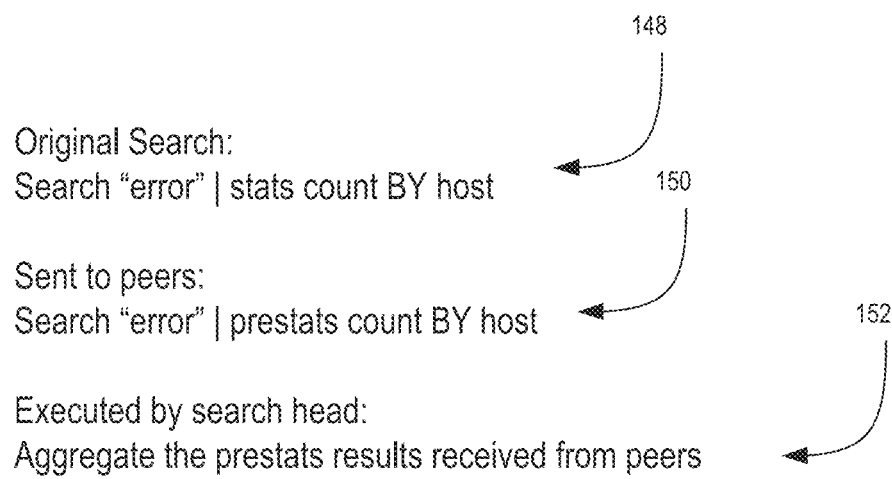
FIG. 10 illustrates an example search query received from a client and executed by search peers according to some embodiments of the present disclosure.

To facilitate faster query processing, a query can be structured such that multiple indexers perform the query in parallel, while aggregation of search results from the multiple indexers is performed locally at the search head. For example, FIG. 10 illustrates how a search query 148 received from a client at a search head 50 can split into two phases, including: (1) subtasks 150 (e.g., data retrieval or simple filtering) that may be performed in parallel by indexers 46 for execution, and (2) a search results aggregation operation 152 to be executed by the search head when the results are ultimately collected from the indexers.

During operation, upon receiving search query 148, a search head 50 determines that a portion of the operations involved with the search query may be performed locally by the search head. The search head modifies search query 148 by substituting "stats" (create aggregate statistics over results sets received from the indexers at the search head) with "prestats" (create statistics by the indexer from local results set) to produce search query 150, and then distributes search query 150 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields.

Moreover, the search head may distribute the full search query to the search peers as illustrated in FIG. 6, or may alternatively distribute a modified version (e.g., a more restricted version) of the search query to the search peers. In this example, the indexers are responsible for producing the results and sending them to the search head. After the indexers return the results to the search head, the search head aggregates the received results 152 to form a single search result set. By executing the query in this manner, the system effectively distributes the computational operations across the indexers while minimizing data transfers.

3.10.2. Keyword Index

As described above with reference to the flow charts in FIG. 5 and FIG. 6, data intake and query system 32 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

3.10.3. High Performance Analytics Store

To speed up certain types of queries, some embodiments of system 32 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field.

This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query.

The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

3.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report.

This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

3.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
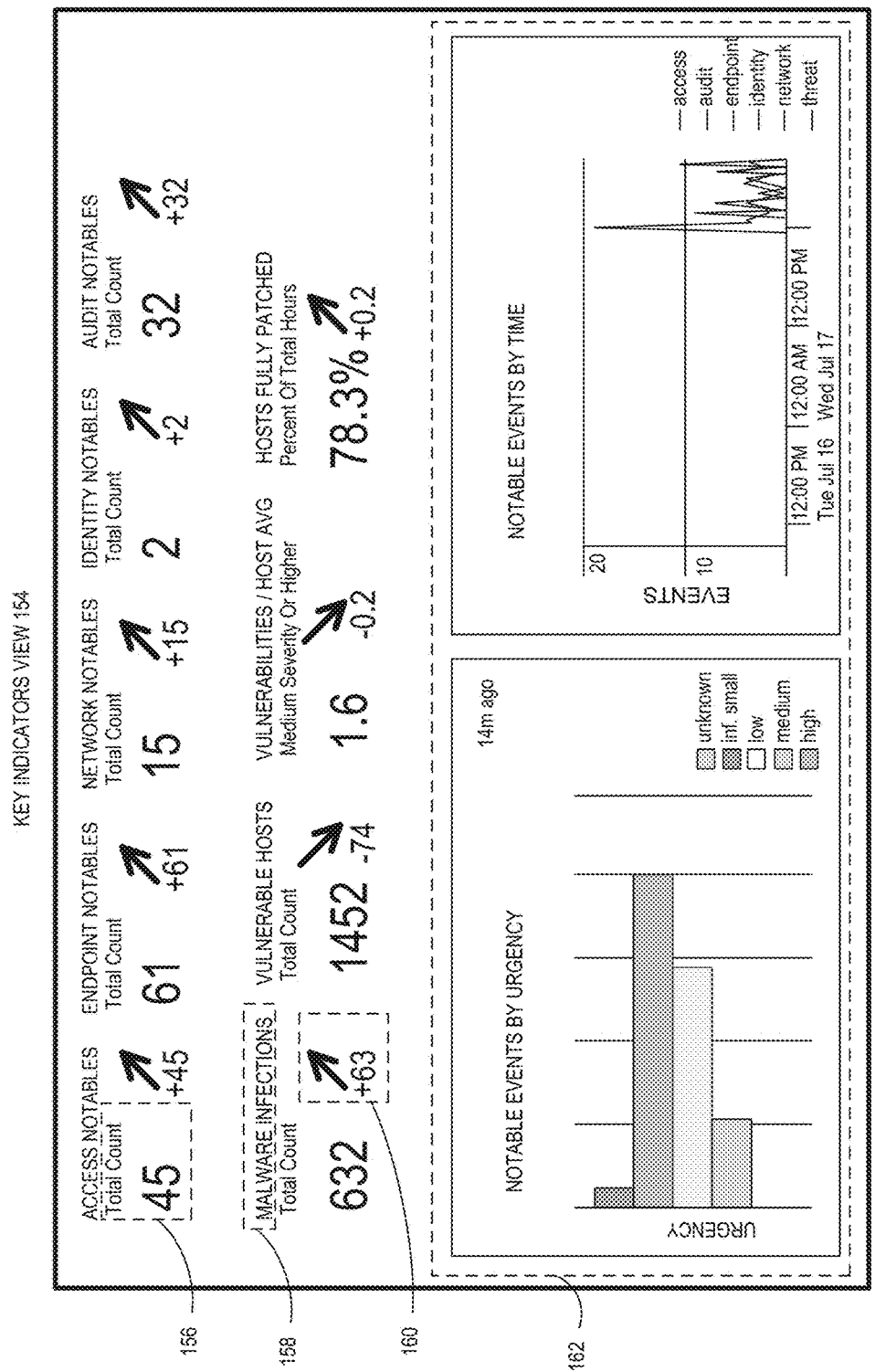
FIG. 11A illustrates a key indicators view according to some embodiments of the present disclosure.

The SPLUNK® APP FOR ENTERPRISE SECURITY provides various visualizations to aid in discovering security threats, such as a "key indicators view" that enables a user to view security metrics, such as counts of different types of notable events. For example, FIG. 11A illustrates an example key indicators view 154 that comprises a dashboard, which can display a value 156, for various security-related metrics, such as malware infections 158. It can also display a change in a metric value 160, which indicates that the number of malware infections increased by 63 during the preceding interval. Key indicators view 154 additionally displays a histogram panel 162 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication.

Figure 11B:
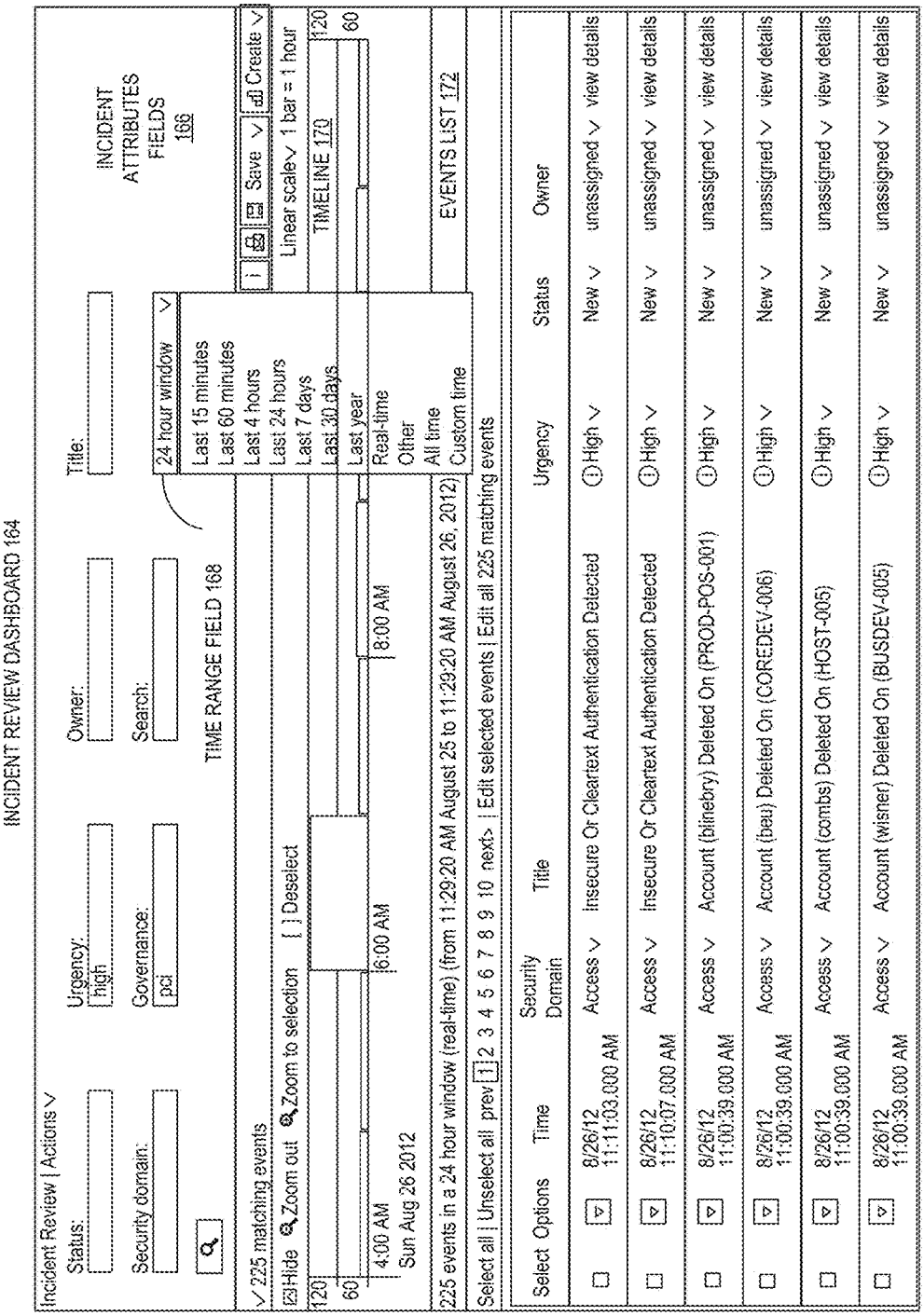
FIG. 11B illustrates an incident review dashboard according to some embodiments of the present disclosure.

For example, FIG. 11B illustrates an example incident review dashboard 164 that includes a set of incident attribute fields 166 that, for example, enables a user to specify a time range field 168 for the displayed events. It also includes a timeline 170 that graphically illustrates the number of incidents that occurred in time intervals over the selected time range. It additionally displays an events list 172 that enables a user to view a list of all of the notable events that match the criteria in the incident attributes fields 166. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

3.12. Data Center Monitoring

As mentioned above, the SPLUNK® ENTERPRISE platform provides various features that simplify the developer's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems).

Figure 11C:
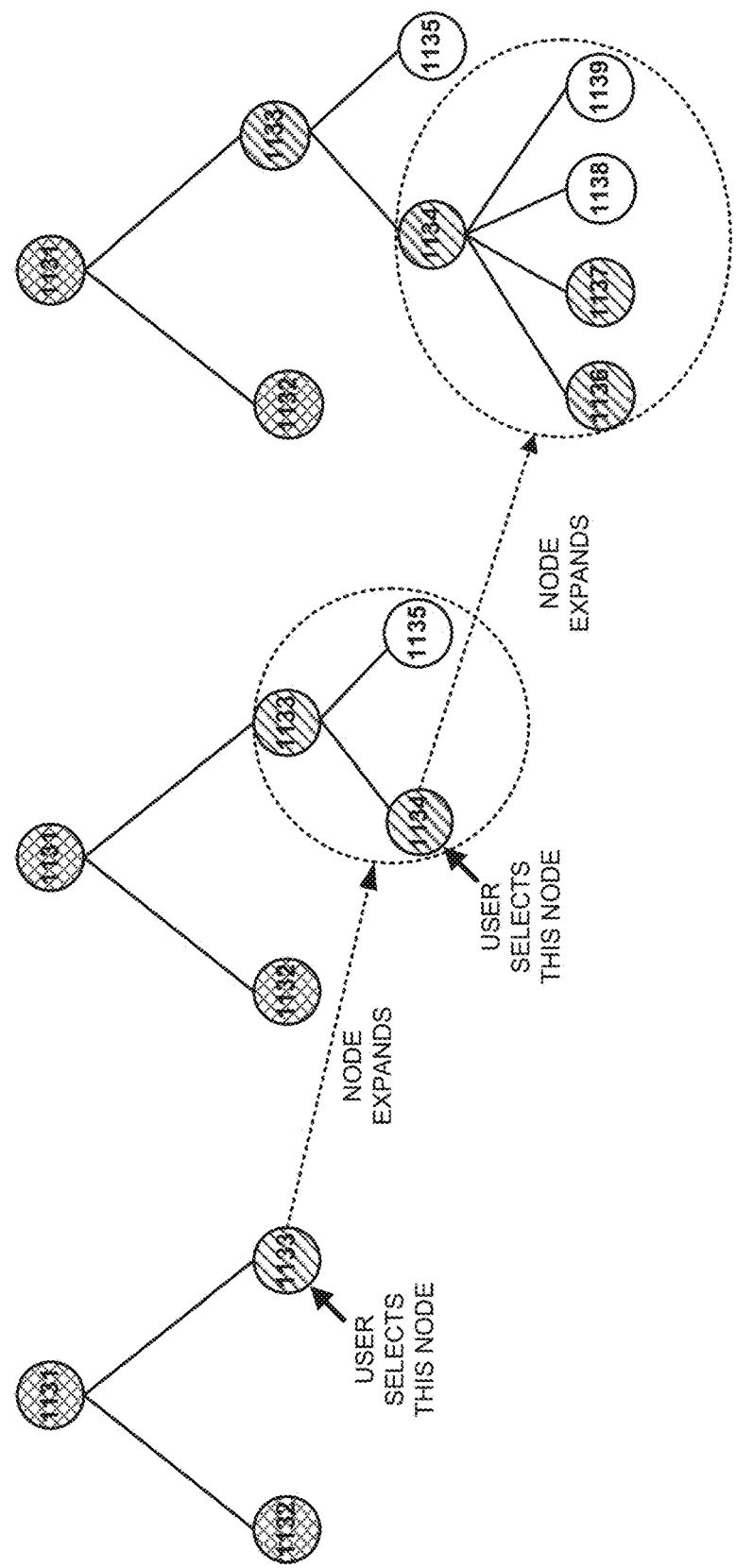
FIG. 11C illustrates a proactive monitoring tree according to some embodiments of the present disclosure.

Example node-expansion operations are illustrated in FIG. 11C, wherein nodes 1133 and 1134 are selectively expanded. Note that nodes 1131-1139 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 11D:
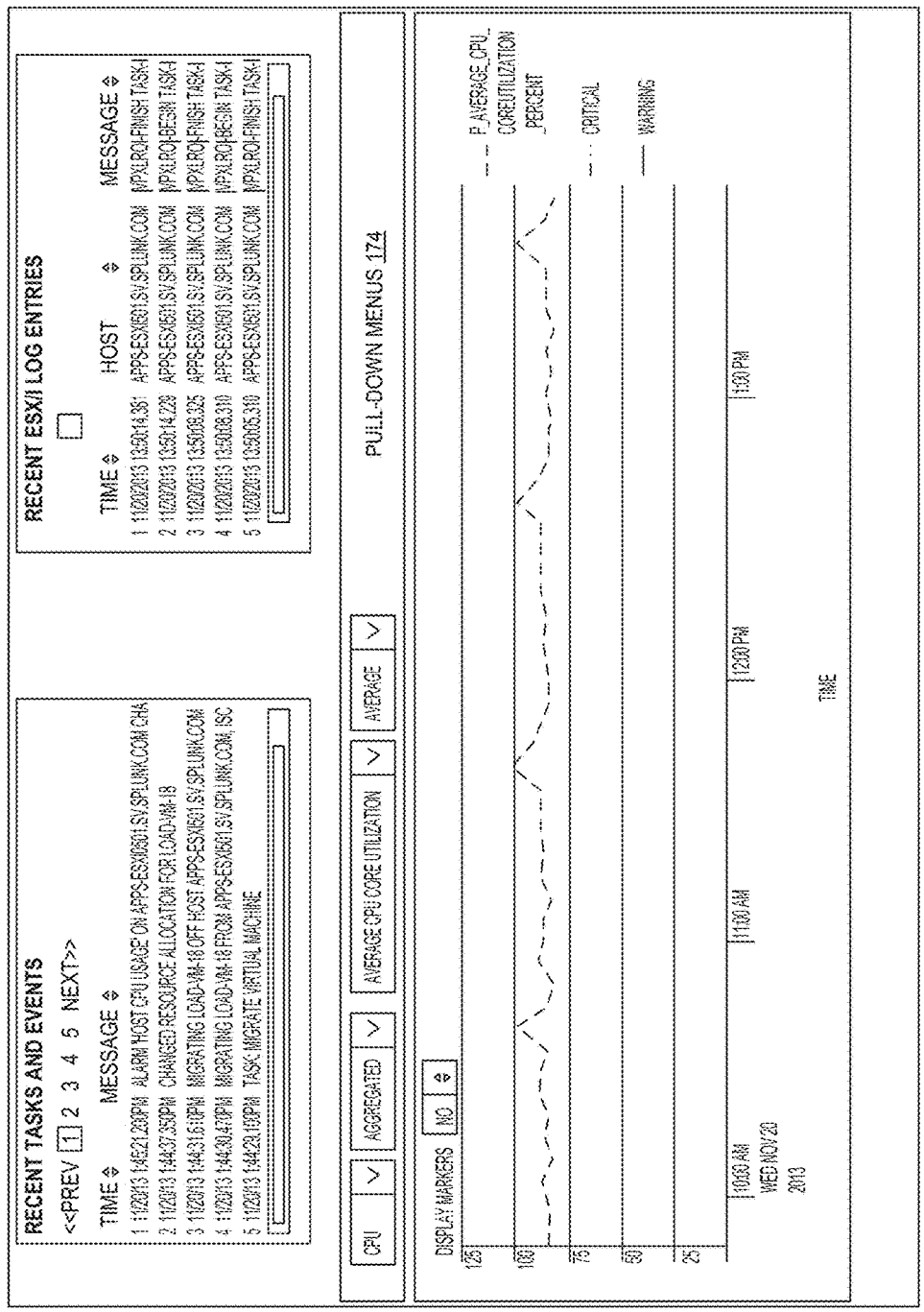
FIG. 11D illustrates a user interface screen displaying both log data and performance data according to some embodiments of the present disclosure.

The SPLUNK® APP FOR VMWARE® also provides a user interface that enables a user to select a specific time range and then view heterogeneous data comprising events, log data, and associated performance metrics for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 174 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT," filed on 29 Jan. 2014, and which is hereby incorporated by reference in its entirety for all purposes.

3.13. Cloud-Based System Overview

The example data intake and query system 32 described in reference to FIG. 5 comprises several system components, including one or more forwarders, indexers, and search heads. In some environments, a user of a data intake and query system 32 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 32 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 32 operate.

In one embodiment, to provide an alternative to an entirely on-premises environment for system 32, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 12:
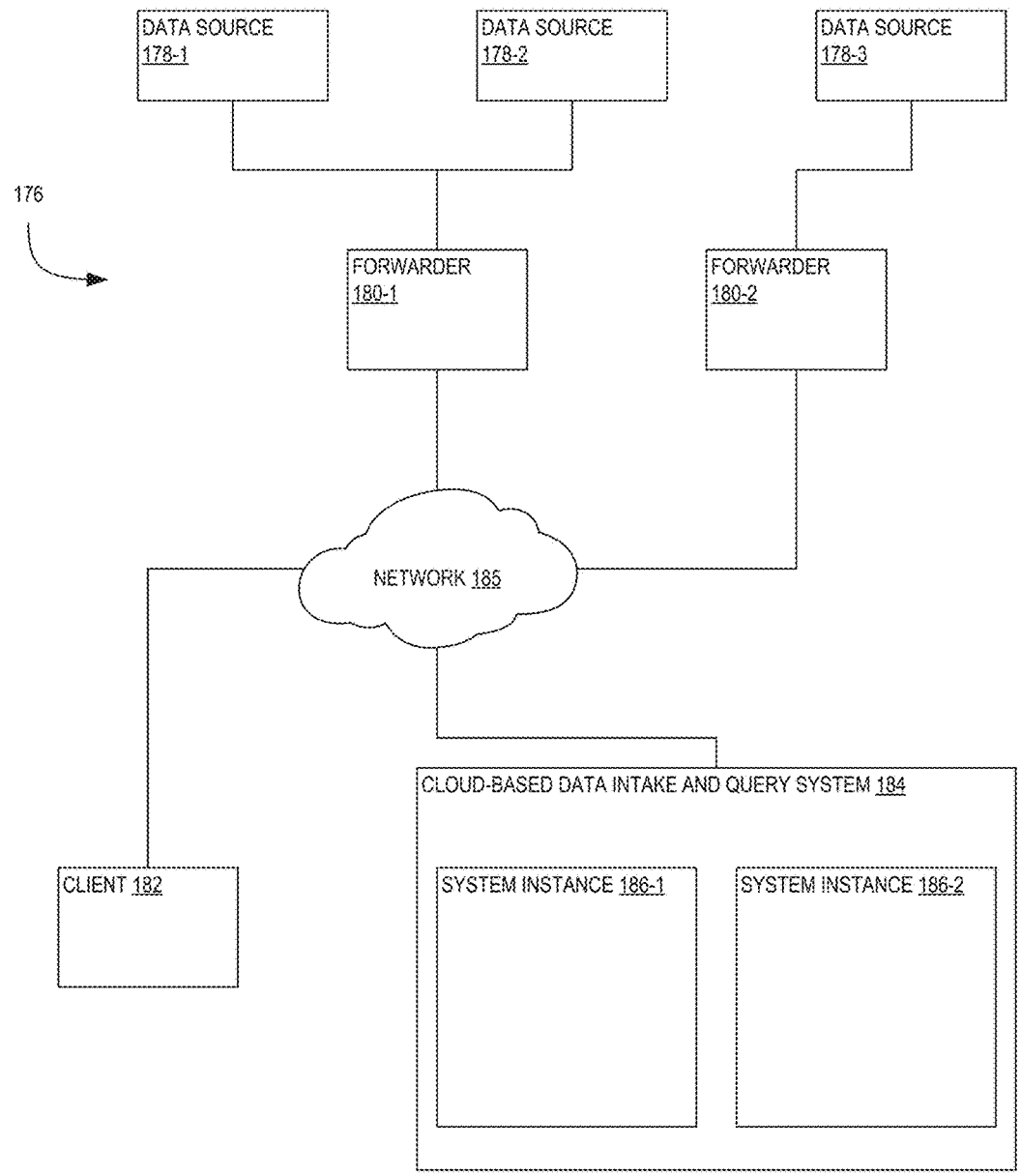
FIG. 12 illustrates a block diagram of an example cloud-based data intake and query system in which an embodiment may be implemented.

FIG. 12 illustrates a block diagram of an example cloud-based data intake and query system. Similar to the system of FIG. 4, the networked computer system 176 includes input data sources 178 and forwarders 180. These input data sources and forwarders may be in a subscriber's private computing environment. Alternatively, they might be directly managed by the service provider as part of the cloud service. In the example system 176, one or more forwarders 180 and client devices 182 are coupled to a cloud-based data intake and query system 184 via one or more networks 185. Network 185 broadly represents one or more LANs, WANs, cellular networks, intranetworks, internetworks, etc., using any of wired, wireless, terrestrial microwave, satellite links, etc., and may include the public Internet, and is used by client devices 182 and forwarders 180 to access the system 184. Similar to the system of 32, each of the forwarders 180 may be configured to receive data from an input source and to forward the data to other components of the system 184 for further processing.

In an embodiment, a cloud-based data intake and query system 184 may comprise a plurality of system instances 186. In general, each system instance 186 may include one or more computing resources managed by a provider of the cloud-based system 184 made available to a particular subscriber. The computing resources comprising a system instance 186 may, for example, include one or more servers or other devices configured to implement one or more forwarders, indexers, search heads, and other components of a data intake and query system, similar to system 32. As indicated above, a subscriber may use a web browser or other application of a client device 182 to access a web portal or other interface that enables the subscriber to configure an instance 186.

Providing a data intake and query system as described in reference to system 32 as a cloud-based service presents a number of challenges. Each of the components of a system 32 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 186) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD® are centrally visible).

3.14. Searching Externally Archived Data

Figure 13:
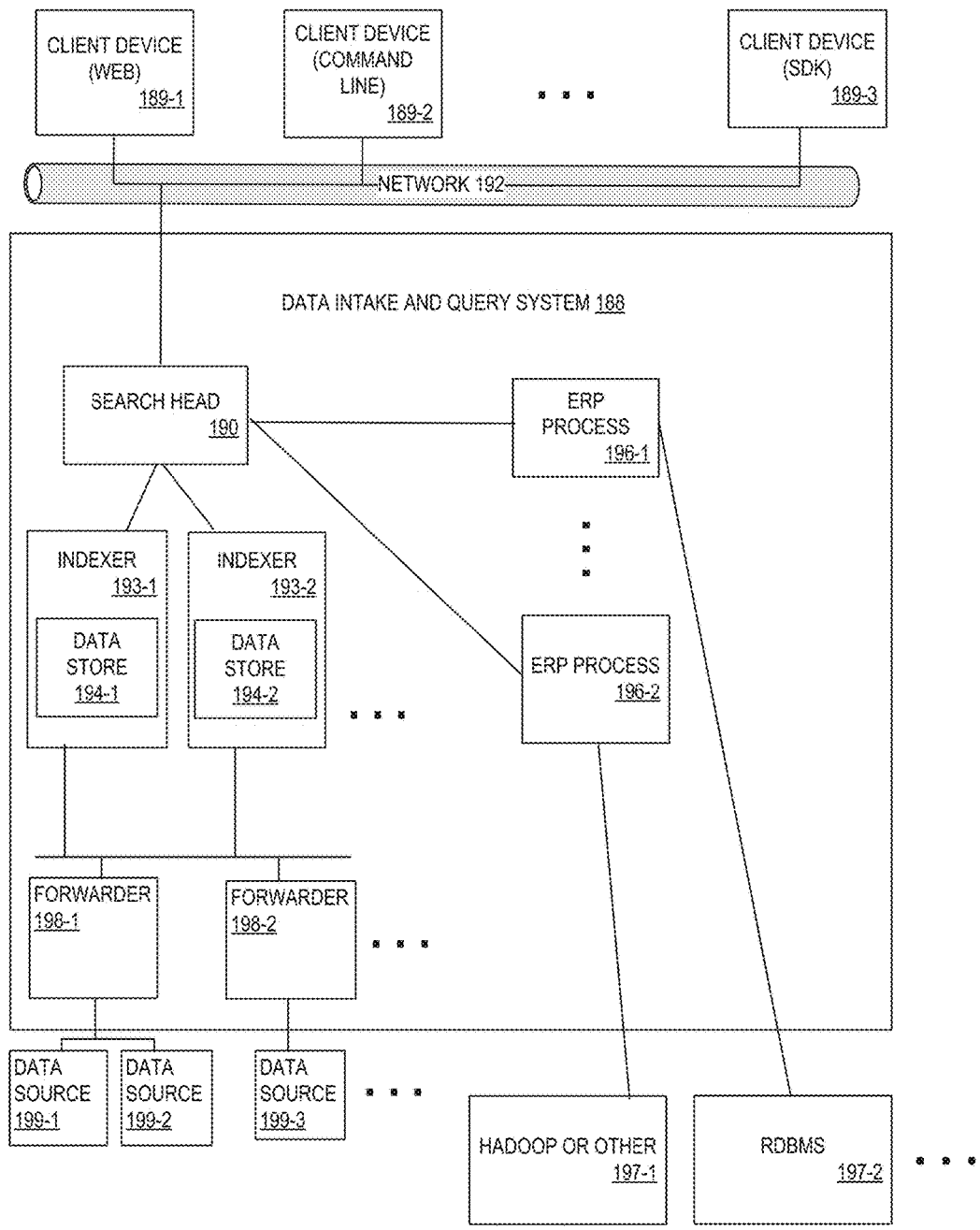
FIG. 13 illustrates a block diagram of an example data intake and query system that performs searches across external data systems according to some embodiments of the present disclosure.

FIG. 13 shows a block diagram of an example of a data intake and query system 188 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 190 of the data intake and query system receives search requests from one or more client devices 189 over network connections 192. As discussed above, the data intake and query system 188 may reside in an enterprise location, in the cloud, etc. FIG. 13 illustrates that multiple client devices 189-1, 189-2, . . . 189-3 may communicate with the data intake and query system 188. The client devices 189 may communicate with the data intake and query system using a variety of connections. For example, one client device in FIG. 13 is illustrated as communicating over an Internet (Web) protocol, another client device is illustrated as communicating via a command line interface, and another client device is illustrated as communicating via a system developer kit (SDK).

The search head 190 analyzes the received search request to identify request parameters. If a search request received from one of the client devices 189 references an index maintained by the data intake and query system, then the search head 190 connects to one or more indexers 193 of the data intake and query system for the index referenced in the request parameters. That is, if the request parameters of the search request reference an index, then the search head accesses the data in the index via the indexer. The data intake and query system 188 may include one or more indexers 193, depending on system access resources and requirements. As described further below, the indexers 193 retrieve data from their respective local data stores 194 as specified in the search request. The indexers and their respective data stores can comprise one or more storage devices and typically reside on the same system, though they may be connected via a local network connection.

If the request parameters of the received search request reference an external data collection, which is not accessible to the indexers 193 or under the management of the data intake and query system, then the search head 190 can access the external data collection through an External Result Provider (ERP) process 196. An external data collection may be referred to as a "virtual index" (plural, "virtual indices"). An ERP process provides an interface through which the search head 190 may access virtual indices.

Thus, a search reference to an index of the system relates to a locally stored and managed data collection. In contrast, a search reference to a virtual index relates to an externally stored and managed data collection, which the search head may access through one or more ERP processes 196-1 and 196-2. FIG. 13 shows two ERP processes 196-1 and 196-2 that connect to respective remote (external) virtual indices, which are indicated as a Hadoop or another system 197-1 (e.g., Amazon S3, Amazon EMR, other Hadoop Compatible File Systems (HCFS), etc.) and a relational database management system (RDBMS) 197-2. Other virtual indices may include other file organizations and protocols, such as Structured Query Language (SQL) and the like. The ellipses between the ERP processes 196-1 and 196-2 indicate optional additional ERP processes of the data intake and query system 191. An ERP process may be a computer process that is initiated or spawned by the search head 190 and is executed by the search data intake and query system 188. Alternatively or additionally, an ERP process may be a process spawned by the search head 192 on the same or different host system as the search head 190 resides.

The search head 190 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 190 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 196-1 and 196-2 receive a search request from the search head 190. The search head may optimize the received search request for execution at the respective external virtual index. Alternatively, the ERP process may receive a search request as a result of analysis performed by the search head or by a different system process. The ERP processes 196-1 and 196-2 can communicate with the search head 190 via conventional input/output routines (e.g., standard in/standard out, etc.). In this way, the ERP process receives the search request from a client device such that the search request may be efficiently executed at the corresponding external virtual index.

The ERP processes 196-1 and 196-2 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 196-1 and 196-2 generate appropriate search requests in the protocol and syntax of the respective virtual indices 197-1, 197-2, each of which corresponds to the search request received by the search head 190. Upon receiving search results from their corresponding virtual indices, the respective ERP process passes the result to the search head 190, which may return or display the results or a processed set of results based on the returned results to the respective client device.

Client devices 189 may communicate with the data intake and query system 188 through a network interface 192 (e.g., one or more LANs, WANs, cellular networks, intranetworks, and/or internetworks using any of wired, wireless, terrestrial microwave, satellite links), and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

3.14.1. External Result Provider (ERP) Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the] streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, for examples, statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

3.14.2. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI's value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational.' Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a system available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

4.0. Data Fabric Service (DFS)

The capabilities of a data intake and query system are typically limited to resources contained within that system. For example, the data intake and query system has search and analytics capabilities that are limited in scope to the indexers responsible for storing and searching a subset of events contained in their corresponding internal data stores.

Even if a data intake and query system has access to external data stores that may include data relevant to a search query, the data intake and query system typically has limited capabilities to process the combination of partial search results from the indexers and external data sources to produce comprehensive search results. In particular, the search head of a data intake and query system may retrieve partial search results from external data systems over a network. The search head may also retrieve partial search results from its indexers, and combine those partial search results with the partial search results of the external data sources to produce final search results for a search query.

For example, the search head can implement map-reduce techniques, where each data source returns partial search results and the search head can combine the partial search results to produce the final search results of a search query. However, obtaining search results in this manner from distributed data systems including internal data stores and external data stores has limited value because the system is not scalable. In particular, the search head acts as a bottleneck for processing complex search queries on distributed data systems. The bottleneck effect at the search head worsens as the number of distributed data systems increases.

A solution to mitigating the bottleneck effect at a search head would be to employ a cluster of multiple search heads. Each search head could operate on a subset of the distributed data systems to return search results for that subset. For example, a search head can implement map-reduce techniques, where each of the subset of the distributed data systems returns partial search results to a search head that combines the partial search results to produce a combination of partial search results obtained from the subset of distributed data systems. The combinations of partial search results from the combination of search heads could then be combined to produce the final search results of the search query. However, using multiple search heads creates unnecessary complexity and does not scale well as the number of distributed data systems increases in a big data ecosystem.

Embodiments of the disclosed data fabric service (DFS) system architecture overcome the aforementioned drawbacks by expanding on the capabilities of a data intake and query system to enable application of a search query across distributed data systems including internal data stores coupled to indexers and external data stores coupled to the data intake and query system over a network. Moreover, the disclosed embodiments are scalable to accommodate application of a search query on a growing number of diverse data systems.

The disclosed DFS system extends the capabilities of the data intake and query system by employing services such as a DFS search service ("search service") communicatively coupled to worker nodes distributed in a big data ecosystem. The worker nodes are communicatively coupled to the external data systems that contain external data stores. The data intake and query system can receive a search query input by a user at a client device. Then, the data intake and query system can coordinate with the search service to execute a search scheme applied to both the indexers and the external data stores. The partial search results from the indexers and external data stores are collected by the worker nodes, which can aggregate the partial search results and transfer the aggregated partial search results back to the search service. In some embodiments, the search service can operate on the aggregate search results, and send finalized search results to the search head, which can render the search results of the query on a display device.

Hence, the search head can apply a search query to the indexers and supply the partial search results from the indexers to the worker nodes. The distributed worker nodes can act as agents of the data intake and query system under the control of the search service to process the search query applied to the external data systems, and aggregate the partial search results from both the indexers and the external data systems. In other words, the search head of the data intake and query system can offload at least some query processing to the worker nodes, to both search the external data stores and harmonize the partial search results from both the indexers and the external data stores. This system is scalable to accommodate any number of worker nodes communicatively coupled to any number of external data systems.

Thus, embodiments of the DFS system can extend the capabilities of a data intake and query system by leveraging computing assets from anywhere in a big data ecosystem to collectively execute search queries on diverse data systems regardless of whether data stores are internal of the data intake and query system and/or external data stores that are communicatively coupled to the data intake and query system over a network.

4.1. DFS System Architecture

Figure 20:
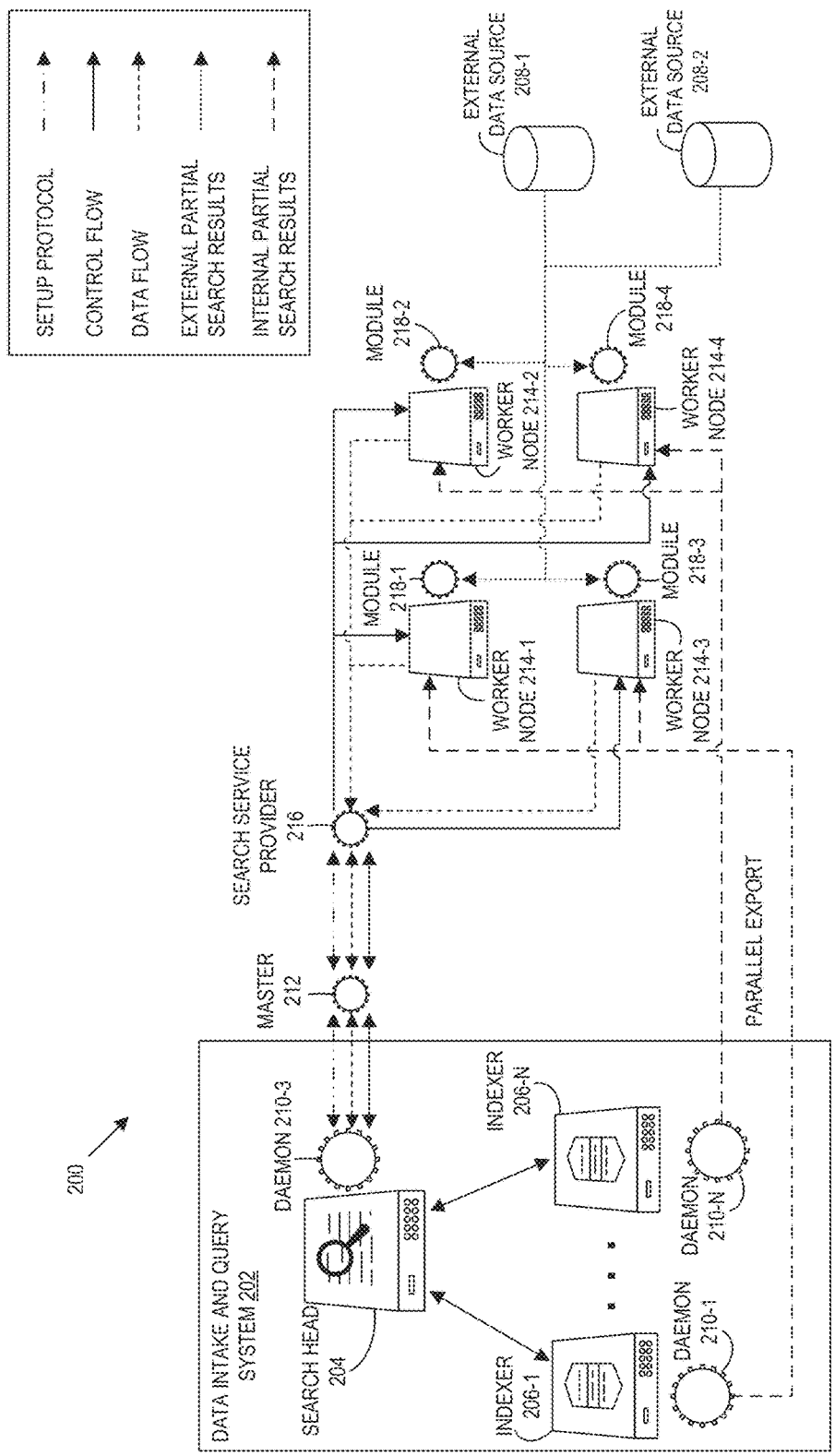
FIG. 20 is a system diagram illustrating a data fabric service system architecture ("DFS system") in which an embodiment may be implemented.

FIG. 20 is a system diagram illustrating a DFS system architecture in which an embodiment may be implemented. The DFS system 200 includes a data intake and query system 202 communicatively coupled to a network of distributed components that collectively form a big data ecosystem. The data intake and query system 202 may include the components of data intake and query systems discussed above including any combination of forwarders, indexers, data stores, and a search head. However, the data intake and query system 202 is illustrated with fewer components to aid in understanding how the disclosed embodiments extend the capabilities of data intake and query systems to apply search queries and analytics operations on distributed data systems including internal data systems (e.g., indexers with associated data stores) and/or external data systems in a big data ecosystem.

The data intake and query system 202 includes a search head 204 communicatively coupled to multiple peer indexers 206 (also referred to individually as indexer 206). Each indexer 206 is responsible for storing and searching a subset of events contained in a corresponding data store (not shown). The peer indexers 206 can analyze events for a search query in parallel. For example, each indexer 206 can return partial results in response to a search query as applied by the search head 204.

The disclosed technique expands the capabilities of the data intake and query system 202 to obtain and harmonize search results from external data sources 208, alone or in combination with the partial search results of the indexers 206. More specifically, the data intake and query system 202 runs various processes to apply a search query to the indexers 206 as well as external data sources 208. For example, a daemon 210 of the data intake and query system 202 can operate as a background process that coordinates the application of a search query on the indexers and/or the external data stores. As shown, the daemon 210 includes software components for the search head 204 and indexers 206 to interface with a DFS master 212 and a distributed network of worker nodes 214, respectively, which are external to the data intake and query system 202.

The DFS master 212 is communicatively coupled to the search head 204 via the daemon 210-3. In some embodiments, the DFS master 212 can include software components running on a device of any system, including the data intake and query system 202. As such, the DFS master 212 can include software and underlying logic for establishing a logical connection to the search head 204 when external data systems need to be searched. The DFS master 212 is part of the DFS search service ("search service") that includes a search service provider 216, which interfaces with the worker nodes 214.

Although shown as separate components, the DFS master 212 and the search service provider 216 are components of the search service that may reside on the same machine, or may be distributed across multiple machines. In some embodiments, running the DFS master 212 and the search service provider 216 on the same machine can increase performance of the DFS system by reducing communications over networks. As such, the search head 204 can interact with the search service residing on the same machine or on different machines. For example, the search head 204 can dispatch requests for search queries to the DFS master 212, which can spawn search service providers 216 of the search service for each search query.

Other functions of the search service provider 216 can include providing data isolation across different searches based on role/access control, as well as fault tolerance (e.g., localized to a search head). For example, if a search operation fails, then its spawned search service provider may fail but other search service providers for other searches can continue to operate.

The search head 204 can define a search scheme in response to a received search query that requires searching both the indexers 206 and the external data sources 208. A portion of the search scheme can be applied by the search head 204 to the indexers 206 and another portion of the search scheme can be communicated to the DFS master 212 for application by the worker nodes 214 to the external data sources 208. The search service provider 216 can collect an aggregate of partial search results of the indexers 206 and of the external data sources 208 from the worker nodes 214, and communicate the aggregate partial search results to the search head 204. In some embodiments, the DFS master 212, search head 204, or the worker nodes 214 can produce the final search results, which the search head 204 can cause to be presented on a user interface of a display device.

More specifically, the worker nodes 214 can act as agents of the DFS master 212 via the search service provider 216, which can act on behalf of the search head 204 to apply a search query to distributed data systems. For example, the DFS master 212 can manage different search operations and balance workloads in the DFS system 200 by keeping track of resource utilization while the search service provider 216 is responsible for executing search operations and obtaining the search results.

For example, the search service provider 216 can cause the worker nodes 214 to apply a search query to the external data sources 208. The search service provider 216 can also cause the worker nodes 214 to collect the partial search results from the indexers 206 and/or the external data sources 208 over the computer network. Moreover, the search service provider 216 can cause the worker nodes 214 to aggregate the partial search results collected from the indexers 206 and/or the external data sources 208.

Hence, the search head 204 can offload at least some processing to the worker nodes 214 because the distributed worker nodes 214 can extract partial search results from the external data sources 208, and collect the partial search results of the indexers 206 and the external data sources 208. Moreover, the worker nodes 214 can aggregate the partial search results collected from the diverse data systems and transfer them to the search service, which can finalize the search results and send them to the search head 204. Aggregating the partial search results of the diverse data systems can include combining partial search results, arranging the partial search results in an ordered manner, and/or performing operations derive other search results from the collected partial search results (e.g., transform the partial search results).

Once a logical connection is established between the search head 204, the DFS master 212, the search service provider 216, and the worker nodes 214, control and data flows can traverse the components of the DFS system 200. For example, the control flow can include instructions from the DFS master 212 to the worker nodes 214 to carry out the operations detailed further below. Moreover, the data flow can include aggregate partial search results transferred to the search service provider 216 from the worker nodes 214. Further, the partial search results of the indexers 206 can be transferred by peer indexers to the worker nodes 214 in accordance with a parallel export technique. A more detailed description of the control flow, data flow, and parallel export techniques are provided further below.

In some embodiments, the DFS system 200 can use a redistribute operator of a data intake and query system. The redistribute operator can distribute data in a sharded manner to the different worker nodes 214. Use of the redistribute operator may be more efficient than the parallel exporting because it is closely coupled to the existing data intake and query system. However, the parallel exporting techniques have capabilities to interoperate with open source systems other than the worker nodes 214. Hence, use of the redistribute operator can provide greater efficiency but less interoperability and flexibility compared to using parallel export techniques.

The worker nodes 214 can be communicatively coupled to each other, and to the external data sources 208. Each worker node 214 can include one or more software components or modules 218 ("modules") operable to carry out the functions of the DFS system 200 by communicating with the search service provider 216, the indexers 206, and the external data sources 208. The modules 218 can run on a programming interface of the worker nodes 214. An example of such an interface is APACHE SPARK, which is an open source computing framework that can be used to execute the worker nodes 214 with implicit parallelism and fault-tolerance.

In particular, SPARK includes an application programming interface (API) centered on a data structure called a resilient distributed dataset (RDD), which is a read-only multiset of data items distributed over a cluster of machines (e.g., the devices running the worker nodes 214). The RDDs function as a working set for distributed programs that offer a form of distributed shared memory. The RDDs facilitate implementation of both iterative algorithms, to read their dataset multiple times in a loop, and interactive or exploratory data analysis (e.g., for repeated database-style querying of data).

Thus, the DFS master 212 can act as a manager of the worker nodes 214, including their distributed data storage systems, to extract, collect, and store partial search results via their modules 218 running on a computing framework such as SPARK. However, the embodiments disclosed herein are not limited to an implementation that uses SPARK. Instead, any open source or proprietary computing framework running on a computing device that facilitates iterative, interactive, and/or exploratory data analysis coordinated with other computing devices can be employed to run the modules 218 for the DFS master 212 to apply search queries to the distributed data systems.

Accordingly, the worker nodes 214 can harmonize the partial search results of a distributed network of data storage systems, and provide those aggregated partial search results to the search service provider 216. In some embodiments, the DFS master 212 can further operate on the aggregated partial search results to obtain final results that are communicated to the search head 204, which can output the search results as reports or visualizations on a display device.

The DFS system 200 is scalable to accommodate any number of worker nodes 214. As such, the DFS system can scale to accommodate any number of distributed data systems upon which a search query can be applied and the search results can be returned to the search head and presented in a concise or comprehensive way for an analyst to obtain insights into bid data that is greater in scope and provides deeper insights compared to existing systems.

4.2. DFS System Operations

Figure 21:
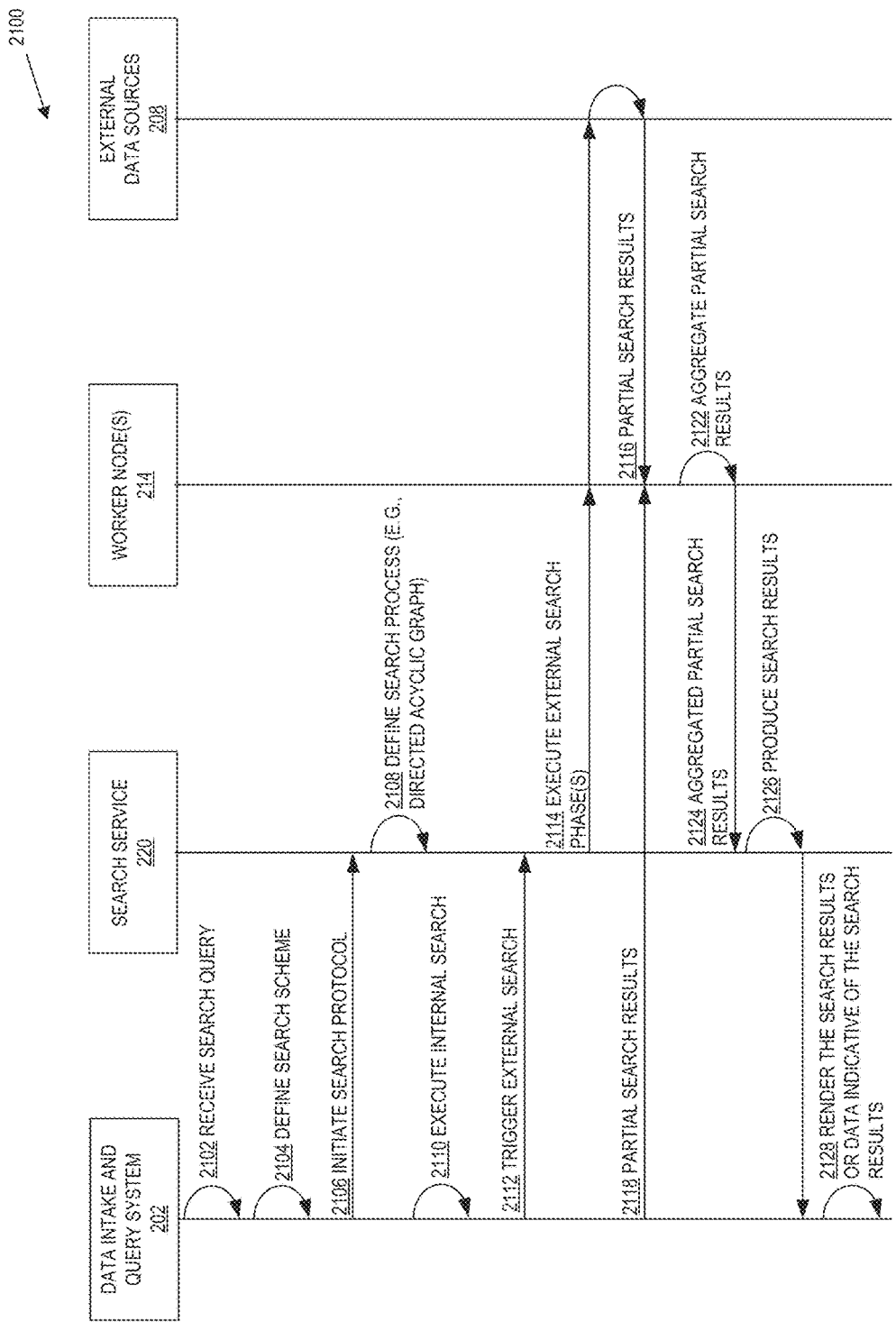
FIG. 21 is an operation flow diagram illustrating an example of an operation flow of a DFS system according to some embodiments of the present disclosure.

FIG. 21 is an operation flow diagram illustrating an example of an operation flow of the DFS system 200. The operation flow 2100 includes control flows and data flows of the data intake and query system 202, the DFS master 212 and/or the search service provider 216 (collectively the "search service 220"), one or more worker nodes 214, and/or one or more external data sources 208. A combination of the search service 220 and the worker nodes 216 collectively enable the data fabric services that can be implemented on the distributed data systems including, for example, the data intake and query system 202 and the external data sources 208.

In step 2102, the search head 204 of the data intake and query system 202 receives a search query. For example, an analyst may submit a search query to the search head 204 over a network from an application (e.g., web browser) running on a client device, through a network portal (e.g., website) administered by the data intake and query system 202. In another example, the search head 204 may receive the search query in accordance with a schedule of search queries. The search query can be expressed in a variety of languages such as a pipeline search language, a structured query language, etc.

In step 2104, the search head 204 processes the search query to determine whether the search query requires searching the indexers 206, the external data sources 208, or a combination of both. For example, the scope of a search query may be limited to searching only the indexers 206. If so, the search head 204 can conduct a search on the indexers 206 by using, for example, map-reduce techniques without invoking or engaging the DFS system. In some embodiments, however, the search head 204 can invoke or engage the DFS system to utilize the worker nodes 214 to harmonize the partial search results of the indexers 206 alone, and return the search results to the search head 204 via the search service 220.

If, on the other hand, the scope of the search query requires searching at least one external data system, then the search head 204 can invoke and engage the DFS system. Accordingly, the search head 204 can engage the search service 220 when a search query must be applied to at least one external data system, such as a combination of the indexers 206 and at least one of the external data sources 208. For example, the search head 204 can receive a search query, and create search phases in response to that query. The search head can pass search phases to the DFS master 212, which can create (e.g., spawn) a search service provider (e.g., search service provider 216) to conduct the search.

In some embodiments, the DFS system 200 can be launched by using a modular input, which refers to a platform add-on of the data intake and query system 202 that can be accessed in a variety of ways such as, for example, over the Internet on a network portal. For example, the search head 204 can use a modular input to launch the search service 220 and worker nodes 214 of the DFS system 200. In some embodiments, a modular input can be used to launch a monitor function used to monitor nodes of the DFS system. In the event that a launched service or node fails, the monitor allows the search head to detect the failed service or node, and re-launch the failed service or node or launch or reuse another launched service or node to provide the functions of the failed service or node.

In step 2104, the data intake and query system 202 executes a search phase generation process to define a search scheme based on the scope of the search query. The search phase generation process involves an evaluation of the scope of the search query to define one or more phases to be executed by the data intake and query system 202 and/or the DFS system, to obtain search results that would satisfy the search query. The search phases may include a combination of phases for initiating search operations, searching the indexers 206, searching the external data sources 208, and/or finalizing search results for return back to the search head 204.

In some embodiments, the combination of search phases can include phases for operating on the partial search results retrieved from the indexers 206 and/or the external data sources 208. For example, a search phase may require correlating or combining partial search results of the indexers 206 and/or the external data sources 208. In some embodiments, a combination of phases may be ordered as a sequence that requires an earlier phase to be completed before a subsequent phase can begin. However, the disclosure is not limited to any combination or order of search phases. Instead, a search scheme can include any number of search phases arranged in any order that could be different from another search scheme applied to the same or another arrangement or subset of data systems.

For example, a first search phase may be executed by the search head 204 to extract partial search results from the indexers 206. A second search phase may be executed by the worker nodes 214 to extract and collect partial search results from the external data sources 208. A third search phase may be executed by the indexers 206 and worker nodes 214 to export partial search results in parallel to the worker nodes 214 from the (peer) indexers 206. As such, the third phase involves collecting the partial search results from the indexers 206 by the worker nodes 214. A fourth search phase may be executed by the worker nodes 214 to aggregate (e.g., combine and/or operate on) the partial search results of the indexers 206 and/or the worker nodes 214. A sixth and seventh phase may involve transmitting the aggregate partial search results to the search service 220, and operating on the aggregate partial search results to produce final search results, respectively. The search results can then be transmitted to the search head 204. An eight search phase may involve further operating on the search results by the search head 204 to obtain final search results that can be, for example, rendered on a user interface of a display device.

In step 2106, the search head 204 initiates a communications search protocol that establishes a logical connection with the worker nodes 214 via the search service 220. Specifically, the search head 204 may communicate information to the search service 220 including a portion of the search scheme to be performed by the worker nodes 214. For example, a portion of the search scheme transmitted to the DFS master 212 may include search phase(s) to be performed by the DFS master 212 and the worker nodes 214. The information may also include specific control information enabling the worker nodes 214 to access the indexers 206 as well as the external data sources 208 subject to the search query.

In step 2108, the search service 220 can define an executable search process performed by the DFS system. For example, the DFS master 212 or the search service provider 216 can define a search process as a logical directed acyclic graph (DAG) based on the search phases included in the portion of the search scheme received from the search head 204.

The DAG includes a finite number of vertices and edges, with each edge directed from one vertex to another, such that there is no way to start at any vertex and follow a consistently-directed sequence of edges that eventually loops back to the same vertex. Here, the DAG can be a directed graph that defines a topological ordering of the search phases performed by the DFS system. As such, a sequence of the vertices represents a sequence of search phases such that every edge is directed from earlier to later in the sequence of search phases. For example, the DAG may be defined based on a search string for each phase or metadata associated with a search string. The metadata may be indicative of an ordering of the search phases such as, for example, whether results of any search string depend on results of another search string such that the later search string must follow the former search string sequentially in the DAG.

In step 2110, the search head 204 starts executing local search phases that operate on the indexers 206 if the search query requires doing so. If the scope of the search query requires searching at least one external data system, then, in step 2112, the search head 204 sends information to the DFS master 212 triggering execution of the executable search process defined in step 2108.

In step 2114, the search service 220 starts executing the search phases that cause the worker nodes 214 to extract partial search results from the external data stores 208 and collect the extracted partial search results at the worker nodes 214, respectively. For example, the search service 220 can start executing the search phases of the DAG that cause the worker nodes 214 to search the external data sources 208. Then, in step 2116, the worker nodes 214 collect the partial search results extracted from the external data sources 208.

The search phases executed by the DFS system can also cause the worker nodes 214 to communicate with the indexers 206. For example, in step 2118, the search head 204 can commence a search phase that triggers a remote pipeline executed on the indexers 206 to export their partial search results to the worker nodes 214. As such, the worker nodes 214 can collect the partial search results of the indexers 206. However, if the search query does not require searching the indexers 206, then the search head 204 may bypass triggering the pipeline of partial search results from the indexers 206.

In step 2122, the worker nodes 214 can aggregate the partial search results and send them to the search service 220. For example, the search service provider 216 can begin collecting the aggregated search results from the worker nodes 214. The aggregation of the partial search results may including combining the partial search results of indexers 206, the external data stores 208, or both. In some embodiments, the aggregated partial search results can be time-ordered or unordered depending on the requirements of the type of search query.

In some embodiments, aggregation of the partial search results may involve performing one or more operations on a combination of partial search results. For example, the worker nodes 214 may operate on a combination of partial search results with an operator to output a value derived from the combination of partial search results. This transformation may be required by the search query. For example, the search query may be an average or count of data events that include specific keywords. In another example, the transformation may involve determining a correlation among data from different data sources that have a common keyword. As such, transforming the search results may involve creating new data derived from the partial search results obtained from the indexers 206 and/or external data systems 208.

In step 2124, a data pipeline is formed to the search head 204 through the search service 220 once the worker nodes 214 have ingested the partial search results from the indexers 206 and the external data stores 208, and aggregated the partial search results (e.g., and transformed the partial search results).

In step 2126, the aggregate search received by the search service 220 may optionally be operated on to produce final search results. For example, the aggregate search results may include different statistical values of partial search results collected from different worker nodes 214. The search service 220 may operate on those statistical values to produce search results that reflect statistical values of the statistical values obtained from the all the worker nodes 214.

As such, the produced search results can be transferred in a big data pipeline to the search head 204. The big data pipeline is essentially a pipeline of the data intake and query system 202 extended into the big data ecosystem. Hence, the search results are transmitting to the search head 204 where the search query was received by a user. Lastly, in step 2128, the search head 204 can render the search results or data indicative of the search results on a display device. For example, the search head 204 can make the search results available for visualizing on a user interface rendered via a computer portal.

5.0. Parallel Export Techniques

The disclosed embodiments include techniques for exporting partial search results in parallel from peer indexers of a data intake and query system to the worker nodes. In particular, partial search results (e.g., time-indexed events) obtained from peer indexers can be exported in parallel from the peer indexers to worker nodes. Exporting the partial search results from the peer indexers in parallel can improve the rate at which the partial search results are transferred to the worker nodes for subsequent combination with partial search results of the external data systems. As such, the rate at which the search results of a search query can be obtained from the distributed data system can be improved by implementing parallel export techniques.

Figure 22:
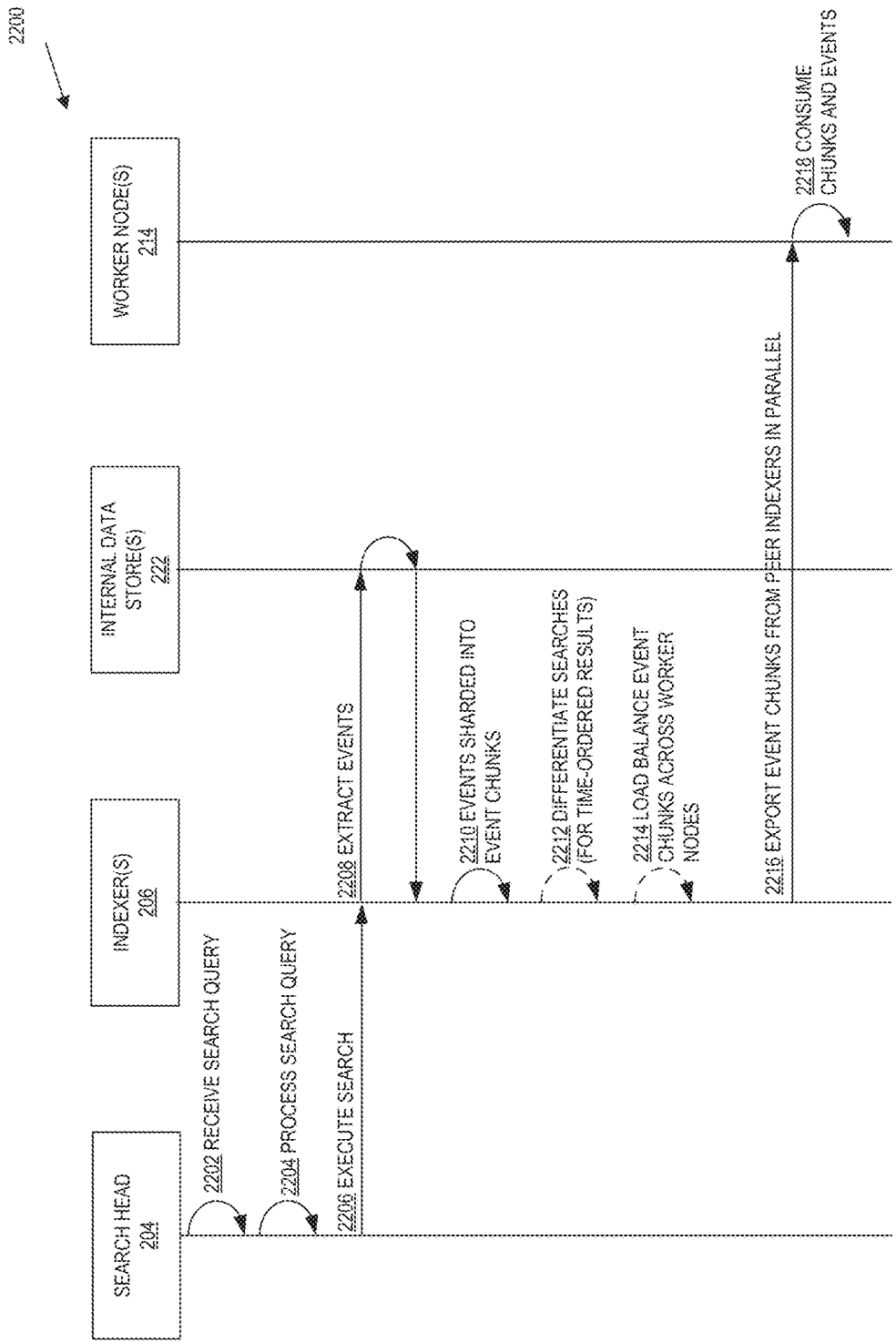
FIG. 22 is an operation flow diagram illustrating an example of a parallel export operation performed in a DFS system according to some embodiments of the present disclosure.

FIG. 22 is an operation flow diagram illustrating an example of a parallel export operation performed in a DFS system according to some embodiments of the present disclosure. The operation 2200 for parallel exporting of partial search results from peer indexers 206 begins by processing a search query that requires transferring of partial search results from the peer indexers 206 to the worker nodes 214.

In step 2202, the search head 204 receives a search query as, for example, input by a user of a client device. In step 2204, the search head 204 processes the search query to determine whether internal data stores 222 of peer indexers 206 must be searched for partial search results. If so, in step 2206, the search head 204 executes a process to search the peer indexers 206 and retrieve the partial search results. In step 2208, each peer indexer 206 can return its partial search results retrieved from respective internal data stores 222.

In step 2210, the partial search results (e.g., time-indexed events) obtained by the peer indexers 206 can be sharded into chunks of events ("event chunks"). Sharding involves partitioning large data sets into smaller, faster, more easily managed parts called data shards. The sharded partitions can be determined from policies, which can be based on hash values by default. Accordingly, the retrieved events can be grouped into chunks (i.e., micro-batches) based on a value associated with a search query and/or the corresponding retrieved events. For example, the retrieved events can be sharded in chunks based on the field names passed as part of a search query process of the data intake and query system. The event chunks can then be exported from the peer indexers 206 in parallel over the network to the worker nodes 214.

If time-ordering is required, the parallel exporting technique can include a mechanism to reconstruct the ordering of event chunks at the worker nodes 214. In particular, the order from which the event chunks flowed from peer indexers 206 can be tracked to enable collating the chunks in time order at the worker nodes 214. For example, metadata of event chunks can be preserved when parallel exporting such that the chunks can be collated by the worker nodes 214 that receive the event chunks. Examples of the metadata include SearchResultsInfo (SRI) (a data structure of SPLUNK® which carries control and meta information for the search operations) or timestamps indicative of, for example, the times when respective events or event chunks started flowing out from the peer indexers 206. If time ordering is not required, preserving the time ordering of chunks by using timestamps may be unnecessary.

The parallel exporting technique can be modified in a variety of ways to improve performance of the DFS system. For example, in step 2214, the event chunks can be load balanced across the peer indexers 206 and/or receiving worker nodes 214 to improve network efficiency and utilization of network resources. In particular, a dynamic list of receivers (e.g., worker nodes 214) can be maintained by software running on hardware implementing the DFS system. The list may indicate a current availability of worker nodes to receive chunks from export processors of the peer indexers 206. The list can be updated dynamically to reflect the availability of the worker nodes 214. Further, parameters on the list indicative of the availability of the worker nodes 214 can be passed to the export processors periodically or upon the occurrence of an event (e.g., a worker node 214 becomes available). The export processors can then perform a load balancing operation on the event chunks over the receiving worker nodes 214.

The worker nodes 214 may include driver programs that consume the events and event chunks. In some embodiments, the worker nodes 214 can include a software development kit (SDK) that allows third party developers to control the consumption of events from the peer indexers 206 by the worker nodes 214. As such, third party developers can control the drivers causing the consumption of events and event chunks from the peer indexers 206 by the worker nodes 214. Lastly, in step 2216, the event chunks are exported from the peer indexers 206 in parallel to the worker nodes 214.

In some embodiments, the rate of exporting events or event chunks in parallel by the peer indexers 206 can be based on an amount of shared memory available to the worker nodes 214. Accordingly, techniques can be employed to reduce the amount of memory required to store transferred events. For example, when the worker nodes 214 are not local (e.g., remote from the peer indexers 206), compressed payloads of the event chunks can be transferred to improve performance.

Thus, the disclosed DFS system can provide a big data pipeline and native processor as a mechanism to execute infrastructure, analytics, and domain-based processors based on data from one or more external data sources over different compute engines. In addition, the mechanism can execute parallelized queries to extract results from external systems.

6.0. DFS Query Processing

The disclosed embodiments include techniques to process search queries in different ways by the DFS system depending on the type of search results sought in response to a search query. In other words, a data intake and query system can receive search queries that cause the DFS system to process the search queries differently based on the search results sought in accordance with the search queries. For example, some search queries may require ordered search results, and an order of the search results may be unimportant for other search queries.

To obtain ordered search results, a search query executed on internal data sources (e.g., indexers) and/or external data sources may require sorting and organizing timestamped partial search results across the multiple diverse data sources. However, the multiple internal or external data sources may not store timestamped data. That is, some data sources may store time-ordered data while other data sources may not store time-ordered data, which prevents returning time-ordered search results for a search query. The disclosed embodiments provide techniques for harmonizing time-ordered and unordered data from across multiple internal or external data sources to provide time-ordered search results.

In other instances, a search query may require search results that involve performing a transformation of data collected from multiple internal and/or external data sources. The transformed data can be provided as the search results in response to the search query. In some cases, the search query may be agnostic to the ordering of the search results. For example, the search results of a search query may require counts of different types of events generated over the same period of time. Hence, search results that satisfy the search query could be ordered or unordered counts. As such, there is no requirement to maintain the time order of the partial search results obtained from data systems subject to the count search query. Thus, the techniques described below provide mechanisms to obtain search result from the bid data ecosystem that are transformed, time-ordered, unordered, or any combinations of these types of search results.

6.1. Ordered Search Results

The disclosed embodiments include techniques to obtain ordered search results based on partial search results from across multiple diverse internal and/or external data sources. The ordering of the search results may be with respect to a parameter associated with the partial search results. An example of a parameter includes time. As such, the disclosed technique can provide a time-ordered search result based on partial search results obtained from across multiple internal and/or external data sources. Moreover, the disclosed technique can provide time-ordered search results regardless of whether the partial search results obtained from the diverse data sources are timestamped.

An ordered search (i.e., ordered data execution) can be referred to as "cursored" mode of data access. According to this mode of data access, the DFS system can execute time-ordered searches or retrieve events from multiple data sources and presents the events in a time ordered manner. For searches involving only local data sources, the DFS system can implement a micro-batching mechanism based on the event time across worker nodes. The DFS system can ensure that per peer ordering is enforced across the worker nodes and final collation is performed at a local search head. In case of event retrieval from multiple data sources, the DFS system can maintain per source ordering prior to ordered collation in the local search head.

Figure 23:
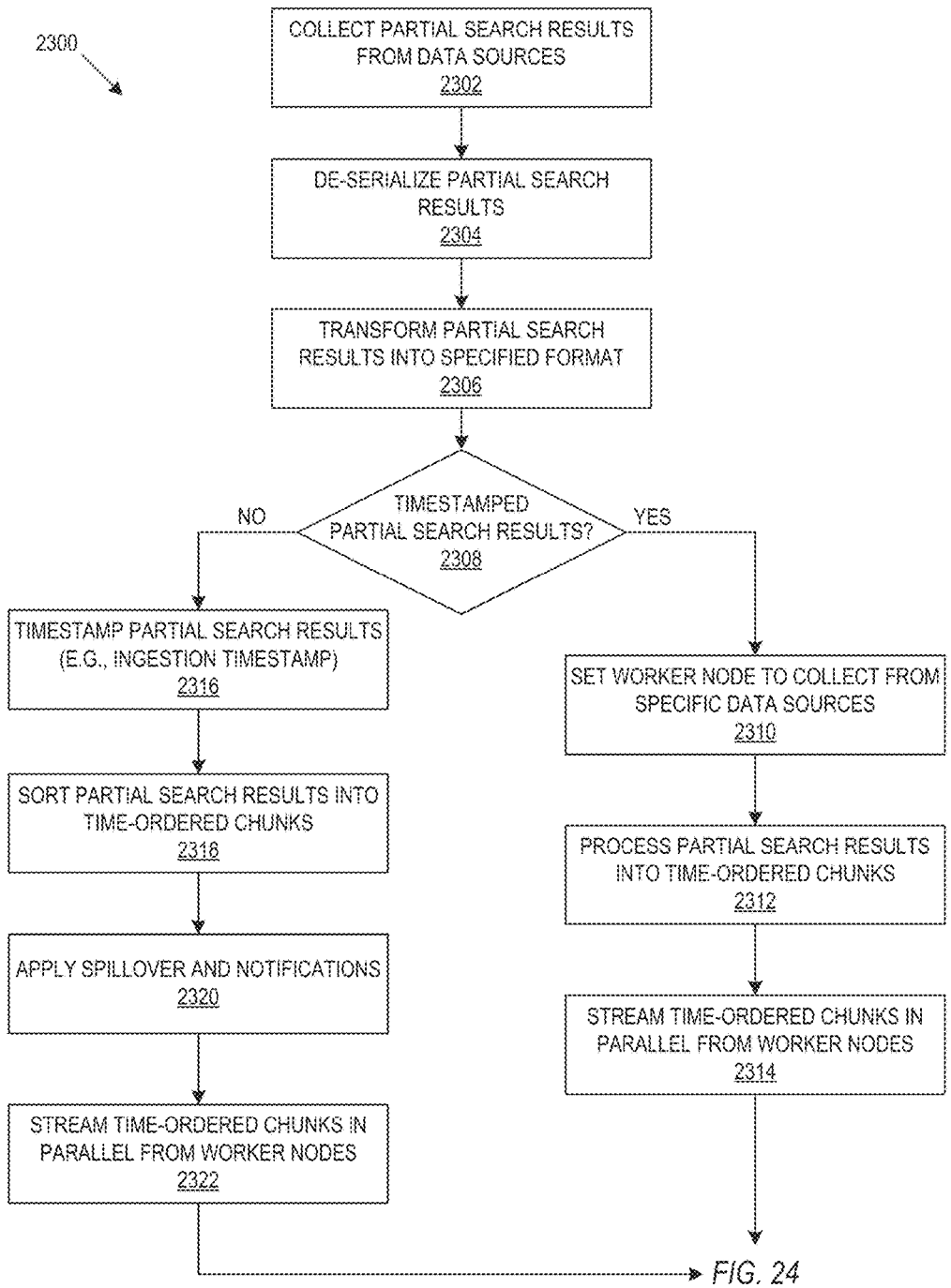
FIG. 23 is a flow diagram illustrating a method performed by the DFS system to obtain time-ordered search results according to some embodiments of the present disclosure.

FIG. 23 is a flowchart illustrating a method performed the DFS system to obtain time-ordered search results in response to a cursored search query according to some embodiments of the present disclosure. As described below, the method 2300 for processing cursored search queries can involve a micro-batching process executed by worker nodes to ensure time orderliness of partial search results obtained from data sources.

In step 2302, one or more worker nodes collect partial search results from the internal and/or external data sources. For example, the worker node may collect partial search results corresponding to data having a data structure as specified by the search query. In another example, the worker nodes may query an external data source for partial search results based on specific keywords specified by a cursored search query, and collect the partial search results. The worker nodes may also collect partial search results from indexers, which were returned in response to application of the search query by the search head to the indexers. In some embodiments, the partial search results may be communicated from each data source to the worker node in chunks (i.e., micro-batches).

In step 2304, the worker nodes perform deserialization of the partial search results obtained from the data sources. Specifically, partial search results transmitted by the data sources could been serialized such that data objects were converted into a stream of bytes in order to transmit the object, or store the object in memory. The serialization process allows for saving the state of an object in order to reconstruct it at the worker node by using reverse process of deserialization.

In step 2306, the worker nodes ingest the partial search results collected from the data sources and transform them into a specified format. As such, partial search results in diverse formats can be transformed into a common specified format. The specified format may be specified to facilitate processing by the worker nodes. Hence, diverse data types obtained from diverse data sources can be transformed into a common format to facilitate subsequent aggregation across all the partial search results obtained in response to the search query. As a result, the partial search results obtained by the worker nodes can be transformed into, for example, data events having structures that are compatible to the data intake and query system.

In step 2308, the worker nodes may determine whether the partial search results are associated with respective time values. For example, the worker nodes may determine that events or event chunks from an internal data source are timestamped as shown in FIG. 2, but events or event chunks from an external data source may not be timestamped. The timestamped events may also be marked with an "Origin-Type" (e.g., mysql-origin, cloud-aws-s), "SourceType" (e.g., cvs, json, sql), and "Host < >" (e.g., IP address where the event originated), or other data useful for ordering the partial search. If all the partial search results from across the diverse data systems are adequately marked, then harmonizing the partial search results may not require different types of processing. However, typically at least some partial search results from across the diverse distributed data systems are not adequately marked to facilitate harmonization.

Accordingly, the worker nodes can implement bifurcate processing of the partial search results depending on whether or not the partial search results are adequately marked. Specifically, the partial search results that are timestamped can be processed one way, and the partial search results that are not timestamped can be processed a different way. The worker nodes can execute the different types of processing interchangeably, or execute one type of processing after the other type of processing has completed.

In step 2310, for time-ordered partial search results, respective worker nodes can be assigned (e.g., fixed) to receive time-ordered partial search results (e.g., events or event chunks) from respective data sources in an effort to maintain the time orderliness of the data. Assigning a worker node to obtain time-ordered partial search results of the same data source avoids the need for additional processing among multiple nodes otherwise required if they each received different time-ordered chunks from the same data source. In other words, setting a worker node to collect all the time-ordered partial search results from its source avoids the added need to distribute the time-ordered partial search results between worker nodes to reconstruct the overall time orderliness of the partial search results.

For example, a worker node can respond to timestamped partial search results it receives by setting itself (or another worker node) to receive all of the partial search results from the source of the time-stamped partial search results. For example, the worker node can be set by broadcasting the assignment to other worker nodes, which collectively maintain a list of assigned worker nodes and data sources. In some embodiments, a worker node that receives time-stamped partial search results can communicate an indication about the timestamped partial search results to the DFS master. Then the DFS master can set a specific set of worker nodes to receive all the timestamped data from the specific source.

In step 2312, the worker nodes read the collected partial search results (e.g., events or event chunks) and arrange the partial search results in time order. For example, each collected event or event chunk may be associated with any combination of a start time, an end time, a creation time, or some other time value. The worker node can use the time values (e.g., timestamps) associated with the events or event chunks to arrange the events and/or the event chunks in a time-order. Lastly, in step 2314, the worker nodes may stream the time-ordered partial search results in parallel as time-ordered chunks via the search service (e.g., to the DFS master via the service provider of the DFS system).

Referring back to step 2308, the worker nodes can respond differently to partials search results that are not associated with timestamps (e.g., lack an associated time value that facilitates time ordering). In step 2316, the worker nodes can associate events or chunks with a time value indicative of the time of ingestion of the events or event chunks by the respective worker nodes (e.g., an ingestion timestamp). The worker nodes can associate the partial search results with any time value that can be measured relative to a reference time value (i.e., not limited to an ingestion timestamp). In some embodiments, the partial search results timestamped by the worker nodes can also be marked with a flag to distinguish those partial search results from the partial search results that were timestamped before being collected by the worker nodes.

In step 2318, the worker nodes sort the newly time-stamped partial search results and create chunks (e.g., micro-batches) upon completion of collecting all of the partial search results from the data sources. In some embodiments, the chunks may be created to contain a default minimum or maximum number of partial search results (i.e., a default chunk size). As such, the worker nodes can create time-ordered partial search results obtained from data sources that did not provide time-ordered partial search results.

In step 2320, the worker nodes can apply spillover techniques to disk as needed. In some embodiments, the worker nodes can provide an extensive HB/status update mechanism to notify the DFS master of its current blocked state. In some embodiments, the worker nodes can ensure a keep-alive to override timeout and provide notifications. Lastly, in step 2322, the worker nodes may stream the time-ordered partial search results in parallel as time-ordered chunks via the search service (e.g., to the DFS master via the service provider of the DFS system).

Accordingly, time-ordered partial search results can be created from a combination of time-ordered and non-time-ordered partial search collected from diverse data sources. The time-ordered partial search results can be streamed in parallel from multiple worker nodes to the service provider, which can stream each search stream to the search head of the data intake and query system. As such, time-ordered search results can be produced from diverse data types of diverse data systems when the scope of a search query requires doing so.

Figure 24:
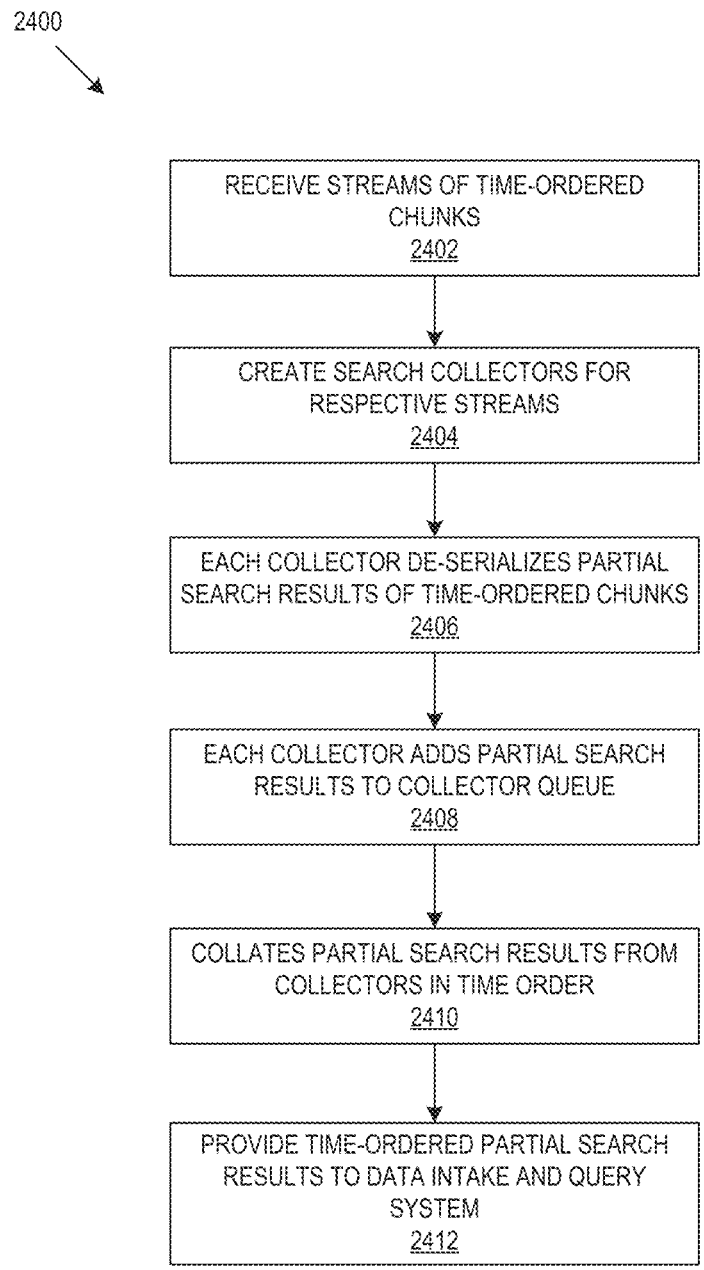
FIG. 24 is a flow diagram illustrating a method performed by a data intake and query system of a DFS system to obtain time-ordered search results according to some embodiments of the present disclosure.

FIG. 24 is a flowchart illustrating a method performed by a data intake and query system of a DFS system in response to a cursored search query according to some embodiments of the present disclosure. Specifically, the method 2400 can be performed by the data intake and query system to collate the time-ordered partial search results obtained by querying internal and/or external data sources.

In step 2402, the search head of the data intake and query system receives one or more streams of time-ordered partial search results (e.g., event chunks) from a search service. In step 2404, the search head creates multiple search collectors to collect the time ordered event chunks.

For example, the search head can add a class of collectors to collate search results from the worker nodes. In some embodiments, the search head can create multiple collectors; such as a collector for each indexer, as well as a single collector for each external data source. In some embodiments, the search head may create a collector for each stream, which could include time-ordered chunks from a single worker node or a single data source. Hence, each collector receives time-ordered chunks.

In step 2406, the collectors perform a deserialization process on the received chunks and their contents, which had been serialized for transmission from the search service. In step 2408, each collector adds the de-serialized partial search or their chunks to a collector queue. The search head may include any number of collector queues. For example, the search head may include a collector queue for each collector or for each data source that provided partial search results.

In step 2410, the search head can collate the time-ordered partial search results obtained from the internal and/or external data sources as time-ordered search results of the presented search query. For example, the search head may apply a collation operation based on the time-order of events contained in the chunks from the queues of different collectors to provide time-ordered search results.

Lastly, in step 2412, the time-ordered search results could be provided to an analyst on a variety of mediums and in a variety of formats. For example, the time-ordered search results may be rendered as a timeline visualization on a user interface on a display device. In some embodiments, the raw search results (e.g., entire raw events) are provided for the timeline visualization.

The visualization can allow the analyst to investigate the search results. In another example, the time-ordered results may be provided to an analyst automatically on printed reports, or transmitted in a message sent over a network to a device to alert the analyst of a condition based on the search results.

Although the methods illustrated in FIGS. 23 and 24 include a combination of steps to obtain time-ordered search results from across diverse data sources that may or may not provide timestamped data, the disclosed embodiments are not so limited. Instead, any portion of the combination of steps illustrated in FIGS. 23 and 24 could be performed depending on the scope of the search query. For example, only a subset of steps may be performed when the search results for a search query are obtained exclusively from a single external data source that stores timestamped data.

6.2. Transformed Search Results

The disclosed embodiments include a technique to obtain search results from the application of transformation operations on partial search results obtained from across internal and/or external data sources. Examples of transformation operations include arithmetic operations such as an average, mean, count, or the like. Examples of reporting transformations include join operations, statistics, sort, top head. Hence, the search results of a search query can be derived from partial search result rather than include the actual partial search results. In this case, the ordering of the search results may be nonessential. An example of a search query that requires a transformation operation is a "batch" or "reporting" search query. The related disclosed techniques involve obtaining data stored in the bid data ecosystem, and returning that data or data derived from that data.

According to a reporting or batch mode of data access, the DFS system executes blocking transforming searches, for example, to join across one or multiple available data sources. Since ordering is not needed, the DFS system can implement sharding of the data from the various data sources and execute aggregation (e.g., reduction of map-reduction) in parallel. The DFS architecture can also execute multiple DFS operations in parallel to ingest sharded data from the different sources.

Figures 25, 26:
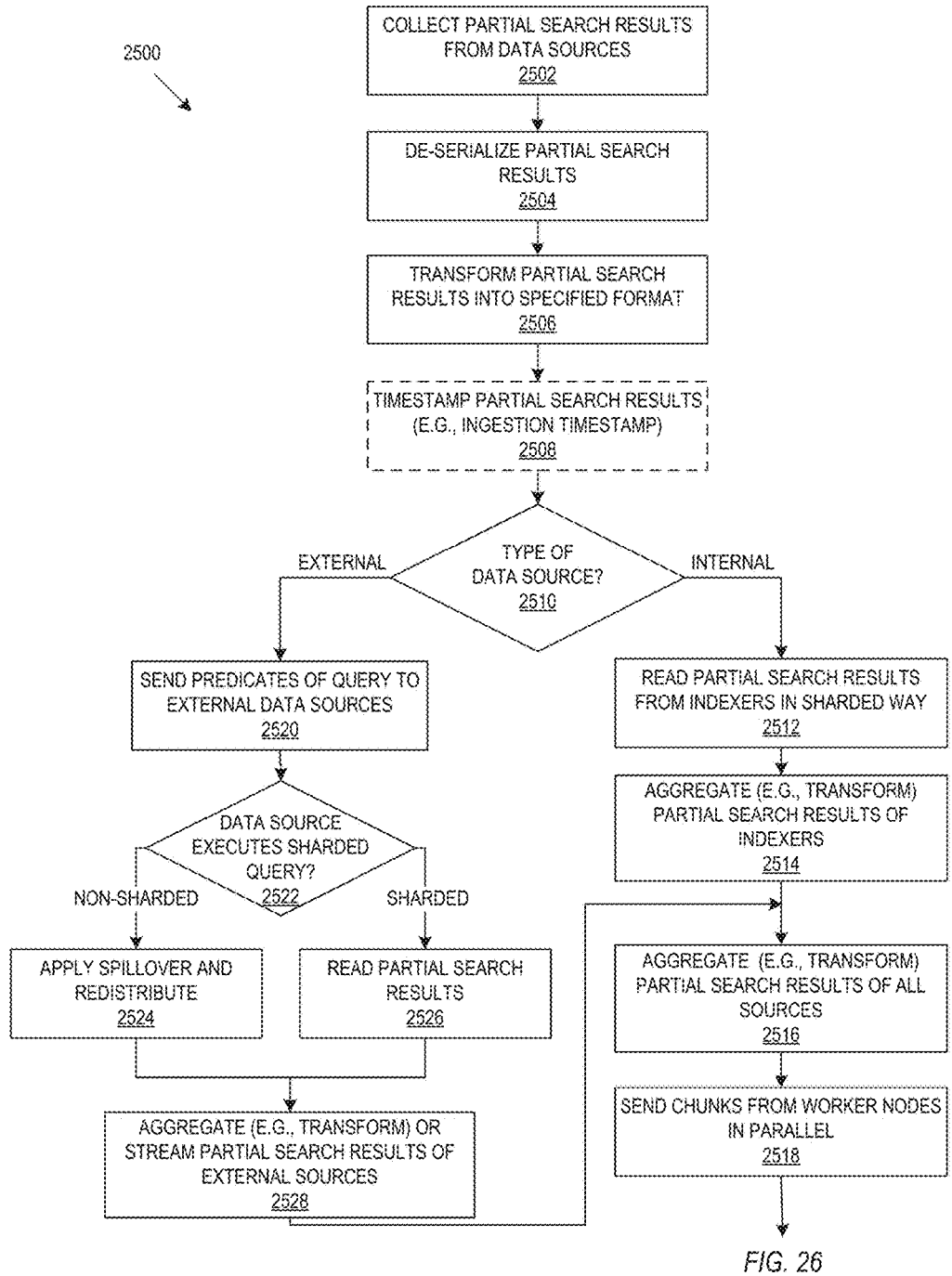
FIG. 25 is a flow diagram illustrating a method performed by nodes of a DFS system to obtain batch or reporting search results according to some embodiments of the present disclosure.
FIG. 26 is a flow diagram illustrating a method performed by a data intake and query system of a DFS system in response to a reporting search query according to some embodiments of the present disclosure.
Figure 26:
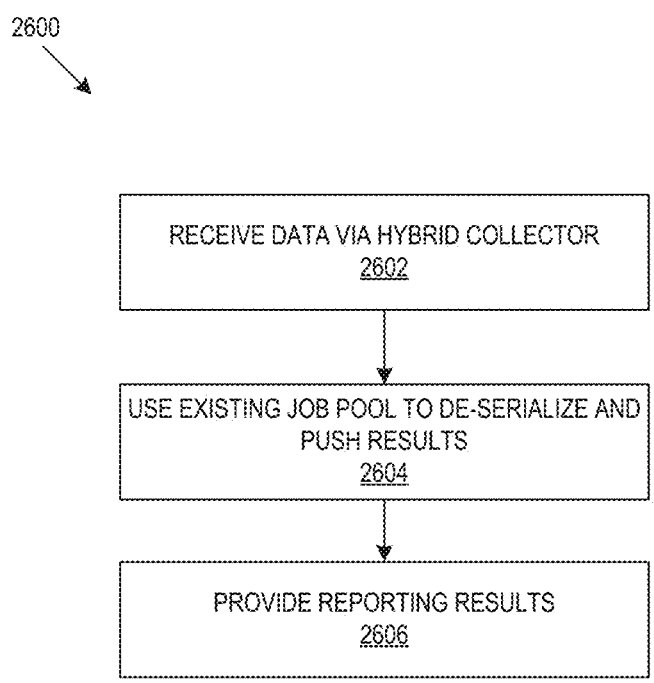

FIG. 25 is a flowchart illustrating a method performed by nodes of a DFS system to obtain search results in response to a batch or reporting search query according to some embodiments of the present disclosure. The method 2500 for processing batch or reporting search queries can involve steps performed by the DFS master, the service provider, and/or worker nodes to transform partial search results into search results into batch or reporting search results. The disclosed techniques also support both streaming and non-streaming for multiple data sources.

The transformation operations generally occur at the worker nodes. For example, an operation may include a statistical count of events having a particular IP address. The DFS can shard the data in certain partitions, and then each worker node can apply the transformation to that particular partition. In case it is the last reporting/transforming processor, then the transformed results are collated at the service provider, and then transmitted to the search head. However, if there is an reporting search beyond the statistical count, then another reshuffle of the partial search results can be executed among the worker nodes to put the different partitions on the same worker node, and then transforms can be applied. If this is the last reporting search, then results are sent back to the service provide node and then to the search head. This process continues as dictated by the DAG generated from the phase desired by the search head.

In step 2502, the worker nodes collect partial search results from the internal and/or external data sources. For example, a worker node may collect partial search results including data having data structures specified by the search query. In another example, the worker node may query an external data source for partial search results based on specific keywords included in a reporting search query, and collect the partial search results. The worker node may also collect partial search results from indexers, which were returned in response to application of the reporting search query by the search head to the indexers. The partial search results may be communicated from each data source to the worker nodes individually or in chunks (i.e., micro-batches). The worker nodes thus ingest partial search results obtained from the data sources in response to a search query.

In step 2504, the worker nodes can perform deserialization of the partial search results obtained from the data sources. Specifically, the partial search results transmitted by the data sources can be serialized by converting objects into a stream of bytes, which allows for saving the state of an object for subsequent recreation of the object at the worker nodes by using the reverse process of deserialization.

In step 2506, the worker nodes transform the de-serialized partial search results into a specified format. As such, partial search results collected in diverse formats can be transformed into a common specified format. The specified format may be specified to facilitate processing by a worker node. As such, diverse data types obtained from diverse data sources can be transformed into a common format to facilitate subsequent aggregation across all the partial search results obtained in response to the search query. As a result, the partial search results obtained by worker nodes can be transformed into, for example, data events having structures that are compatible to the data intake and query system.

Unlike cursored search queries, the time-order of partial search results is not necessarily considered when processing reporting queries. However, in step 2508, if a data source returns partial search results that are not associated with time values (e.g., no timestamp), the worker nodes can associate events or event chunks with a time value indicative of the time of ingestion of the events or chunks by the worker nodes (e.g., ingestion timestamp). In some embodiments, the worker nodes can associate the partial search results with any time value that can be measured relative to a reference time value. Associating time values with partial search results may facilitate tracking partial search results when processing reporting searches, or may be necessary when performing reporting searches that require time-ordered results (e.g., a hybrid of cursored and reporting searches).

In step 2510, the worker nodes determine whether the ingested partial search results were obtained by an internal data source or an external data source to bifurcate processing respectively. In other words, the worker nodes process the ingested partial search results differently depending on whether they were obtained from an internal data source (e.g., indexers) or an external data source, if needed. That is, this can be the case only when reporting searches are run in the indexers; however, if all the processors in the indexers are streaming, then no processing unique to the indexer data is needed. However, data from external data sources can be sanitized in terms of coding, timestamped, and throttles based on the timestamp.

In step 2512, for internal data sources, the worker nodes read the partial search results obtained from indexers of a data intake and query system in a sharded way. In particular, the worker nodes may use a list identifying indexers from which to pull the sharded partial search results. As discussed above, sharding involves partitioning datasets into smaller, faster, and more manageable parts called data shards. The sharded partitions can be determined from policies, which can be based on hash values by default. In the context of map-reduce techniques, the map step can be determined by the sharding and a predicate passed, which maps records matching the predicate to whatever is needed as the search result. The reduce step involves the aggregation of the shards. The results of a query are those items for which the predicate returns true.

In step 2514, the partial search results of the indexers are aggregated (e.g., combined and/or transformed) by the worker nodes. In particular, the partial search results can be in a pre-streaming format (semi-reduced), and need to be aggregated (e.g., reduced or combined) prior to aggregation with partial search results of external data sources. In step 2516, the aggregated partial search results of the indexers are aggregated (e.g., combined and/or transformed) with the partial search results obtained from external data sources. Lastly, in step 2518, the aggregated partial search results of internal and external data stores can be transmitted from the worker nodes in parallel search service (e.g., to the DFS master via a search service provider of the DFS system).

In step 2520, for external data sources, the worker nodes push predicates for the reporting search query to the external data sources. A predicate is a function that takes an argument, and returns a Boolean value indicating of true or false. The predicate can be passed as a query expression including candidate items, which can be evaluated to return a true or false value for each candidate item.

In step 2522, the network nodes can determine whether the external data sources may or may not be able to execute a sharded query. In step 2526, for an external data source that can execute a sharded query, the worker node reads the results in different shards. In some embodiments, the DFS master randomly chooses which worker nodes will execute the shards. In step 2524, for an external data sources that cannot execute a sharded query, a worker node has the ability to spillover to disk, and redistribute to other worker nodes.

In step 2528, the worker nodes can apply an aggregation (e.g., (e.g., combine and/or transform) or stream processing to have the partial search results ready for further processing against results from partial search results from the internal sources. Thus, referring back to step 2516, the worker nodes aggregate the partial search results from all data sources in response in response to the search query. For example, the worker nodes can apply a process similar to a reduction step of a map-reduce operation across all the partial search results obtained from diverse data sources. Then, in step 2518, the aggregate partial search results can be transmitted from the worker nodes in parallel to the search service provider 216. In particular, the service provider, can collect all the finalized searches results from the worker nodes, and return the results to the search head.

FIG. 26 is a flowchart illustrating a method performed by a data intake and query system of a DFS system in response to a batch or reporting search query according to some embodiments of the present disclosure. In particular, the method 2600 is performed by the data intake and query system to provide the batch or reporting search results obtained by querying internal and/or external data sources.

In step 2602, a search head of the data intake and query system receives the aggregate partial search results from the service provider via a hybrid collector. The number and function of the hybrid collectors is defined depending on the type of search executed. For example, for the transforming search, the search head can create only one collector to receive the final results from the search service provider and after serialization directly pushes into the search result queue. In step 2604, the search head uses an existing job pool to de-serialize search results, and can push the search results out. In such an operation, collation is not needed.

Lastly, in step 2606, the transformed search results could be provided to an analyst on a variety of mediums and in a variety of formats. For example, the time-ordered search results may be rendered as a timeline visualization on a user interface on a display device. The visualization can allow the analyst to investigate the search results. In another example, the time-ordered results may be provided to an analyst automatically on printed reports, or transmitted in a message sent over a network to a device to alert the analyst of a condition based on the search results.

Although the methods illustrated in FIGS. 23 through 26 include a combination of steps to obtain time ordered, unordered, or transformed search results from across multiple data sources that may or may not store timestamped data, the disclosed embodiments are not so limited. Instead, a portion of a combination of steps illustrated in any of these figures could be performed depending on the scope of the search query. For example, only a subset of steps may be performed when the partial search results for a search query is obtained exclusively from an external data source.

7.0. Co-Located Deployment Architecture

Figure 27:
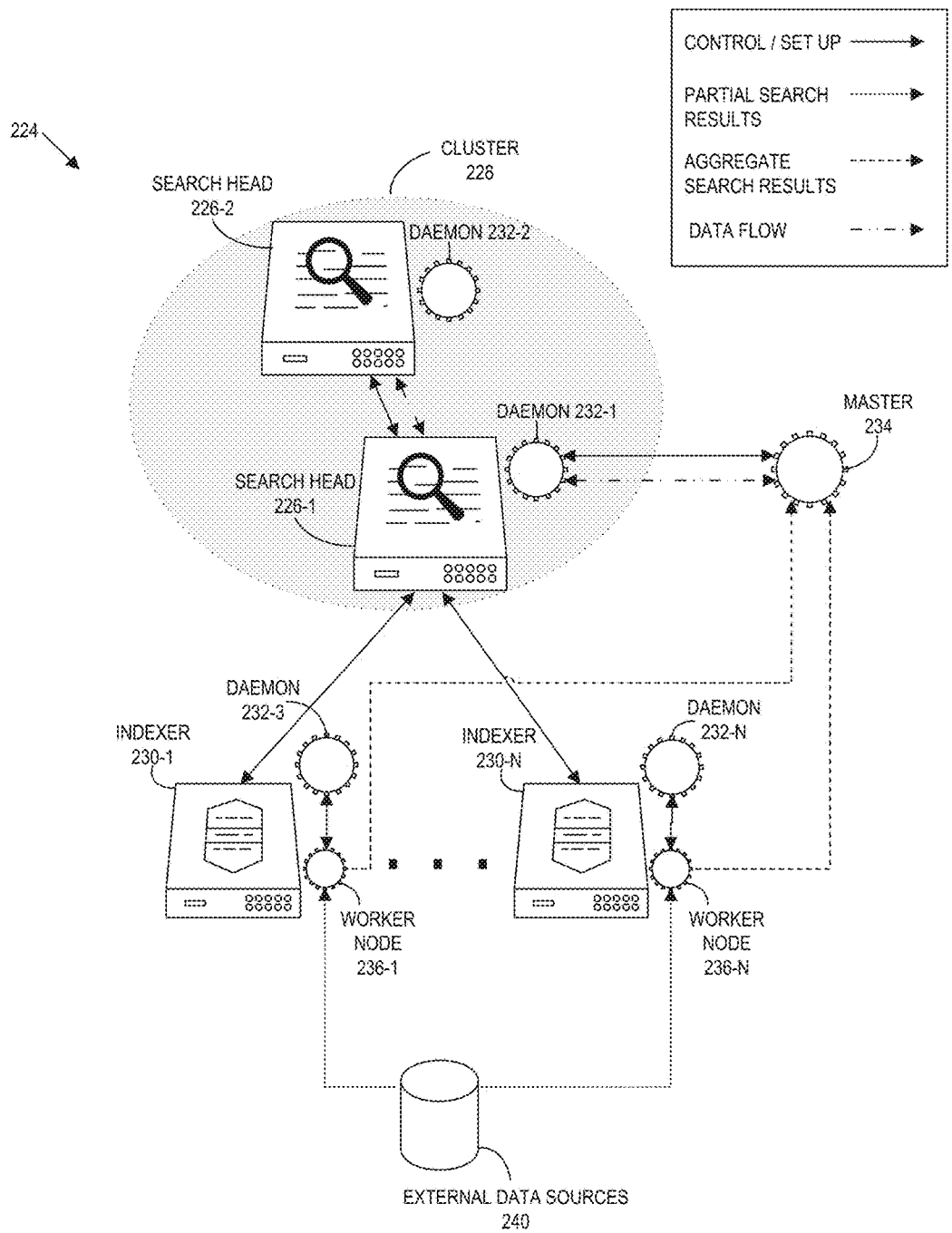
FIG. 27 is a system diagram illustrating a co-located deployment of a DFS system in which an embodiment may be implemented.

The capabilities of a data intake and query system can be improved by implementing the DFS system described above in a co-located deployment with the data intake and query system. For example, FIG. 27 is a system diagram illustrating a co-located deployment of a DFS system with the data intake and query system in which an embodiment may be implemented.

In the illustrated embodiment, the system 224 shows only some components of a data intake and query system but can include other components (e.g., forwarders, internal data stores) that have been omitted for brevity. In particular, the system 224 includes search heads 226-1 and 226-2 (referred to collectively as search heads 226). The search heads 226 collectively form a search head cluster 228. Although shown with only two search heads, the cluster 228 can include any number of search heads. Alternatively, an embodiment of the co-located deployment can include a single search head rather than the cluster 228.

The search heads 226 can operate alone or collectively to carry out search operations in the context of the co-located deployment. For example, a search head of the cluster 228 can operate as a leader that orchestrates search. As shown, the search head 226-1 is a leader of the cluster 228. Any of the search heads 226 can receive search queries that are processed collectively by the cluster 228. In some embodiments, a particular search head can be designated to receive a search query and coordinate the operations of some or all of the search heads of a cluster 228. In some embodiments, a search head of the cluster 228 can support failover operations in the event that another search head of the cluster 228 fails.

The cluster 228 is coupled to N peer indexers 230. In particular, the search head 226-1 can be a leader of the cluster 228 that is coupled to each of the N peer indexers 230. The system 224 can run one or more daemons 232 that can carry out the DFS operations of the co-located deployment. In particular, the daemon 232-1 of the search head 226-1 is communicatively coupled to a DFS master 234, which coordinates control of DFS operations. Moreover, each of the N peer indexers 230 run daemons 232 communicatively coupled to respective worker nodes 236. The worker nodes 236 are coupled to one or more data sources from which data can be collected as the partial search results of a search query. For example, the worker nodes 236 can collect partial search results of the indexers from internal data sources (not shown) and one or more of external data sources 240. Lastly, the worker nodes 236 are communicatively coupled to the DFS master 234 to form the DFS architecture of the illustrated co-located embodiment.

7.1. Co-Located Deployment Operations

Figure 28:
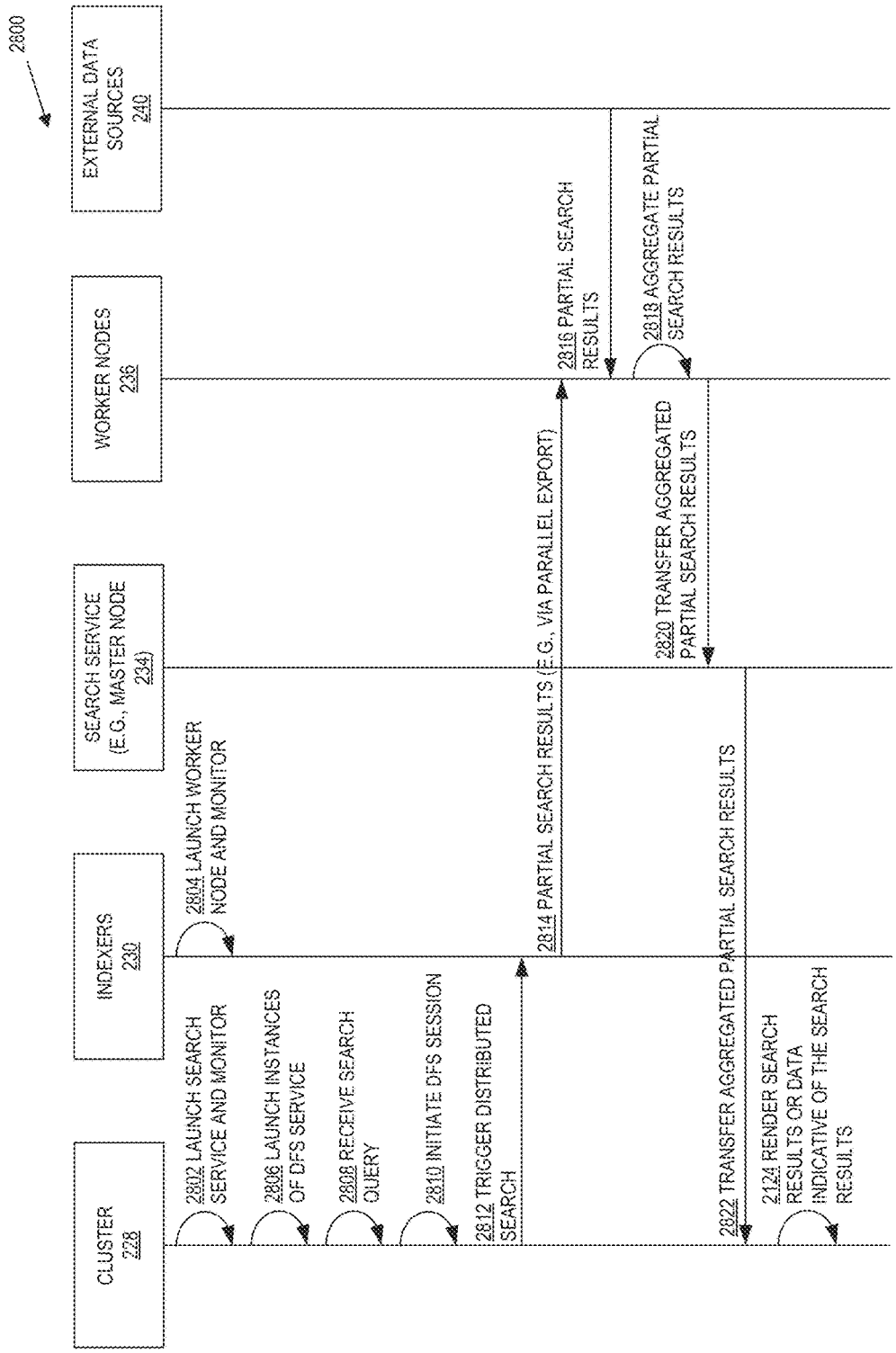
FIG. 28 is an operation flow diagram illustrating an example of an operation flow of a co-located deployment of a DFS system according to some embodiments of the present disclosure.

FIG. 28 is an operation flow diagram illustrating an example of an operation flow of a co-located deployment of a DFS system with a data intake and query system according to some embodiments of the present disclosure. The operational flow 2800 shows the processes for establishing the co-located DFS system and search operations carried out in the context of the co-located deployment.

In step 2802, a search head of the cluster 228 can launch the DFS master 234 and/or launch a connection to the DFS master 234. For example, a search head can use a modular input to launch an open source DFS master 234. Moreover, the search head can use the modular input to launch a monitor of the DFS master 234. The modular input can be a platform add-on of the data intake and query system that can be accessed in a variety of ways such as, for example, over the Internet on a network portal.

In step 2804, the peer indexers 230 can launch worker nodes 236. For example, each peer indexer 230 can use a modular input to launch an open source worker node. In some embodiments, only some of the peer indexers 230 launch worker nodes, which results in a topology where not all of the peer indexers 230 have an associated worker node. Moreover, the peer indexers 228 can use the modular input to launch a monitor of the worker nodes 236.

In step 2806, the cluster 228 can launch one or more instances of a DFS service. For example, any or each of the search heads of the cluster 228 can launch an instance of the DFS service. Hence, the co-located deployment can launch and use multiple instances of a DFS service but need only launch and use a single DFS master 234. In the event that a launched DFS master fails, the lead search head using the monitoring modular input can restart the failed DFS master. However, if the DFS master fails along with the lead search head, another search head can be designated as the cluster 228's leader and can re-launch the DFS master.

In step 2808, a search head of the cluster 228 can receive a search query. For example, a search query may be input by a user on a user interface of a display device. In another example, the search query can be input to the search head in accordance with a scheduled search.

In step 2810, a search head of the cluster 228 can initiate a DFS search session with the local DFS service. For example, any of the member search heads of the cluster 228 can receive a search query and, in response to the search query, a search head can initiate a DFS search session using an instance of the DFS service.

In step 2812, a search head of the cluster 228 triggers a distributed search on the peer indexers 230 if the search query requires doing so. In other words, the search query is applied on the peer indexers 230 to collect partial search results from internal data stores (not shown).

In step 2814, the distributed search operations continue with the peer indexers 230 retrieving partial search results from internal data stores, and transporting those partial search results to the worker nodes 236. In some embodiments, the internal partial search results are partially reduced (e.g., combined), and transported by the peer indexers 230 to their respective worker nodes 236 in accordance with parallel exporting techniques. In some embodiments, if each peer indexer does not have an associated worker node, the peer indexer can transfer its partial search results to the nearest worker node in the topology of worker nodes. In step 2816, the worker nodes 236 collect the partial search results extracted from the external data sources 240.

In step 2818, the worker nodes 236 can aggregate (e.g., merge and reduce) the partial search results from the internal data sources and the external data sources 240. For example, the aggregation of the partial search results may include combining the partial search results of indexers 230 and/or the external data stores 240. Hence, the worker nodes 236 can aggregate the collective partial search results at scale based on DFS native processors residing at the worker nodes 236.

In some embodiments, the aggregated partial search results can be stored in memory at worker nodes before being transferred between other worker nodes to execute a multi-staged parallel aggregation operation. Once aggregation of the partial search results has been completed (e.g., completely reduced) at the worker node 236, the aggregated partial search results can be read by the DFS service running locally to the cluster 228. For example, the DFS service can commence reading the aggregated search results as event chunks.

In step 2820, the aggregate partial search results read by the DFS service are transferred to the DFS master 234. Then, in step 2822, the DFS master 234 can transfer the final search results to the cluster 228. For example, the aggregated partial search results can be transferred by the worker nodes 236 as event chunks at scale to the DFS master 234, which can transfer search results (e.g., those received or derived therefrom) to the lead search head orchestrating the DFS session.

Lastly, in step 2822, a search head can cause the search results or data indicative of the search results to be rendered on user interface of a display device. For example, the search head member can make the search results available for visualizing on a user interface rendered on the display device.

8.0. Cloud Deployment Architecture

Figure 29:
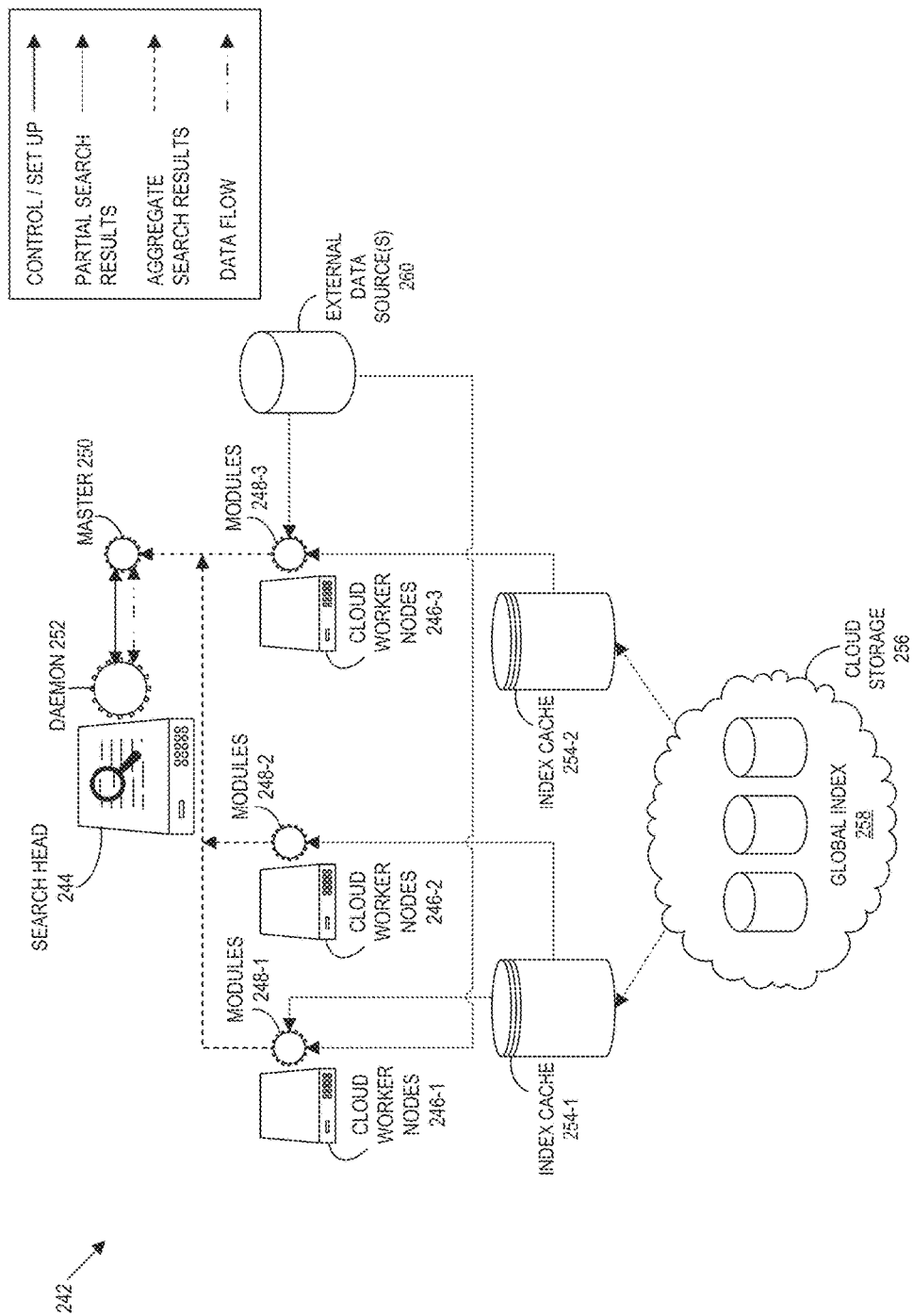
FIG. 29 is a cloud based system diagram illustrating a cloud deployment of a DFS system in which an embodiment may be implemented.

The performance and flexibility of a data intake and query system having capabilities extended by a DFS system can be improved with deployment on a cloud computing platform. For example, FIG. 29 is a cloud-based system diagram illustrating a cloud deployment of a DFS system in which an embodiment may be implemented.

In particular, a cloud computing platform can share processing resources and data in a multi-tenant network. As such, the platform's computing services can be used on demand in a cloud deployment of a DFS system. The platform's ubiquitous, on-demand access to a shared pool of configurable computing resources (e.g., networks, servers, storage, applications, and services), which can be rapidly provisioned and released with minimal effort, can be used to improve the performance and flexibility of a data intake and query system extended by a DFS system.

In the illustrated embodiment, a cloud-based system 242 includes components of a data intake and query system extended by the DFS system implemented on a cloud computing platform. However, the cloud-based system 242 is shown with only some components of a data intake and query system in a cloud deployment but can include other components (e.g., forwarders) that have been omitted for brevity. As such, the components of the cloud-based system 242 can be understood by analogy to other embodiments described elsewhere in this disclosure.

An example of a suitable cloud computing platform include Amazon web services (AWS), which includes elastic MapReduce (EMR) web services. However, the disclosed embodiments are not so limited. Instead, the cloud-based system 242 could include any cloud computing platform that uses EMR-like clusters ("EMR clusters").

In particular, the cloud-based system 242 includes a search head 244 as a tenant of a cloud computing platform. Although shown with only the search head 244, the cloud-based system 242 can include any number of search heads that act independently or collectively in a cluster. The search head 244 and other components of the cloud-based system 242 can be configured on the cloud computing platform.

The cloud-based system 242 also includes any number of worker nodes 246 as cloud instances ("cloud worker nodes 246"). The cloud worker nodes 246 can include software modules 248 running on hardware devices of a cloud computing platform. The software modules 248 of the cloud worker nodes 246 are communicatively coupled to a search service (e.g., including a DFS master 250), which is communicatively coupled to a daemon 252 of the search head 244 to collectively carry out operations of the cloud-based system 242.

The cloud-based system 242 includes index cache components 254. The index cache components 254 are communicatively coupled to cloud storage 256, which can form a global index 258. The index cache components 254 are analogous to indexers, and the cloud storage 256 is analogous to internal data stores described elsewhere in this disclosure. The index cache components 254 are communicatively coupled to the cloud worker nodes 246, which can collect partial search results from the cloud storage 256 by applying a search query to the index cache components 254.

Lastly, the cloud worker nodes 246 can be communicatively coupled to one or more external data sources 260. In some embodiments, only some of the cloud worker nodes 246 are coupled to the external data sources 260 while others are only coupled to the index cache components 254. For example, the cloud worker nodes 246-1 and 246-3 are coupled to both the external data sources 260 and the index cache component 254, while the cloud worker node 246-2 is coupled to the index cache component 254-1 but not the external data sources 260.

The scale of the cloud-based system 242 can be changed dynamically as needed based on any number of metrics. For example, the scale can change based on pricing constraints. In another example, the scale of the EMR cluster of nodes can be configured to improve the performance of search operations. For example, the cloud-based system 242 can scale the EMR cluster depending on the scope of a search query to improve the efficiency and performance of search processing.

In some embodiments, the EMR clusters can have access to flexible data stores such as a Hadoop distributed file system (HDFS), Amazon simple storage services (S3), NoSQL, SQL, and custom SQL. Moreover, in some embodiments, the cloud-based system 242 can allow for a sharded query of data within these flexible data stores in a manner which makes scaling and aggregating partial search results (e.g., merging) most efficient while in place (e.g., reduces shuffling of partial search results between cloud worker nodes).

8.1. Cloud Deployment Operations

Figure 30:
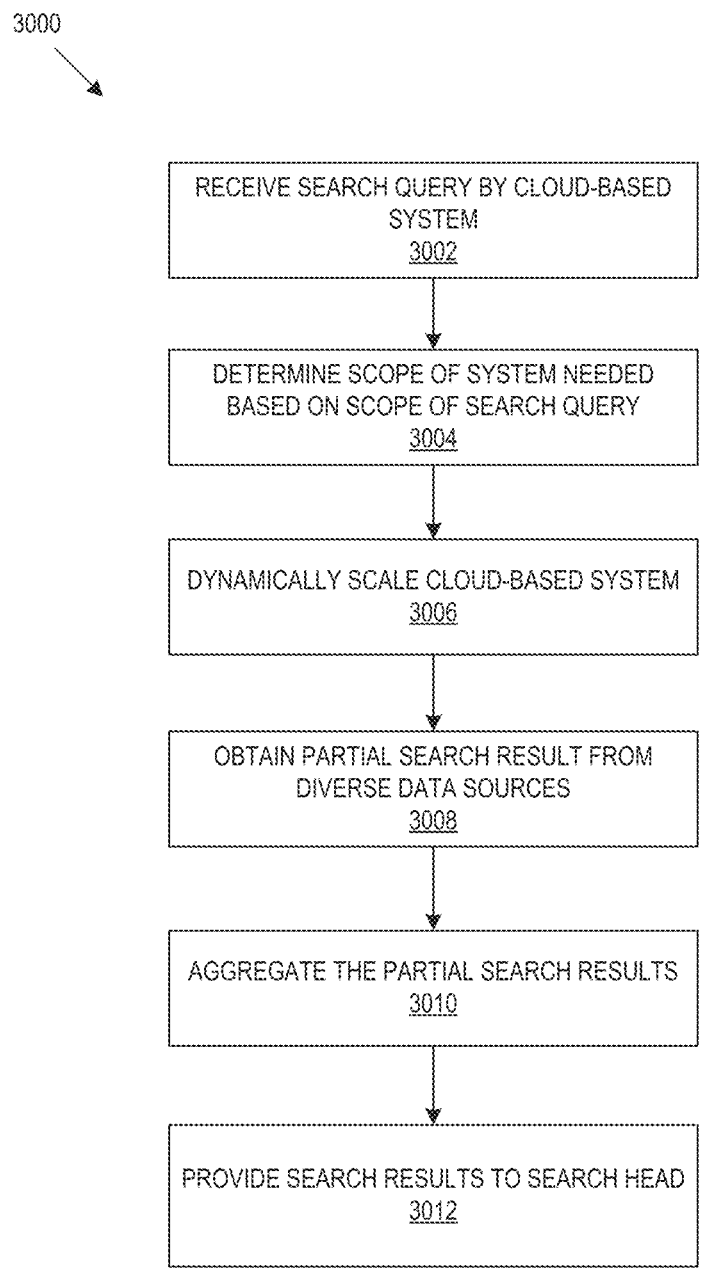
FIG. 30 is a flow diagram illustrating an example of a method performed in a cloud-based DFS system according to some embodiments of the present disclosure.

FIG. 30 is a flow diagram illustrating an example of a method performed in a cloud-based DFS system ("cloud-based system") according to some embodiments of the present disclosure. The operations of the cloud-based system are analogous to those described elsewhere in this disclosure with reference to other embodiments and, as such, a person skilled in the art would understand those operations in the context of a cloud deployment. Accordingly, a description of the flow diagram 3000 highlights some distinctions of the cloud deployment over other embodiments described herein.

In step 3002, the search head of the cloud-based system receives a search query. In step 3004, the cloud-based system determines the type of EMR cluster to use based on the scope of the received search query. For example, the cloud-based system can support two different types of EMR clusters. In a first type scenario, a single large EMR cluster could be used for all search operations. In a second type scenario, subsets of smaller EMR clusters can be used for each type of search load. That is, a smaller subset of an EMR cluster can be used for a less complex aggregation processing of partial search results from different data sources. In some embodiments, the scale of an EMR cluster for the first or second type can be set for each search load by a user or based on a role quota. In other words, the scale of the EMR cluster can depend on the user submitting the search query and/or the user's designated role in the cloud-based system.

In step 3006, the cloud-based system is dynamically scaled based on the needs determined from the received search query. For example, the search heads or cloud worker nodes can be scaled under the control of a search service to grow or shrink as needed based on the scale of the EMR cluster used to process search operations.

In step 3008, the cloud worker nodes can collect the partial search results from various data sources. Then, in step 3010, the cloud worker nodes can aggregate the partial search results collected from the various data sources. Since the cloud worker nodes can scale dynamically, this allows for aggregating (e.g., merging) partial search results in an EMR cluster of any scale.

In step 3012, the resulting aggregated search results can be computed and reported at scale to the search head. Thus, the cloud-based system can ensure that data (e.g., partial search results) from diverse data sources (e.g., including time-indexed events with raw data or other type of data) are reduced (e.g., combined) at scale on each EMR node of the EMR cluster before sending the aggregated search results to the search head.

The cloud-based system may include various other features that improve on the data intake and query system extended by the DFS system. For example, in some embodiments, the cloud-based system can collect metrics which can allow for a heuristic determination of spikes in DFS search requirements. The determination can also be accelerated through auto-scaling of the EMR clusters.

In some embodiments, the cloud-based system can allow DFS apps of the data intake and query system to be bundled and replicated over an EMR cluster to ensure that they are executed at scale. Lastly, the cloud-based system can include mechanisms that allow user- or role-quota-honoring based on a live synchronization between the data intake and query system user management features and a cloud access control features.

9.0. Timeline Visualization

The disclosed embodiments include techniques for organizing and presenting search results obtained from within a big data ecosystem via a data intake and query system. In particular, a data intake and query system may cause output of the search results or data indicative of the search results on a display device. An example of a display device is the client device 22 shown in FIG. 1 connected to the data intake and query system 16 over the network 18.

For example, the data intake and query system 16 can receive a search query input by a user at the client device 22. The data intake and query system 16 can run the query on distributed data systems to obtain search results. The search results are then communicated to the client device 22 over the network 18. The search results can be rendered in a visual way on the display of the client device 22 using items such as windows, icons, menus, and other graphics or controls.

For example, a client device can run a web browser that renders a website, which can grant a user access to the data intake and query system 16. In another example, the client device can run a dedicated application that grants a user access to the data intake and query system 16. In either case, the client device can render a graphical user interface (GUI), which includes components that facilitate submitting search queries, and facilitate interacting with and interpreting search results obtained by applying the submitted search queries on distributed data systems of a big data ecosystem.

The disclosed embodiments include a timeline tool for visualizing the search results obtained by applying a search query to a combination of internal data systems and/or external data systems. The timeline tool includes a mechanism that supports visualizing the search results by organizing the search results in a time-ordered manner. For example, the search results can be organized into graphical time bins. The timeline tool can present the time bins and the search results contained in one or more time bins. Hence, the timeline tool can be used by an analyst to visually investigate structured or raw data events which can be of interest to the analyst.

The timeline mechanism supports combining time-stamped and non-timestamped search results obtained from diverse data systems to present a visualization of the combined search results. For example, a search query may be applied to the external data systems that each use different compute resources and run different execution engines. The timeline mechanism can harmonize the search results from these data systems, and a GUI rendered on a display device can present the harmonized results in a time-ordered visualization.

Figure 31:
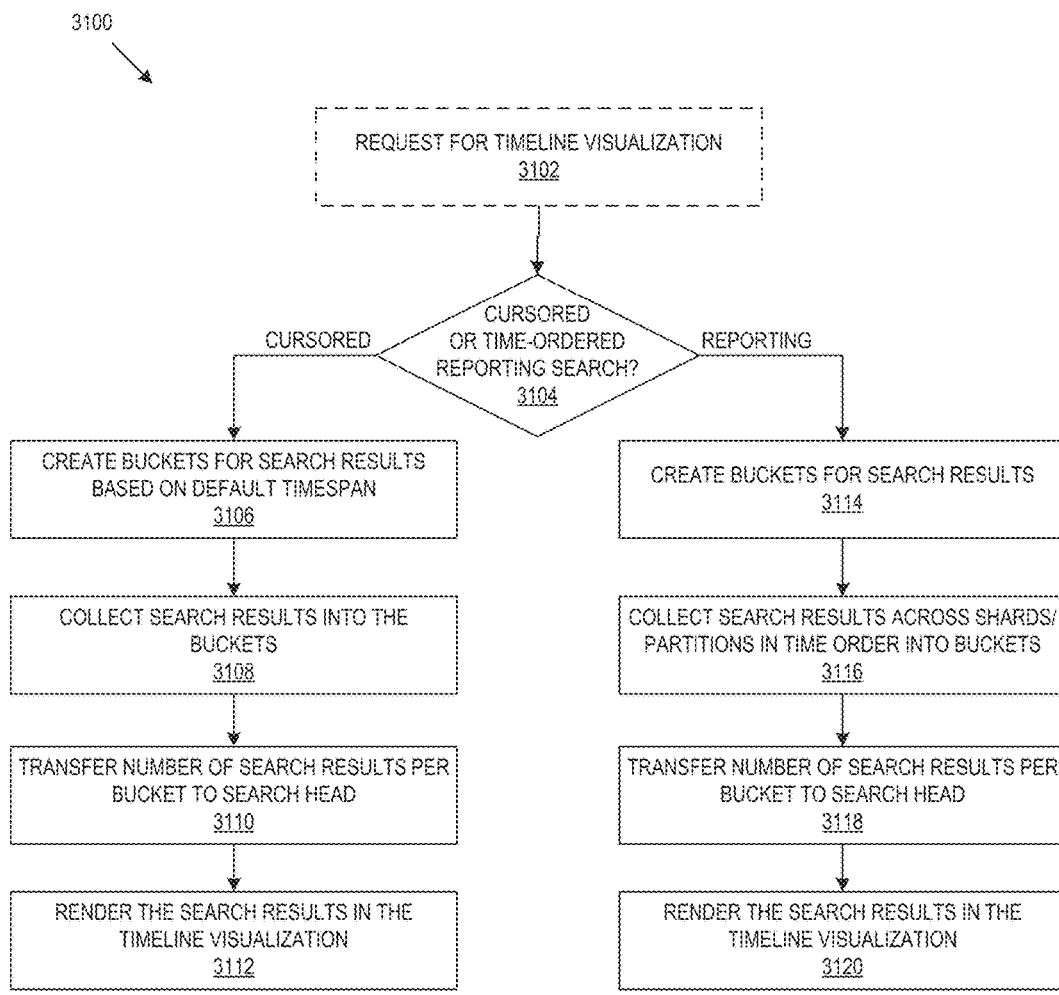
FIG. 31 is a flow diagram illustrating a timeline mechanism that supports rendering search results in a time-ordered visualization according to some embodiments of the present disclosure.

FIG. 31 is a flowchart illustrating a timeline mechanism that supports rendering search results in a time-ordered visualization according to some embodiments of the present disclosure. For example, the search head can dictate to the DFS master whether a cursored or reporting search should be executed. The search service provider then receives the specific search request, and creates a DAG accordingly. Then the DAG orchestrates the search operations performed by the worker nodes for the cursored or reporting search.

In step 3102, the search service receives an indication that a request for a timeline visualization was received by the data intake and query system. For example, a user may input a request for a timeline visualization before, after, or when a search query is input at a client device. In another example, the data intake and query system automatically processes time-ordered requests to visualize in a timeline In step 3104, the search service determines whether the requested visualization is for the search results of a cursored search or a time-ordered reporting search. For example, a cursored search may query indexers of the data intake and query system as well as external data stores for a combination of time ordered partial search results. In another example, a time-ordered reporting search may require querying the indexers and external data stores for a time-ordered statistic based on the combination of time ordered partial search results.

The search results for the timeline tool can be obtained in accordance with a "Fast," "Smart," or "Verbose" search mode depending on whether a cursored search or a reporting search was received. In particular, a cursored search supports all three modes whereas a reporting search may only support the Verbose mode. The Fast mode prioritizes performance of the search and does not return nonessential search results. This means that the search returns what is essential and required. The Verbose mode returns all of the field and event data it possibly can, even if the search takes longer to complete, and even if the search includes reporting commands. Lastly, the default Smart mode switches between the Fast and Verbose modes depending on the type of search being run (e.g., cursored or reporting).

In step 3106, if the search is a cursored search, the search service creates buckets for the search results obtained from distributed data systems. The buckets are created based on a timespan value. The timespan value may be a default value or a value selected by a user. For example, a timespan value may be 24 hours. The buckets may each represent a distinct portion of the timespan. For example, each bucket may represent a distinct hour over a time-span of 24 hours.

The number of buckets that are created may be a default value depending on the timespan, or depending on the number of data systems from which search results were collected. For example, a default number of buckets (e.g., 1,000 buckets) may be created to span a default or selected timespan. In another example, distinct and unique buckets are created for portions of the timespan. In another example, a unique bucket is created per data system. In yet another example, buckets are created for the same portion of the timespan but for different data systems.

In step 3108, search results obtained by application of the search query to the different data systems are collected into the search buckets. For example, each bucket can collect the partial search results from different data systems that are timestamped with values within the range of the bucket. As such, the buckets support the timeline visualization by organizing the search results.

In step 3110, the search service transfers a number of search results contained in the buckets to the search head. However, the search service may need to collect all the search results from across the data systems into the buckets before transferring the search results to the search head to ensure that the timeline visualization is rendered accurately. Moreover, the search results of the bucket may be transferred from the buckets in chronological order. For example, the contents of the buckets representing beginning of the timespan are transferred first, and the contents of the next buckets in time are transferred next, and so on.

In some embodiments, the number of search results transferred to the search head from the buckets may be a default or maximum value. For example, the first 1,000 search results from the buckets at the beginning of the timespan may be first transferred to the search head first. In some embodiments, the search service transfer a maximum number of search results per bin to the search head. In other words, the number of search results transferred to the search head corresponds to the maximum number that can be contained in one or more bin of the timeline visualization.

Lastly, in step 3112, the search results of the reporting search received by the search head from the buckets are rendered in a timeline visualization.

In step 3114, if the search is a time-ordered reporting search, the search service creates buckets for the search results obtained from distributed data systems. The buckets can be created based on the number of shards or partitions from which the search results are collected.

In step 3116, the search results are collected from across the partitions. For external data sources, partial search results (e.g., treated as raw events) are collected from across the shards/partitions in time-order and transferred to the timeline mechanism. In case of external data systems which have the capability to support sharded partitions, multiple worker nodes can request for each specific shard or partition. If needed, each partition can be sorted based on user specified constraints such as, for example, a time ordering constraint. For sorting purposes, sometimes instead of unique shards, the DFS system can provide overlapping shards. For overlapping buckets across multiple data sources, the search service may need to collect partial search results across the different data sources before sending search results to the search head.

In step 3118, the search service transfers a number of search results contained in the buckets to the search head. However, the search service may need to collect all the search results from across the data systems into the buckets before transferring the search results to the search head to ensure that the timeline visualization is rendered accurately. Moreover, the search results of the bucket may be transferred from the buckets in chronological order. For example, the contents of the buckets representing beginning of the timespan are transferred first, and the contents of the next buckets in time are next, and so on.

In some embodiments, the number of search results transferred to the search head from the buckets may be a default or maximum value. For example, the first 1,000 search results from the buckets at the beginning of the timespan may be first transferred to the search head first. In some embodiments, the search service transfers a maximum number of search results per bin to the search head. In other words, the number of search results transferred to the search head corresponds to the maximum number that can be contained in one or more bin of the timeline visualization.

Lastly, in step 3120, the search results of the reporting search received by the search head from the buckets are rendered in a timeline visualization.

Figure 32:
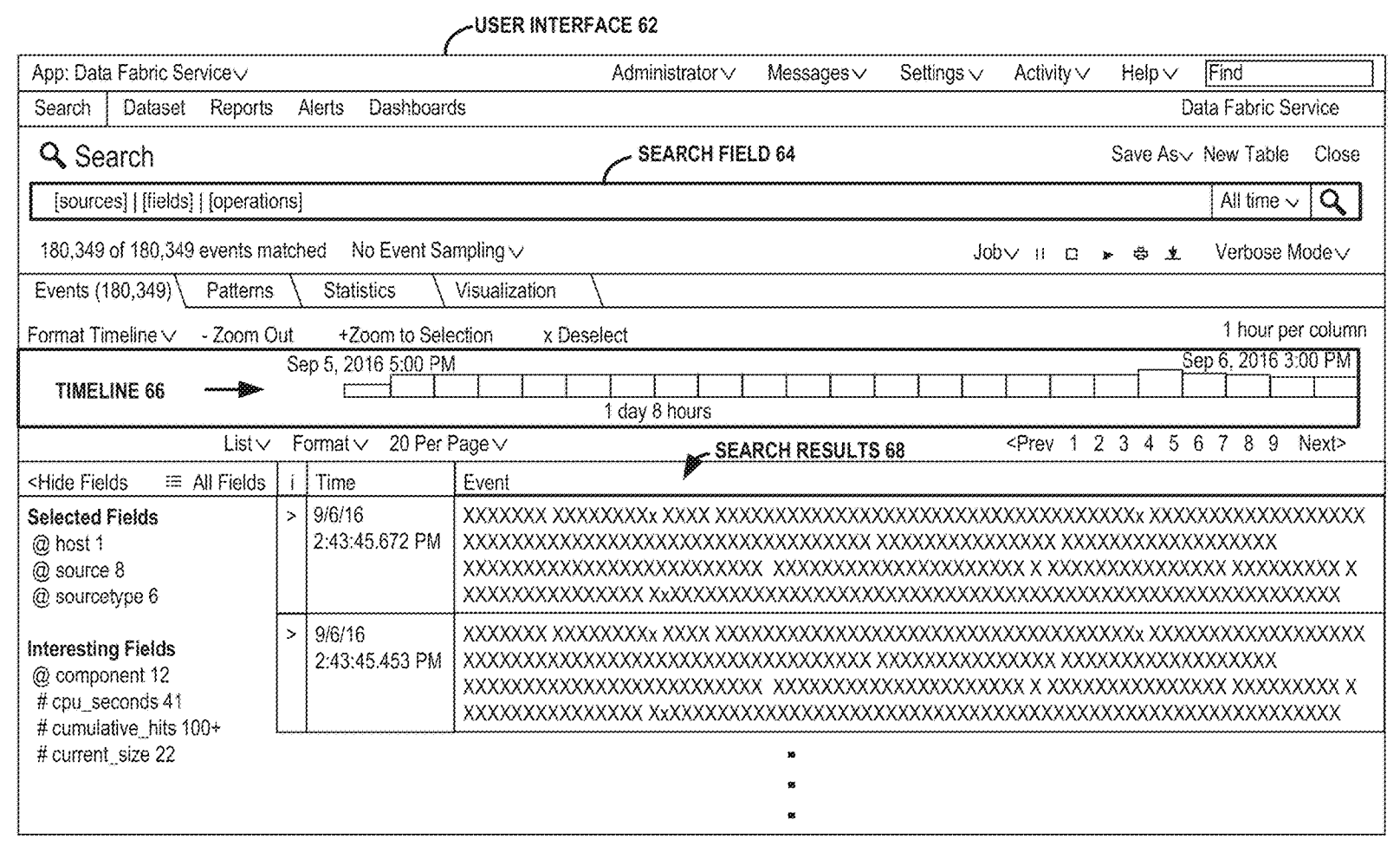

FIG. 32 illustrates a timeline visualization rendered on a user interface 62 in which an embodiment may be implemented. The timeline visualization presents event data obtained in accordance with a search query submitted to a data intake and query system. In the illustrated embodiment, the search query is input to search field 64 using SPL, in which a set of inputs is operated on by a first command line, and then a subsequent command following the pipe symbol "|" operates on the results produced by the first command, and so on for additional commands. As shown, a command on the left of the pipe symbol can set the scope of the search, which could include external data systems. Other commands on the right of the pipe symbol (and subsequent pipe symbols) can specify a field name and/or statistical operation to perform on the data sources.

In some embodiments, the search head can implement specific mechanism in to parse the SPL. The search head can determine that some portion of the search query needs to be executed on the worker nodes base on the scope of the search query requiring retrieval of search results from external data sources. In some embodiments, the search query can include a specific search command that triggers the search head to realize which portion of the search query should be executed by the DFS system. As a result, the phase generator can define the search phases, and where each of those phases will be executed. In addition, once the phase generator decides an operation needs to be executed by the DFS system, the search head can optimize to push as much of the search operation as possible, for example, first to the external data source and then to the DFS system. In some embodiments, only the commands not included in the DFS command set will be executed back on the search head once the results are retrieved to the search head.

The timeline visualization presents multiple dimensions of data in a compact view, which reduced the cognitive burden on analysts viewing a complex collection of data from internal and/or external data systems. That is, the timeline visualization provides a single unified view to facilitate analysis of events stored across the big data ecosystem. Moreover, the timeline visualization includes selectable components to manipulate the view in a manner suitable for the needs of an analyst.

The timeline visualization includes a graphic 66 that depicts a summary of the search results in a timeline lane (e.g., in the form of raw events), as well as a list of the specific search results 68. As shown, the timeline summary of the search results are presented as rectangular bins that are chronologically ordered and span a period of time (e.g., Sep. 5, 2016 5:00 PM through Sep. 6, 2016 3:00 PM). The height of a bin represents the magnitude of the quantity of events in that group relative to another group arranged along the timeline. As such, the height of each bin indicates a count of events for a subset of the period of events relative to other counts for other bins within the period of time. The events in a group represented by a bin may have a timestamp value included in the range of time values of the corresponding bin. Below the timeline summary is a listing of events of the search results presented in chronological order.

Figure 33:
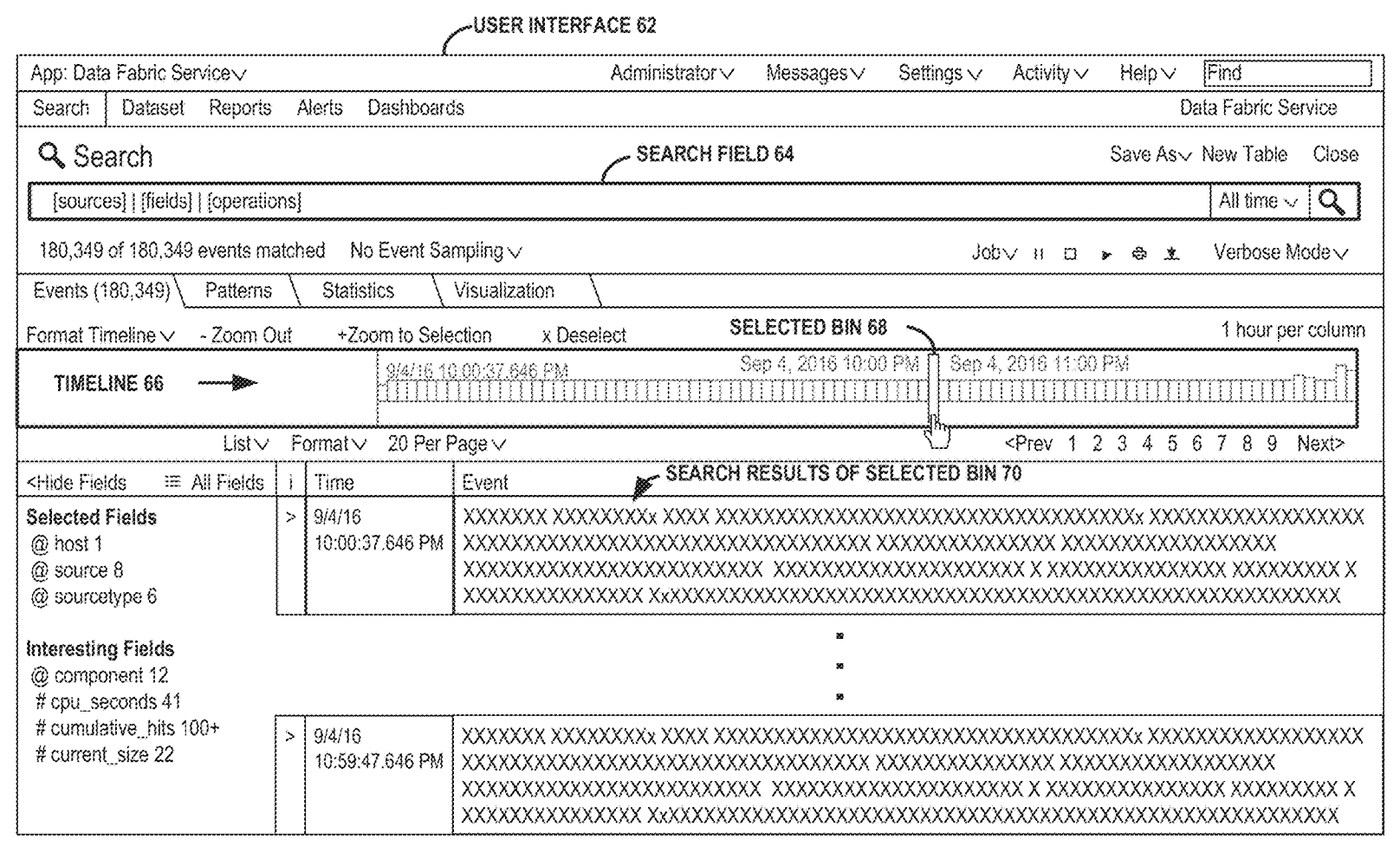

FIG. 33 illustrates a selected bin 68 of the timeline visualization and the contents of the selected bin 70 according to some embodiments of the present disclosure. Specifically, the timeline visualization may include graphic components that enable an analyst to investigate additional dimensions of the search results summarized in the timeline. As shown, each bin representing a group of events may be selectable by an analyst. Selecting a bin may cause the GUI to display the specific group of events associated with the bin in the list below the timeline summary. Specifically, selecting a bin may cause the GUI to display the events of the search results that are timestamped within a range of the corresponding group.

The timeline visualization is customizable and adaptable to present search results in various convenient manners. For example, a user can change the ordering of groups of events to obtain a different visualization of the same groups. In another example, a user can change the range of the timeline to obtain a filtered visualization of the search results. In yet another example, a user can hide some events to obtain a sorted visualization of a subset of the search results.

In some embodiments, the activity for each data system may appear in a separate timeline lane. If an activity start-time and duration are available for a particular data system, the respective timeline may show a duration interval as a horizontal bar in the lane. If a start time is available, the timeline visualization may render an icon of that time on the visualization. As such, the timeline visualization can be customized and provide interactive features to visualize search results, and communicate the results in dashboards and reports.

Thus, the timeline visualization can support a timeline visualization of external data systems, where each external data system may operate using different compute resources and engines. For example, the timeline visualization can depict search results obtained from one or more external data systems, collated and presented in a single and seamless visualization. As such, the timeline visualization is a tool of underlying logic that facilitates investigating events obtained from any of the external data systems, internal data systems (e.g., indexers), or a combination of both.

The underlying logic can manage and control the timeline visualization rendered on the GUI in response to data input and search results obtained from within the big data ecosystem. In some embodiments, the underlying logic is under the control and management of the data intake and query system. As such, an analyst can interface with the data intake and query system to use the timeline visualization. For example, the timeline logic can cause the timeline visualization to render activity time intervals and discrete data events obtained from various data system resources in internal and/or external data systems.

The underlying logic includes the search service. Since the bins may include events data from multiple data systems, each bin can represent an overlapping bin across multiple data systems. Accordingly, the search service can collect the data events across the different data systems before sending them to the search head. To finalize a search operation, the search service may transmit the maximum number of events per bin or the maximum size per bin to the search head.

In some embodiments, the underlying logic uses the search head of the data intake and query system to collect data events from the various data systems that are presented on the timeline visualization. In some embodiments, the events are collected in accordance with any of the methods detailed above, and the timeline visualization is a portal for viewing the search results obtained by implementing those methods. As such, the collected events can have timestamps indicative of, for example, times when the event was generated.

The timestamps can be used by the underlying logic to sort the events into the bins associated with any parameter such as a time range. For example, the underlying logic may include numerous bins delineated by respective chronological time ranges over a total period of time that includes all the bins. In some embodiments, a maximum amount of events transferred into the time bins could be set.

In some embodiments, the underlying logic of the timeline visualization can automatically create bins for a default timespan in response to cursored searches of ordered data. For example, an analyst may submit a cursored search, and the underlying logic may cause the timeline visualization to render a display for events within a default timespan. The amount and rate at which the events are transferred to the search head for subsequent display on the timeline visualization could vary under the control of the underlying logic. For example, a maximum number of events could be transferred on a per bin basis by the worker nodes to the search head. As such, the DFS system could balance the load on the network.

In some embodiments, the underlying logic of the timeline visualization can utilize the sharding mechanism detailed above for reporting searches of ordered data from external data systems. Specifically, the data could be sharded across partitions in response to a reporting search, where executors have overlapping partitions. Further, the underlying logic may control the search head to collect the events data across the shards/partitions in time order for rendering on the timeline visualization. Under either the cursored search or reporting search, the underlying logic may impose the maximum size of total events transferred into bins.

10.0. Monitoring and Metering Services

The disclosed embodiments also include monitoring and metering services of the DFS system. Specifically, these services can include techniques for monitoring and metering metrics of the DFS system. The metrics are standards for measuring use or misuse of the DFS system. Examples of the metrics include data or components of the DFS system. For example, a metric can include data stored or communicated by the DFS system or components of the DFS system that are used or reserved for exclusive use by customers. The metrics can be measured with respect to time or computing resources (e.g., CPU utilization, memory usage) of the DFS system. For example, a DFS service can include metering the usage of particular worker nodes by a customer over a threshold period of time.

In some embodiments, a DFS service can meter the amount hours that a worker node spends running one or more tasks (e.g., a search requests) for a customer. In another example, a DFS service can meter the amount of resources used to run one or more tasks rather than, or in combination with, the amount of time taken to complete the task(s). In some embodiments, the licensing approaches include the total DFS hours used per month billed on a per hour basis; the maximum capacity that can be run at any one time, e.g. the total number of workers with a cap on the amount of size of each worker defined by CPU and RAM available to that worker; and finally a data volume based approach where the customer is charged by the amount of data brought into the DFS for processing.

Figure 34:
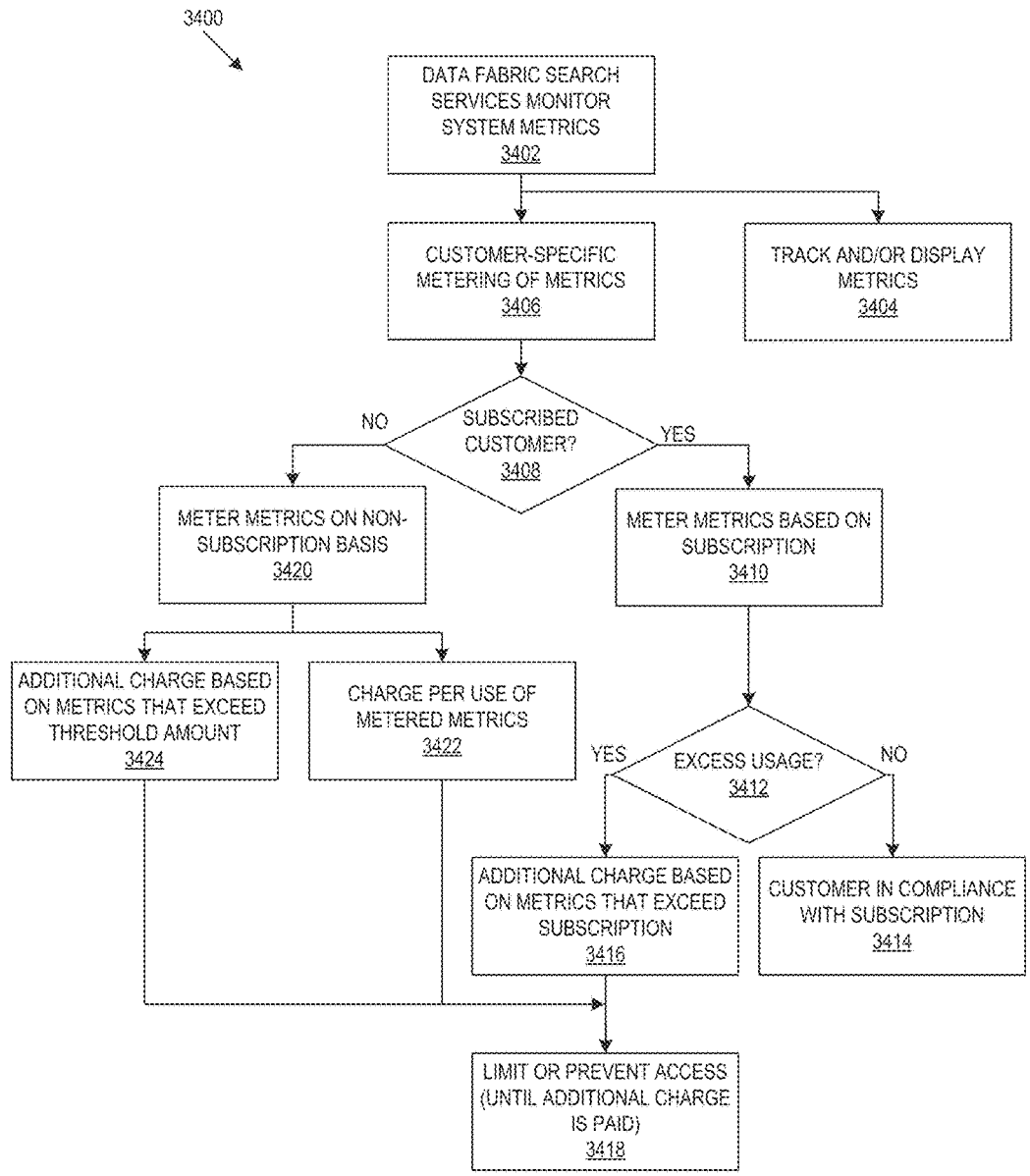
FIG. 34 is a flow diagram illustrating services of a DFS system according to some embodiments of the present disclosure.

FIG. 34 is a flow diagram illustrating monitoring and metering services of the DFS system according to some embodiments of the present disclosure. In the illustrated embodiment, in step 3402, the DFS services can monitor one or more metrics of a DFS system. The DFS services can monitor the DFS system for a variety of reasons. For example, in step 3404, a DFS service can track metrics and/or display monitored metrics or data indicative of the monitored metrics. Hence, the metrics can be preselected by, for example, a system operator or administrator seeking to analyze system stabilities, instabilities, or vulnerabilities.

In some embodiments, the DFS services can meter use of the DFS system as a mechanism for billing customers. For example, in step 3406, the DFS services can monitor specific metrics for specific customers that use the DFS system. The metering services can differ depending on whether the customer has a subscription to use the DFS system or is using the DFS system on an on-demand basis. As such, a DFS service can run a value-based licensing agreement that allows customers to have a fair exchange of value for their use of the DFS service.

In step 3408, a determination is made about whether a customer has a subscription to use the DFS system. The subscription can define the scope of a license granted to a customer to access or use the DFS system. The scope can define an amount of functionality available to the customer. The functionality can include, for example, the number or types of searches that can be performed on the DFS system. In some embodiments, the scope granted to a user can vary in proportion to cost. For example, customers can purchase subscriptions of different scope for different prices, depending on the needs of the customers. As such, a DFS service can run a value-based licensing agreement that allows customers to have a fair exchange of value for their use of the DFS service.

In step 3410, if the customer is subscribed, the DFS service can meter metrics based on a subscription purchased by the customer. For example, a subscription to a DFS service may limit the amount of searches that a customer can submitted to the DFS system. As such, the DFS service will meter the number of searches that are submitted by the customer. In another example, a subscription to the DFS service may limit the time a user can actively access a DFS service. As such, the DFS service will meter the amount of time that a user spends actively using the DFS service.

In step 3412, a DFS service determine whether the customer's use of the DFS system exceeded a threshold amount granted by the subscription. For example, a customer may exceed the scope of a paid subscription by using functionality not included in the paid subscription or using more functionality than that granted by the subscription. In some embodiments, the excess use can be measured with respect to a metric such as time or use of computing resources.

In step 3412, a DFS service determines whether a customer exceeded the scope of the customer's subscription. In step 3414, if the customer did not exceed the subscription, no action is taken (e.g., the customer is not charged additional fees). Referring back to step 3412, a variety of actions can be taken if the customer has exceed the subscription. In step 3416, the DFS service can charge the customer for the excess amount of the metered metric. For example, the DFS service may begin metering the amount of time a customer spends using the DFS system after a threshold amount of time has been exceeded. In step 3418, the DFS service can alternatively or additionally prevent the customer from accessing the DFS system if the customer exceeds the subscription or has not paid the additional charges of step 3416.

Referring back to step 3408, if the customer is not subscribed to a DFS subscription service, then customer may still access the DFS system through a variety of other techniques. For example, a DFS service may provide limited or temporary access to the DFS system to a non-subscribed customer. In another example, a DFS service may provide access to the DFS service on-demand.

Either way, in step 3420, a DFS service meters metrics on a non-subscription basis. For example, in step 3422, the customer can pay for each instance the customer uses the DFS system. In another example, in step 3424, a DFS service can start charging a non-subscribed customer for using the DFS system once the metrics of the service exceed a threshold amount. For example, a DFS service may provide free limited access or temporary full access to the DFS system. When the measuring metrics exceed the free limited access, the customer may be charged for access that exceeds the free amount. In either case, in step 3418, the DFS service can prevent the customer from accessing the DFS system if the measuring metrics exceed the threshold amount or the customer has not paid the charges of step 3422 or 3424. In some embodiments, a DFS server can allow the customer to complete an active search that exceeded a measuring metric but deny the customer from using the DFS system any further until additional payment authorized.

11.0. Computing System Architecture

Figure 35:
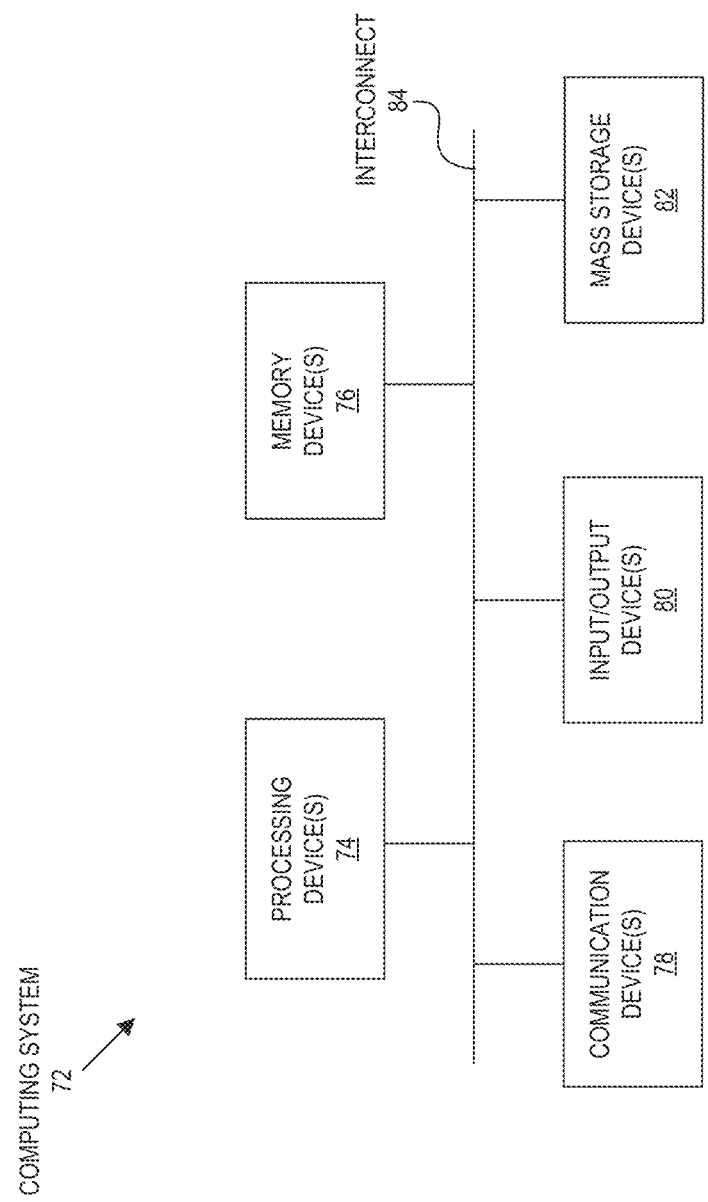
FIG. 35 is a block diagram illustrating a high-level example of a hardware architecture of a computing system in which an embodiment may be implemented.

FIG. 35 is a block diagram illustrating a high-level example of a hardware architecture of a computing system in which an embodiment may be implemented. For example, the hardware architecture of a computing system 72 can be used to implement any one or more of the functional components described herein (e.g., forwarder, indexer, search head, and data store, server computer system, edge device). In some embodiments, one or multiple instances of the computing system 72 can be used to implement the techniques described herein, where multiple such instances can be coupled to each other via one or more networks.

The illustrated computing system 72 includes one or more processing devices 74, one or more memory devices 76, one or more communication devices 78, one or more input/ output (I/O) devices 80, and one or more mass storage devices 82, all coupled to each other through an interconnect 84. The interconnect 84 may be or include one or more conductive traces, buses, point-to-point connections, controllers, adapters, and/or other conventional connection devices. Each of the processing devices 74 controls, at least in part, the overall operation of the processing of the computing system 72 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 76 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 82 can be or include one or more hard drives, digital versatile disks (DVDs), flash memories, or the like. Each memory device 76 and/or mass storage device 82 can store (individually or collectively) data and instructions that configure the processing device(s) 74 to execute operations to implement the techniques described above.

Each communication device 78 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 74, each I/O device 80 can be or include a device such as a display (which may be a touch screen display), audio speaker, keyboard, mouse or other pointing device, microphone, camera, etc. Note, however, that such I/O devices 80 may be unnecessary if the processing device 74 is embodied solely as a server computer.

In the case of a client device (e.g., edge device), the communication devices(s) 78 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 78 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 76). A processor (e.g., processing device(s) 74) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

Computer programs typically comprise one or more instructions set at various times in various memory devices of a computing device, which, when read and executed by at least one processor (e.g., processing device(s) 74), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 76).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method comprising:
receiving, by a data intake and query system, a search query;
defining, by the data intake and query system, a search scheme for applying the search query on a plurality of distributed data storage systems including an internal data storage system of the data intake and query system and an external data storage system communicatively coupled to the data intake and query system over a computer network, wherein the internal data storage system stores data as a plurality of time-indexed events including respective segments of raw machine data;
transferring, by the data intake and query system, a portion of the search scheme to a search service for obtaining partial search results from the external data storage system;
producing, by the data intake and query system, partial search results by applying a portion of the search scheme to the internal data storage system;
transmitting, by the data intake and query system over the computer network, the partial search results to at least one worker node communicatively coupled to the external data storage system over the computer network, the at least one worker node being communicatively coupled to the search service;
receiving, by the data intake and query system from the search service, search results of the search query obtained by application of the search scheme to the plurality of distributed data storage systems including the internal data storage system and the external data storage system;
wherein the search results obtained by the data intake and query system from the search service are based on a combination of the partial search results of the internal data storage system and the partial search results obtained from the external data storage system combined by the at least one worker node; and
causing output of the search results or data indicative of the search results by a display device to a user.

2. The method of claim 1, wherein the search query is input by the user and expressed in a pipelined search language.

3. The method of claim 1, wherein the output is rendered by the display device as a timeline visualization.

4. The method of claim 1, wherein the external data storage system stores data in a structured format, and the search results are in a specified format.

5. The method of claim 1, wherein the search query includes an explicit search parameter input by the user causing the data intake and query system to define the portion of the search scheme transferred to the search service to apply the search query to the external data storage system.

6. The method of claim 1, wherein defining the search scheme comprises:
   determining, by the data intake and query system, that the search query requires searching the plurality of distributed data storage systems; and
   defining a plurality of search phases for searching the plurality of distributed data storage systems and obtaining the search results from the search service;
   wherein the search scheme includes the plurality of search phases, and the portion of the search scheme includes at least one of the plurality of search phases.

7. The method of claim 1, wherein defining the search scheme comprises:
   determining, by the data intake and query system, that the search query requires searching the plurality of distributed data storage systems; and
   defining a plurality of ordered search phases for searching the plurality of distributed data storage systems and obtaining the search results from the search service in accordance with an order of the plurality of ordered search phases;
   wherein the search scheme includes the plurality of ordered search phases, and the portion of the search scheme includes at least one of the plurality of ordered search phases for searching the external data storage system after execution of another one of the plurality of ordered search phases for searching the internal data storage system.

8. The method of claim 1, further comprising, prior to receiving the search results by the data intake and query system:
   determining, by the data intake and query system, that the search query requires searching the plurality of distributed data storage systems; and
   responsive to determining that the search query requires searching the plurality of distributed data storage systems, initiating a communications search protocol with the search service and causing the transferring of the portion of the search scheme to the search service by the data intake and query system.

9. The method of claim 1, further comprising, prior to receiving the search results:
   executing, by the data intake and query system, a first search operation on the internal data storage system in accordance with the search scheme; and
   sending, by the data intake and query system to the search service, a message causing the search service to initiate a second search operation for searching the external storage system in accordance with the search scheme.

10. The method of claim 1, wherein the search results obtained by the data intake and query system from the search service correspond to the combination of the partial search results of the internal data storage system and the partial search results obtained from the external data storage system combined by the at least one worker node in an arrangement of time-ordered events.

11. The method of claim 1, wherein the search results obtained by the data intake and query system from the search service are derived from the combination of the partial search results of the internal data storage system and the partial search results obtained from the external data storage system combined by the at least one worker node.

12. A method comprising:
receiving, by a search service, data representing a portion of a search scheme defined by a data intake and query system for a plurality of worker nodes to collect a plurality of partial search results over a computer network from a plurality of distributed data storage systems including a plurality of external data storage systems and an internal data storage system of the data intake and query system, wherein the search scheme comprises a plurality of search phases;
defining, by the search service, an executable search process based on the received portion of the search scheme defined by the data intake and query system, the executable search process being defined as a directed acyclic graph to include a first phase causing the plurality of worker nodes to extract and collect the plurality of partial search results from the plurality of external data storage systems, a second phase causing the plurality of worker nodes to collect the plurality of partial search results from the internal data storage system, and a third phase causing the search service to collect the plurality of partial search results of the plurality of external data storage systems and the plurality of partial search results of the internal data storage system from the plurality of worker nodes;
executing, by the search service, the executable search process to cause the plurality of worker nodes to extract and collect the plurality of partial search results from the plurality of external data storage systems and collect the plurality of partial search results from the internal data storage system over the computer network;
receiving, by the search service, a plurality of aggregate partial search results based on the plurality of partial search results of the plurality of external data storage systems and the plurality of partial search results of the internal data storage system; and
sending, by the search service, the plurality of aggregate partial search results to the data intake and query system.

13. A method comprising:
receiving, by a search service, data representing a portion of a search scheme defined by a data intake and query system for a plurality of worker nodes to collect partial search results over a computer network from a plurality of distributed data storage systems including a plurality of external data storage systems and an internal data storage system of the data intake and query system;
defining, by the search service, an executable search process based on the received portion of the search scheme defined by the data intake and query system;

executing, by the search service, the executable search process to cause the plurality of worker nodes to collect a plurality of partial search results from the plurality of external data storage systems and collect a plurality of partial search results from the internal data storage system over the computer network and produce a plurality of aggregate partial search results by combining the plurality of partial search results of the plurality of external data storage systems with the plurality of partial search results of the internal data storage system as an arrangement of time-ordered events;

receiving, by the search service, the plurality of aggregate partial search results; and sending, by the search service, the plurality of aggregate partial search results to the data intake and query system.

14. The method of claim 13, wherein the search scheme comprises a plurality of search phases, and defining the executable search process comprises:

defining, by the search service, the executable search process as a directed acyclic graph including at least some of the plurality of search phases.

15. The method of claim 13 wherein the search scheme comprises a plurality of search phases, and defining the executable search process comprises:

defining, by the search service, the executable search process to include a first phase causing the plurality of worker nodes to extract and collect the plurality of partial search results from the plurality of external data storage systems and a second phase causing the plurality of worker nodes to collect the plurality of partial search results from the internal data storage system.

16. The method of claim 13 wherein the search scheme comprises a plurality of ordered search phases, and defining the executable search process comprises:

defining, by the search service, the executable search process to include a first phase causing the plurality of worker nodes to extract and collect the plurality of partial search results from the plurality of external data storage systems, and a second phase causing the plurality of worker nodes to collect the plurality of partial search results in parallel from peer indexers of the internal data storage system, the first phase occurring before the second phase.

17. The method of claim 13, wherein the plurality of partial search results of the internal data storage system are formatted as a plurality of time-indexed events including respective segments of raw machine data.

18. The method of claim 13, wherein the plurality of partial search results of the internal data storage system are in a first format as a plurality of time-indexed events including raw machine data, the plurality of partial search results of at least some of the external data storage systems are in a second format different from the first format, and the plurality of aggregate partial search results are in a specified format.

19. The method of claim 13, further comprising:

metering an amount of time and computing resources utilized to complete the executable search process.

20. The method of claim 13, wherein the plurality of partial search results of the plurality of external data storage systems are searched in accordance with the received portion of the search scheme, and the plurality of partial search results of the internal data storage system are searched in accordance with a different portion of the search scheme.

21. A method comprising:

receiving, by a worker node over a computer network, search instructions defined by a search service for the worker node to collect a plurality of partial search results from a plurality of distributed data storage systems including a plurality of partial search results of an external data storage system and a plurality of partial search results of an internal data storage system of a data intake and query system;

collecting, by the worker node over a computer network, the plurality of partial search results of the external data storage system searched in accordance with the search instructions;

collecting, by the worker node over the computer network, the plurality of partial search results of the internal data storage system;

producing, by the worker node, a plurality of aggregate partial search results from the plurality of partial search results of the external data storage system and the plurality of partial search results of the internal data storage system by combining the plurality of partial search results of the external data storage system with the plurality of partial search results of the internal data storage system as an arrangement of time-ordered events; and providing, by the worker node over the computer network to the search service, the plurality of aggregate partial search results in response to the search instructions.

22. The method of claim 21, wherein the plurality of partial search results of the internal data storage system are formatted as a plurality of time-indexed events including respective segments of raw machine data.

23. The method of claim 21, wherein the plurality of partial search results of the internal data storage system are in a first format as a plurality of time-indexed events including raw machine data, the plurality of partial search results of the external data storage system are in a second format different from the first format, and the plurality of aggregate partial search results are in a specified format.

24. The method of claim 21, wherein producing the plurality of aggregate partial search results comprises:

deriving, by the worker node, the plurality of aggregate partial search results by performing an operation on a combination of the plurality of partial search results of the external data storage system and the plurality of partial search results of the internal data storage system.

25. A method comprising:

receiving, by a first worker node over a computer network, search instructions defined by a search service for the first worker node to collect a plurality of partial search results from a plurality of distributed data storage systems including a first plurality of partial search results of a first external data storage system and a second plurality of partial search results of an internal data storage system of a data intake and query system;

collecting, by the first worker node over a computer network, the first plurality of partial search results of the first external data storage system searched in accordance with the search instructions;

collecting, by the first worker node over the computer network, the second plurality of partial search results of the internal data storage system;

collecting, by the first worker node over the computer network, a third plurality of partial search results extracted from a second external data storage system by a second worker node, the second worker node being communicatively coupled over the computer network to the second external data storage system;

sending, by the first worker node over the computer network, at least a portion of the first plurality of partial search results to the second worker node;

producing, by the first worker node, a plurality of aggregate partial search results from the first plurality of partial search results of the first external data storage system, the second plurality of partial search results of the internal data storage system, and the third plurality of partial search results of the second external data storage system; and providing, by the first worker node over the computer network to the search service, the plurality of aggregate partial search results in response to the search instructions.

* * * * *